United States Patent [19]

Yasui et al.

[11] Patent Number: 5,359,616
[45] Date of Patent: Oct. 25, 1994

[54] SOLID STATE LASER APPARATUS AND LASER MACHINING APPARATUS

[75] Inventors: Koji Yasui; Tetsuo Kojima; Takashi Yamamoto; Akira Ishimori; Kuniaki Iwashiro, all of Hyogo, Japan

[73] Assignee: Mitsubishi Denki Kabushiki Kaisha, Tokyo, Japan

[21] Appl. No.: 114,086

[22] Filed: Aug. 31, 1993

[30] Foreign Application Priority Data

Sep. 16, 1992 [JP] Japan .................. 4-272520
Aug. 2, 1993 [JP] Japan .................. 5-191441

[51] Int. Cl.⁵ .............................. H01S 3/14
[52] U.S. Cl. ........................... 372/39; 372/40
[58] Field of Search .............. 372/39, 40, 41, 70

[56] References Cited

U.S. PATENT DOCUMENTS

| | | | |
|---|---|---|---|
| 3,629,723 | 12/1971 | Snitzer | 372/40 |
| 3,699,472 | 10/1972 | Young | 372/40 |
| 3,803,509 | 4/1974 | Steffen . | |
| 4,547,402 | 10/1985 | Nakajima et al. | 372/40 |
| 4,713,820 | 12/1987 | Morris et al. | 372/41 |
| 4,751,716 | 6/1988 | Ream et al. | 372/41 |
| 4,809,283 | 2/1989 | Harter | 372/41 |
| 4,894,837 | 1/1990 | DiFonzo et al. | 372/40 |
| 4,899,347 | 2/1990 | Kuchar et al. | 372/39 |
| 4,903,271 | 2/1990 | Yasui et al. . | |
| 4,937,424 | 6/1990 | Yasui et al. . | |
| 4,962,995 | 10/1990 | Andrews et al. | 372/40 |
| 5,058,123 | 10/1991 | Yasui et al. . | |
| 5,243,615 | 9/1993 | Ortiz et al. | 372/40 |
| 5,287,373 | 2/1994 | Rapoport et al. | 372/39 |

OTHER PUBLICATIONS

H. U. Leuenberger et al., "Optical Pump System for Mode-Controlled Laser Operation", *Applied Optics*, vol. 14, No. 5, May 1975, pp. 1190–1192.

*Primary Examiner*—Rodney B. Bovernick
*Assistant Examiner*—Robert E. Wise
*Attorney, Agent, or Firm*—Burns, Doane, Swecker & Mathis

[57] ABSTRACT

A solid state laser apparatus is provided to generate a high quality and high power laser beam, and a laser machining apparatus is provided to perform laser machining by a laser beam generated from the solid state laser apparatus. In the solid state laser apparatus, a laser resonator includes a solid state component cooled in a cylindrical pipe by contacting liquid which is introduced through an inflow opening and discharged through an outflow opening, the solid state component having larger refractive index than that of the liquid, a light source turned ON by a power source to excite the solid state component, and an optical system transmitting light from the light source to the solid state component. Further, a surface roughness of the solid state component is adjusted so as to adjust an excitation distribution in a section of the solid state component. The solid state component further includes moving means for moving a reflection mirror and a condensing lens in a direction of an optical axis of the laser resonator, and a housing accommodating an image transferring optical system. A laser beam is generated from the laser resonator, and is externally derived and used to perform the laser machining.

23 Claims, 42 Drawing Sheets

(a)

(b)

(a)

(b)

FIG. 11
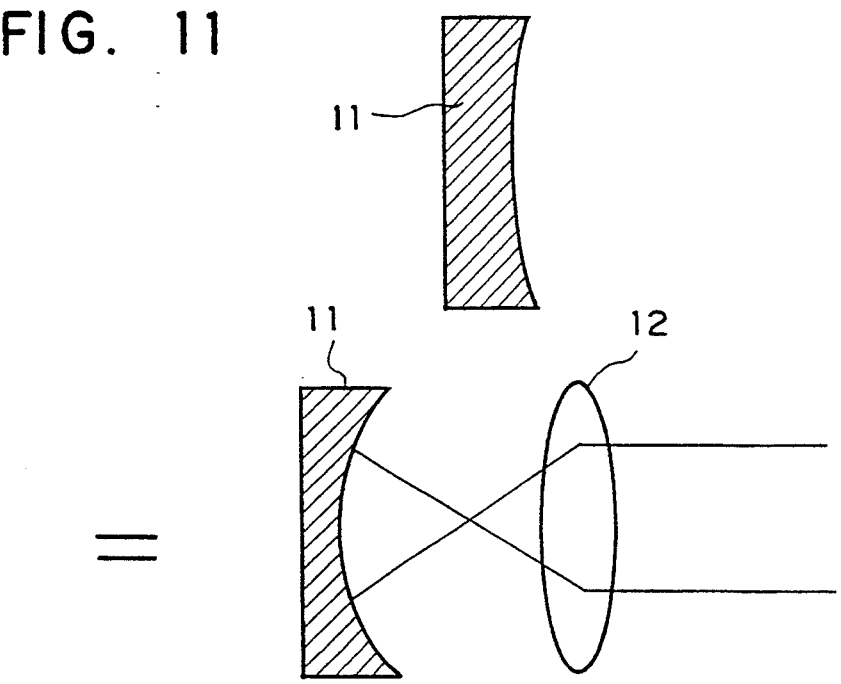
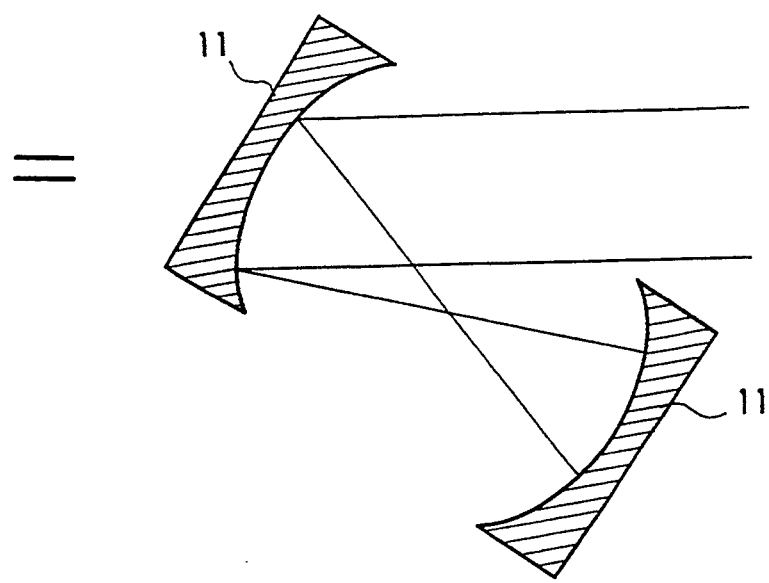
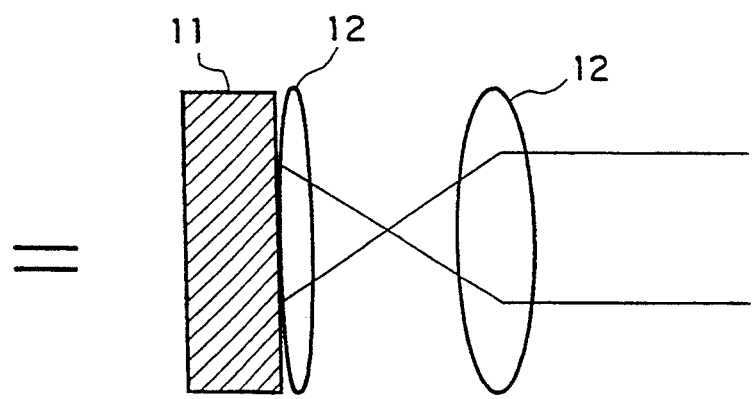

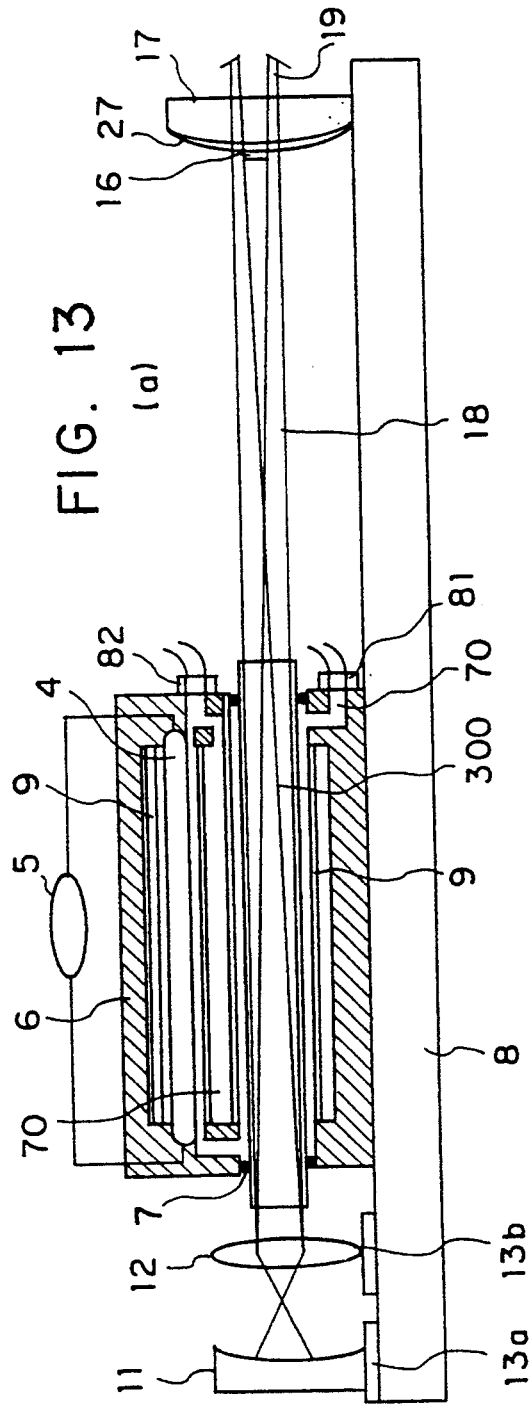
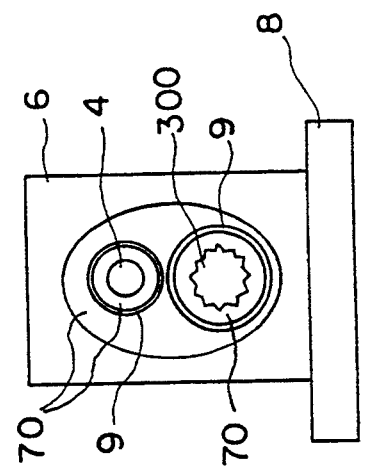
FIG. 13 (a)
FIG. 13 (b)

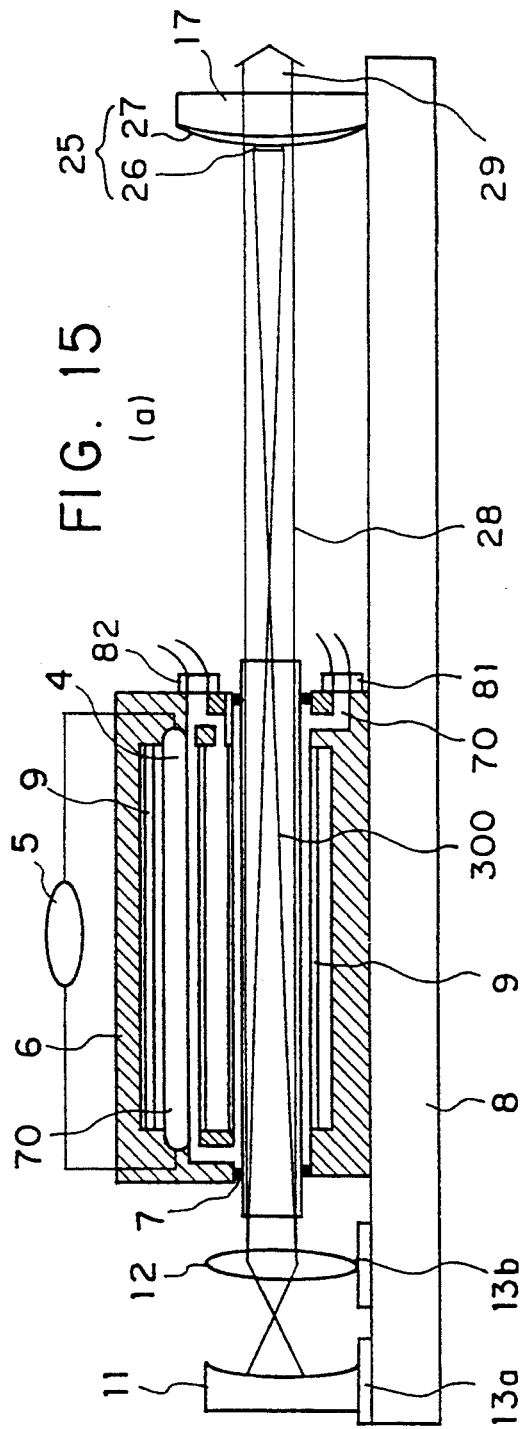
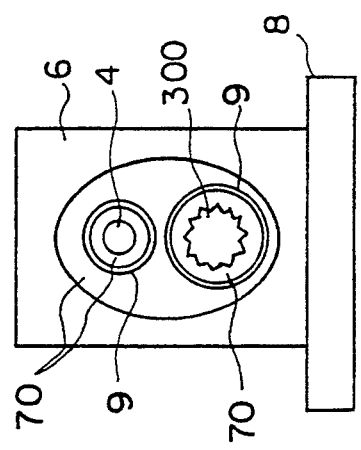
FIG. 15(a)
FIG. 15(b)

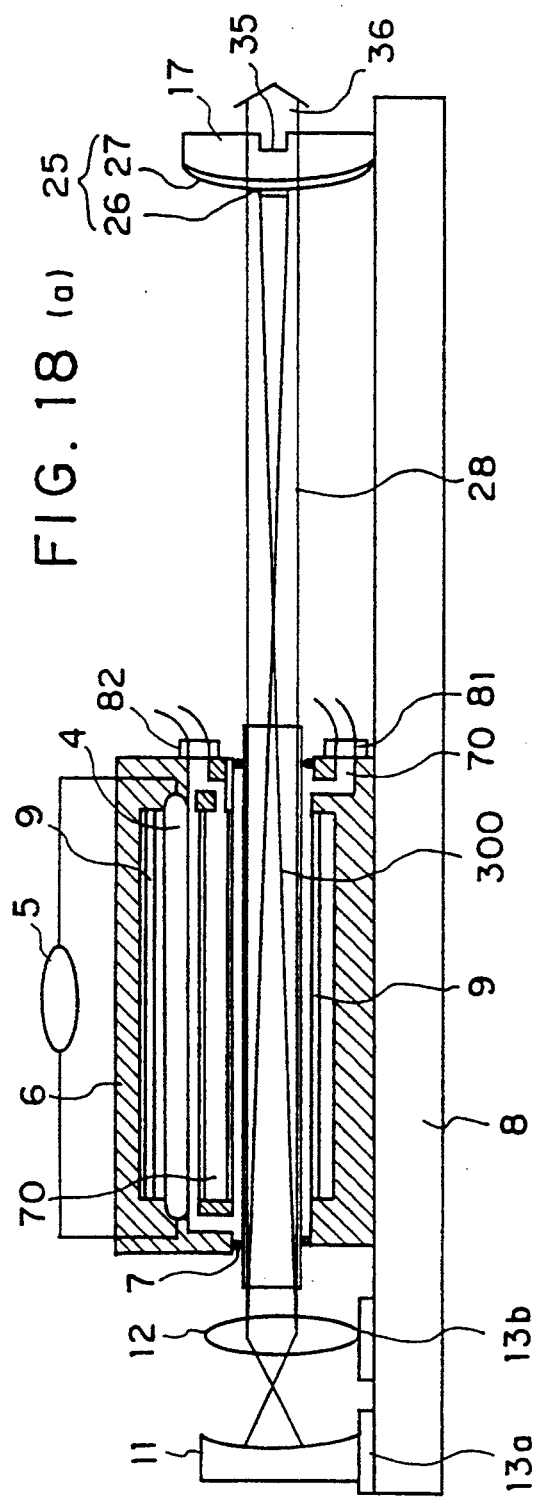
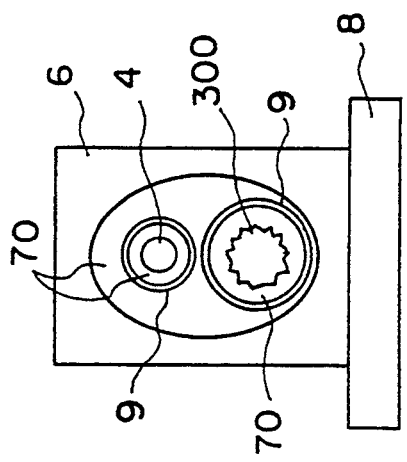
FIG. 18(a)
FIG. 18(b)

(a)

(a)

(b)

(a)

(b)

FIG. 41
(a)
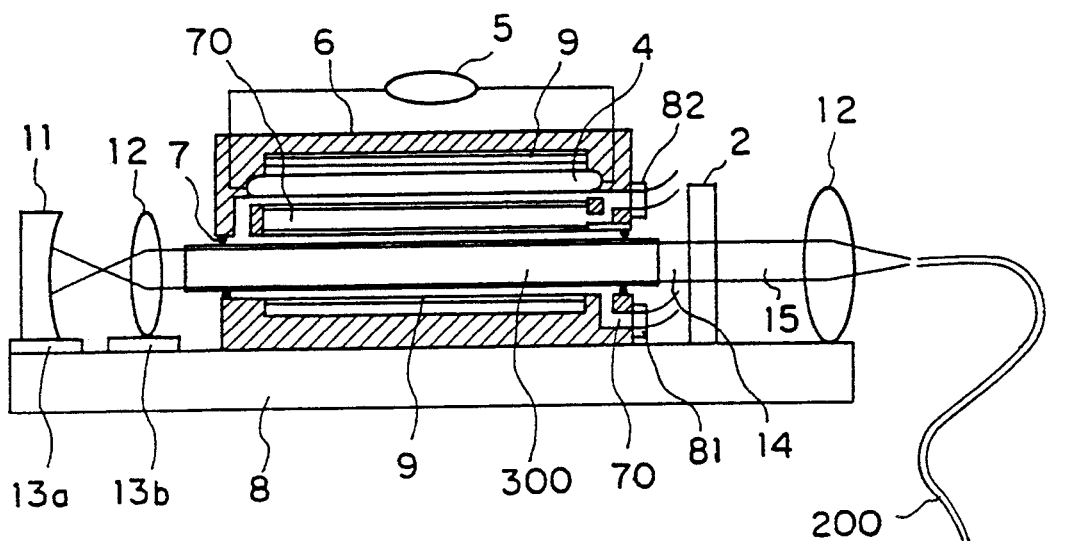
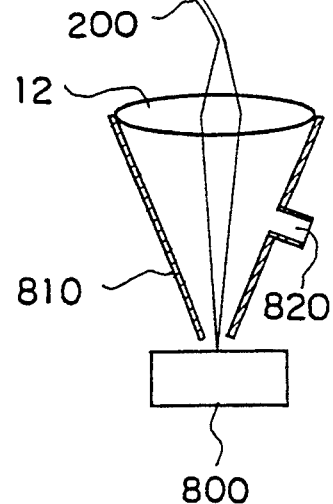
FIG. 41
(b)
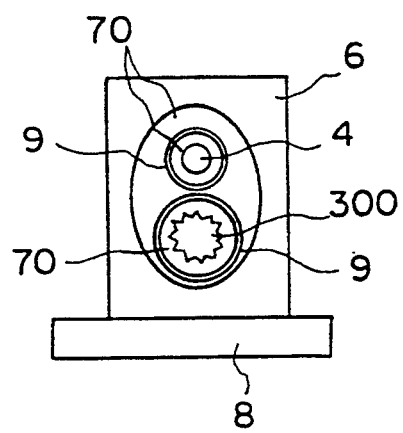

(a)

(b)

(a)

(b)

(a)

(b)

(a)

(b)

(a)

(b)

(a)

(b)

SOLID STATE LASER APPARATUS AND LASER MACHINING APPARATUS

BACKGROUND OF THE INVENTION

1. Field of the Invention

The present invention relates to a solid state laser apparatus generating a high quality and high power laser beam, and to a laser machining apparatus performing laser machining by using the high quality laser beam generated from the laser apparatus.

2. Description of the Prior Art

FIGS. 1(a) and (b) are sectional views showing a conventional laser apparatus disclosed in, for example, U.S. Pat. No. 3,803,509. In FIGS. 1(a) and (b), reference numeral 1 means a total reflection mirror, 2 means a partial reflection mirror, and 3 is a solid state component including an active solid state medium. In YAG laser as an example, Nd is doped as the active solid state medium is doped to produce Nd:YAG (Yttrium Aluminum Garnet), and the Nd:YAG has a surface roughness of about 50 μinch RMS in order to avoid parasitic oscillation. Further, reference numeral 4 means a light source such as an arc lamp, 5 means a power source to turn ON the light source, and 6 is a condenser for the light source. For example, the condenser 6 has an elliptical sections and an inner surface thereof includes a light reflecting surface. Reference numeral 14 means a laser beam generated in a laser resonator including the mirrors 1 and 2, and 9, 900 mean cylindrical pipes adjusting a flow of a medium 70 which peripherally cools the light source 4 and the solid state component 3 including the active medium. The cylindrical pipe 900 has a rough surface. Reference numeral 7 means a seal material such as an O ring, 81, 82 mean an inflow opening and an outflow opening for the cooling medium 70, 15 is a laser beam externally derived, and 8 is a base.

The conventional solid state laser apparatus is provided as set forth above. In the apparatus, the light source 4 and the solid state medium 3 are disposed on a focal point of the condenser having the elliptical section. The light source 4 is turned ON by the power source 5 to emit light, and the emitted light is diffused at a stage to pass through the cylindrical pipe 900 having the rough surface so as to be peripherally incident on the solid state medium uniformly. The solid state medium is excited by the light to become a laser medium. Spontaneous emission light is generated by the laser medium, and is amplified during reciprocation in the resonator including the mirrors 1 and 2. When the spontaneous emission light has a predetermined magnitude or more, the light is externally emitted as the laser beam 15 having good directivity. In addition, the light source 5 and the solid state component 3 are peripherally cooled by the cooling medium 70 circulating in the cylindrical pipe 900.

In the conventional laser apparatus as set forth above, the light emitted from the light source peripherally irradiates and excites the solid state component uniformly. However, the solid state component is strongly excited in a vicinity of an intermediate portion thereof. Accordingly, an excitation distribution occurs so that variations are generated in quality of the laser medium generated in the section. As a result, it is impossible to provide a high quality beam having a good condensing performance.

FIG. 2 shows the results of an experiment in which the spontaneous emission light was observed from an axial direction of the solid state component without an optical resonator. The experiment was performed according to U.S. Pat. No. 3,803,509, and the experimental results are disclosed in "Applied Optics" vol. 14, No. 5, pp. 1192.

In FIG. 2, intensity of the spontaneous emission light is illustrated by the contour lines, and light intensity is the highest at an intermediate portion and the light intensity decreases toward a peripheral portion in a sectional direction.

Since light from the light source can peripherally irradiate the solid state component uniformly because of the cylindrical pipe 900 having the rough surface. there is a uniform distribution in a peripheral direction. However, it can be also seen that an extremely concentrated distribution is generated, in particular, at the peripheral portion in the sectional direction.

Further, in the conventional solid state laser apparatus, it is possible to use only light having a specified wavelength for laser output in the light (energy) from the exciting light source 4 absorbed by the solid state component 3. The light having other wavelengths is absorbed by the solid state component 3 so as to heat the solid state component 3. Hence, though it is necessary to cool the solid state component 3, there is no choice but to peripherally cool the solid state component 3 due to structural limitation of the solid state laser apparatus. As a result, a temperature distribution occurs in the section of the solid state component 3, and has the hot intermediate portion thereof and the peripheral portion which is colder than the intermediate portion.

Consequently, refractive index of the solid state component 3 has a distribution corresponding to the temperature distribution in the section, resulting in a distorted wave front of the laser light 9 passing through the solid state component 3. Hence, the laser light 9 in the resonator can be typically condensed. Such a laser beam condensing action by the solid state component is referred to as heat lens action of a solid state component. The heat lens action of the solid state component causes an unstable operation of the laser resonator. As a result, a sectional area of the laser light 9 in the laser resonator decreases, and the emitted laser beam 15 would be irregularly diverged since a magnitude of the heat lens action is varied according to variation in making power supply of the power source 5. Accordingly, there are several problems in that, for example, the laser beam deviates from a transmission mirror when the laser beam is transmitted by the transmission mirror into a machining stage or the like using the laser beam, and stable machining can not be performed because a focus position of the laser beam can be accurately defined until the heat lens action is stabilized when the laser beam is condensed by a lens so as to be used for machining.

SUMMARY OF THE INVENTION

In view of the foregoing, it is an object of the present invention to provide a solid state laser apparatus which can uniformly introduce light into a solid state component and generate high power and high quality laser beam by using a uniform laser medium, and to provide a laser apparatus which can perform efficient and high quality laser machining by using the laser beam.

It is another object of the present invention to provide a solid state laser apparatus which can achieve stable laser operation by correcting heat lens action of the solid state component under conditions where making power supply is varied, and to provide the solid state laser apparatus which can pulse a laser output by varying resonator conditions under a constant pumping condition.

According to the first aspect of the present invention, for achieving the above-mentioned objects, there is provided a solid state laser apparatus in which a solid state component is peripherally cooled by liquid having lower refractive index than that of the solid state component, light from an exciting light source is introduced into the solid state component by a light exciting apparatus including an optical system so as to excite the solid state component, and an excitation distribution in a section of the solid state component can be adjusted by adjusting a surface roughness of the solid state component.

Consequently, in the solid state laser apparatus according to the first aspect of the present invention, since the excitation distribution in the section of the solid state component is adjusted by adjusting the surface roughness, the solid state component can pass a laser beam without wave front aberration of the passing laser beam.

According to the second aspect of the present invention, there is provided a solid state laser apparatus in which a solid state component is peripherally cooled by liquid having lower refractive index than that of the solid state component, light from an exciting light source is introduced into the solid state component by a light exciting apparatus including an optical system so as to excite the solid state component, and the solid state component is set to have a surface roughness of 130 $\mu$inch RMS or more.

Consequently, in the solid state laser apparatus according to the second aspect of the present invention, the solid state component is set to have the surface roughness of 130 $\mu$inch RMS or more, and scatters light of a light source incident on the solid state component on a surface of the solid state component. As a result the solid state component serves to reduce refractive action of the light of the light source on the surface of the solid state component.

According to the third aspect of the present invention, there is provided a solid state laser apparatus employing a condenser as a light exciting apparatus to confine light of a light source.

Consequently, in the solid state laser apparatus according to the third aspect of the present invention, the condenser confines the light from the light source so that light scattered by a rough surface of the solid state component is confined so as to be introduced into the solid state component again.

According to the fourth aspect of the present invention, there is provided a solid state laser apparatus employing a condenser which serves as a light exciting apparatus to confine light of a light source, and includes a diffuse reflecting surface at an inner portion thereof.

Consequently, in the solid state laser apparatus according to the fourth aspect of the present invention. the light from the light source is confined by the condenser including the diffuse reflecting surface. Therefore, the light scattered by a rough surface of the solid state component is confined so as to be introduced into the solid state component again, and the diffuse reflecting surface equalizes the light of the light source in the condenser.

According to the fifth aspect of the present invention, there is provided a solid state laser apparatus including a plurality of solid state components which are disposed in a direction of an optical axis.

Consequently, in the solid state laser apparatus according to the fifth aspect of the present invention, the plurality of solid state components are disposed in the direction of the optical axis so as to extend a length of a laser medium.

According to the sixth aspect of the present invention, there is provided a solid state laser apparatus in which a plurality of solid state components are disposed in an axial direction thereof, and a heat lens correcting optical apparatus including at least one optical lens is inserted into at least one of distances between the respective solid state components.

Consequently, in the solid state laser apparatus according to the sixth aspect of the present invention. the plurality of solid state components are disposed in the axial direction. Further, the heat lens correcting optical apparatus is inserted into at least one of distances between the respective solid state components so as to compensate for a heat lens of the solid state component.

According to the seventh aspect of the present invention, there is provided a solid state laser apparatus in which a laser beam is derived from the solid state component by using a stable type resonator.

Consequently, in the solid state laser apparatus according to the seventh aspect of the present invention, the stable type resonator serves to generate a uniform laser beam in a section of the solid state component.

According to the eighth aspect of the present invention, there is provided a solid state laser apparatus in which a laser beam is derived from the solid state component by using an unstable type resonator.

Consequently, in the solid state laser apparatus according to the eighth aspect of the present invention, the unstable type resonator serves to generate a uniform laser beam in a section of the solid state component.

According to the ninth aspect of the present invention, there is provided a solid state laser apparatus in which a laser beam is derived from the solid state component by using a laser resonator including an exit mirror having a partial reflecting portion at an intermediate portion and a non-reflecting portion at a peripheral portion thereof, and a single total reflection mirror or a heat lens correcting optical system.

Consequently, in the solid state laser apparatus according to the ninth aspect of the present invention, the laser resonator includes the exit mirror having the partial reflecting portion at the intermediate portion and the non-reflecting portion at the peripheral portion thereof, and the single total reflection mirror or the heat lens correcting optical system. The laser resonator generates the uniform laser beam in the section of the solid state component, and externally emits a solid type laser beam.

According to the tenth aspect of the present invention, there is provided a solid state laser apparatus in which a laser beam is derived from the solid state component by using a laser resonator including an exit mirror having a partial reflecting portion at an intermediate portion, a non-reflecting portion at a peripheral portion thereof and means for compensating for a phase difference of the laser beam passing through both the portions, and a single total reflection mirror or a heat lens correcting optical system.

Consequently, in the solid state laser apparatus according to the tenth aspect of the present invention, the laser resonator includes the exit mirror having the partial reflecting portion at the intermediate thereof, the non-reflecting portion at the peripheral portion thereof and the means for compensating for the phase difference of the laser beam passing through both the portions, and the single total reflection mirror or the heat lens correcting optical system. The laser resonator generates the uniform laser beam in the section of the solid state component, and externally emits a solid type laser beam having uniform phase.

According to the eleventh aspect of the present invention, there is provided a solid state laser apparatus in which a laser beam generated from another solid state laser apparatus is introduced into the solid state component so as to derive an amplified laser beam.

Consequently, in the solid state laser apparatus according to the eleventh aspect of the present invention, the laser beam generated from another solid state laser apparatus is introduced into the solid. state component so as to externally derive the amplified laser beam. The solid state component having a rough surface amplifies the laser beam without aberration.

According to the twelfth aspect of the present invention, there is provided a solid state laser apparatus in which an optical system including a plurality of optical components is employed as a part of the laser optical system to control at least one of distances between the optical components so as to vary corresponding to light output from the light source.

Consequently, in the solid state laser apparatus according to the twelfth aspect of the present invention, the heat lens correcting optical system includes the plurality of optical components so as to vary the distance between the optical components in response to the output from the light source. The heat lens correcting optical system can cancel variation in degree of a heat lens of a solid state component due to variation in the output from the light source.

According to the thirteenth aspect of the present invention, there is provided a solid state laser apparatus in which a reflection type or transmission type of image transferring optical system including a plurality of optical components is employed as a part of the laser optical system, and is controlled so as to vary at least one of distances between the optical components in response to light output from the light source.

Consequently, in the solid state laser apparatus according to the thirteenth aspect of the present invention, a heat lens correcting optical system includes the reflection type or transmission type of image transferring optical system, and cancels variation in a heat lens of a solid state component by moving the optical system by the fine distance between optical parts.

According to the fourteenth aspect of the present invention, there is provided a solid state laser apparatus employing a semiconductor laser as the light source.

Consequently, in the solid state laser apparatus according to the fourteenth aspect of the present invention, the semiconductor laser is employed as the light source to reduce a rate of heat absorption of the light source by the solid state component, and adjust an excitation distribution corresponding to a surface roughness of the solid state component by adjusting a generating wavelength of the semiconductor laser.

According to the fifteenth aspect of the present invention, there is provided a solid state laser apparatus in which a laser beam generated from the solid state component is introduced by an optical system to an end surface of an optical fiber, and laser machining is performed by using the laser beam emitted from the opposite end surface.

Consequently, in the solid state laser apparatus according to the fifteenth aspect of the present invention, the solid state component having a rough surface introduces light in a small spot to the end surface of the optical fiber without aberration in case the laser machining is performed by introducing the generated laser beam to the optical fiber.

According to the sixteenth aspect of the present invention, there is provided a solid state laser apparatus in which a laser beam generated from the solid state component is condensed by a condensing optical system so as to perform laser machining.

Consequently, in the solid state laser apparatus according to the sixteenth aspect of the present invention, the solid state component having a rough surface generates a laser beam in a small spot without aberration in case the laser machining is performed by condensing the generated laser beam so as to perform the laser machining.

According to the seventeenth aspect of the present invention, there is provided a solid state laser apparatus including a solid state component which is cooled by contacting liquid and has larger refractive index than that of the liquid, and a light exciting apparatus having a light source to excite the solid state component and an optical system to transmit light from the light source to the solid state component. Further, a surface roughness of the solid state component is varied in a longitudinal direction so as to adjust an excitation distribution in a section of the solid state component.

Consequently, in the solid state laser apparatus according to the seventeenth aspect of the present invention, the degree of the surface roughness is longitudinally varied in the solid state component so that the solid state component can uniformly adjust the excitation distribution in the section of the solid state component corresponding to the longitudinal excitation distribution and a distribution of generated laser beam. Further, the solid state component can adjust the degree of a surface roughness of an end so as to increase a contact area of cooling liquid to a seal material on a surface of the solid state component.

According to the eighteenth aspect of the present invention, there is provided a solid state laser apparatus including a solid state component containing laser active material, an exciting light source for the solid state component, a laser resonator having an image transferring optical system including a combination of a total reflection mirror and a condensing lens, and moving means for moving the total reflection mirror and the condensing lens in a direction of an optical axis of the laser resonator.

Consequently, in the solid state laser apparatus according to the eighteenth aspect of the present invention, the total reflection mirror and the condensing lens form the image transferring system in the laser resonator, and are moved in the direction of the optical axis of the laser resonator. Therefore, it is possible to adjust a course of a laser light in the laser resonator, and maintain a wide sectional area of the laser light so as to cancel focusing action of a laser beam due to a heat lens action of the solid state component.

According to the nineteenth aspect of the present invention, there is provided a solid state laser apparatus including a solid state component containing laser active material, an exciting light source for the solid state component, a stable laser resonator having a combination of an image transferring optical system including a combination of a total reflection mirror and a condensing lens with a partial reflection mirror, and moving means for moving the total reflection mirror and the condensing lens in a direction of an optical axis of the stable laser resonator.

Consequently, in the solid state laser apparatus according to the nineteenth aspect of the present invention, the total reflection mirror and the condensing lens are moved by the moving means in the direction of the optical axis of the laser resonator in the stable laser resonator having the combination of the image transferring optical system including the combination of the total reflection mirror and the condensing lens with the partial reflection mirror. Therefore, it is possible to adjust a course of a laser light in the laser resonator, and maintain a wide sectional area of the laser light while a campanulate intensity distribution is maintained in a section of the solid state component so as to cancel a focusing action of a laser beam due to a heat lens action of the solid state component.

According to the twentieth aspect of the present invention, there is provided a solid state laser apparatus including a solid state component containing laser active material, an exciting light source for the solid state component, an unstable laser resonator having a combination of an image transferring optical system including a combination of a total reflection mirror and a condensing lens with an enlarged total reflection mirror, and moving means for moving the total reflection mirror and the condensing lens in a direction of an optical axis of the laser resonator.

Consequently, in the solid state laser apparatus according to the twentieth aspect of the present invention, the total reflection mirror and the condensing lens forming the image transferring system are moved by the moving means in the direction of the optical axis of the laser resonator in the unstable laser resonator having the combination of the image transferring optical system including the combination of the total reflection mirror and the condensing lens with the enlarged total reflection mirror. Therefore, it is possible to adjust a course of a laser light in the laser resonator, and maintain a wide sectional area of the laser light while a uniform intensity distribution is maintained in a section of the solid state component so as to cancel focusing action of a laser beam due to a heat lens action of the solid state component.

According to the twenty-first aspect of the present invention, there is provided a solid state laser apparatus including a solid state component containing laser active material, an exciting light source for the solid state component, an unstable laser resonator having a combination of an image transferring optical system including a combination of a total reflection mirror and a condensing lens, with an enlarged exit mirror having an enlarged partial reflecting portion at an intermediate portion and a non-reflecting portion at a peripheral portion thereof, and moving means for moving the total reflection mirror and the condensing lens in a direction of an optical axis of the laser resonator.

Consequently, in the solid state laser apparatus according to the twenty-first aspect of the present invention, the enlarged exit mirror is provided with the enlarged partial reflecting portion at the intermediate portion and the non-reflecting portion at the peripheral portion thereof. Therefore, it is possible to provide a laser beam having a solid (i.e., non-doughnut type) section.

According to the twenty-second aspect of the present invention, there is provided a solid state laser apparatus including a solid state component containing laser active material, an exciting light source for the solid state component, an unstable laser resonator having a combination of an image transferring optical system including a combination of a total reflection mirror and a condensing lens, and an enlarged exit mirror having an enlarged partial reflecting portion at an intermediate portion and a non-reflecting portion at a peripheral portion thereof, and phase difference canceling means for canceling phase difference of light passing through the enlarged partial reflecting portion and the non-reflecting portion, and moving means for moving the total reflection mirror and the condensing lens in a direction of an optical axis of the laser resonator.

Consequently, the solid state laser apparatus according to the twenty-second aspect of the present invention further includes the phase difference canceling means. Therefore, it is possible to provide a solid type laser beam having uniform phase.

According to the twenty-third aspect of the present invention, there is provided a solid state laser apparatus further including a piezo-electric device which contacts at least one of the condensing lens and the total reflection mirror forming the image transferring optical system.

Consequently, in the solid state laser apparatus according to the twenty-third aspect of the present invention, the piezo-electric device contacts at least one of the condensing lens and the total reflection mirror forming the image transferring optical system, and is expanded and contracted so that an image transferring condition can be switched over between a stable condition and an unstable condition. Therefore, it is possible to provide a sharp pulse oscillation by rapidly varying Q-value of a resonator.

According to the twenty-fourth aspect of the present invention, there is provided a solid state laser apparatus further including a second light source to emit a light beam passing through the solid state component, and a photo detector to receive the light beam so as to measure variation in an outer diameter of the light beam.

Consequently, in the solid state laser apparatus according to the twenty-fourth aspect of the present invention, the second light source is provided to emit the light beam passing through the solid state component, and the photo detector is provided to receive the light beam so as to measure the variation in the outer diameter of the light beam. Therefore, if a piezo-electric device is driven depending upon the results of the detection, it is possible to cancel a heat lens action of the solid state component while appropriately following fluctuations of the heat lens action in a short time.

According to the twenty-fifth aspect of the present invention, there is provided a solid state laser apparatus further including a housing which accommodates the total reflection mirror and the condensing lens.

Consequently, in the solid state laser apparatus according to the twenty-fifth aspect of the present invention, the housing is further provided to accommodate the total reflection mirror and the condensing lens forming an image transferring system. Therefore, it is possible to avoid degradation of quality of a laser beam due to dust which is heated at a condensed point of a laser light positioned between the total reflection mirror and the condensing lens.

According to the twenty-sixth aspect of the present invention, there is provided a solid state laser apparatus further including an air hole which is provided in a housing.

Consequently, in the solid state laser apparatus according to the twenty-sixth aspect of the present invention, the air hole is provided in the housing. Therefore, it is possible to prevent moisture in air from absorbing a laser beam if a vacuum pump is connected to the air hole. Alternatively, it is possible to avoid air break (generation of plasma) in a vicinity of a condensed point by inversely introducing inactive gas into the housing.

According to the twenty-seventh aspect of the present invention, there is provided a laser machining apparatus in which a laser beam generated from a laser apparatus is transmitted by an optical system to a vicinity of a workpiece, a laser beam emitted from the optical system is condensed by a condensing optical system, and a laser beam extends by retransmission after the condense by the condensing system and is thereafter recondensed to be introduced to the workpiece so as to perform laser machining.

Consequently, in the laser machining apparatus according to the twenty-seventh aspect of the present invention, the laser beam generated from the laser apparatus is transmitted by the optical system to the vicinity of the workpiece, the laser beam emitted from the optical system is condensed by the condensing optical system, and the laser beam extends by retransmission after the condense by the condensing system and is thereafter recondensed to be introduced to the workpiece. Therefore, it is possible to transfer an emission configuration of the laser beam according to a configuration of the workpiece, and provide a laser beam having a sharp edge for the laser machining.

According to the twenty-eighth aspect of the present invention, there is provided a laser machining apparatus in which a laser beam generated from a laser apparatus is transmitted by an optical system to a vicinity of a workpiece, a laser beam emitted from the optical system is condensed by a condensing optical system and an outer diameter of the condensed beam is cut and trimmed by an aperture provided in a vicinity of a condensed point of the condensed beam, and a laser beam extends by retransmission after the condense by the condensing system and is thereafter recondensed to be introduced to the workpiece so as to perform laser machining.

Consequently, in the solid state laser apparatus according to the twenty-eighth aspect of the present invention, the laser beam generated from the laser apparatus is transmitted by the optical system to the vicinity of the workpiece, the laser beam emitted from the optical system is condensed by the condensing optical system and the outer diameter of the condensed beam is cut and trimmed by the aperture provided in the vicinity of the condensed point, and the laser beam extends by retransmission after the condense by the condensing system and is thereafter recondensed to be introduced to the workpiece. Therefore, it is possible to transfer an emission configuration of the laser beam according to a configuration of the workpiece, and provide a laser beam having a sharp edge for the laser machining.

According to the twenty-ninth aspect of the present invention, there is provided a laser machining apparatus in which a laser beam generated from a laser apparatus is transmitted by an optical system to a vicinity of a workpiece, a laser beam emitted from the optical system is condensed by a condensing optical system and an outer diameter of the condensed beam is cut and trimmed by a supersaturated absorber provided in a vicinity of a condensed point of the condensed beam, and a laser beam extends by retransmission after the condense by the condensing system and is thereafter recondensed to be introduced to the workpiece so as to perform laser machining.

Consequently, in the solid state laser apparatus according to the twenty-ninth aspect of the present invention, the laser beam generated from the laser apparatus is transmitted by the optical system to The vicinity of the workpiece, the laser beam emitted from the optical system is condensed by the condensing optical system and the outer diameter of the condensed beam is cut and trimmed by the supersaturated absorber provided in the vicinity of the condensed point, and the laser beam extends by retransmission after the condense by the condensing system and is thereafter recondensed to be introduced to the workpiece. Therefore, it is possible to transfer an emission configuration of the laser beam according to a configuration of the workpiece, and provide a laser beam having a sharp edge for the laser machining.

The above and further objects and novel features of the invention will more fully appear from the following detailed description when the same is read in connection with the accompanying drawing. It is to be expressly understood, however, that the drawings are for purpose of illustration only and are not intended as the definition of the limits of the invention.

BRIEF DESCRIPTION OF THE DRAWINGS

FIG. 11 is a diagram showing a modification of the embodiment 1;

FIG. 13(a) is a cross-sectional view showing the embodiment 2 of the present invention;

FIG. 13(b) is a midship sectional view showing the embodiment 2 of the present invention;

FIG. 15(a) and (b) are a cross-sectional view and a midship sectional view showing the embodiment 3 of the present invention, respectively;

FIG. 18(a) and (b) are another cross-sectional view and another midship sectional view showing the embodiment 4 of the present invention, respectively;

FIG. 28 is a sectional view of a solid state laser apparatus according to the embodiment 10 of the present invention;

FIG. 41(a) and (b) are a cross-sectional view and a midship sectional view showing the embodiment 19 of the present invention, respectively;

DETAILED DESCRIPTION OF THE PREFERRED EMBODIMENTS

Figure 1:
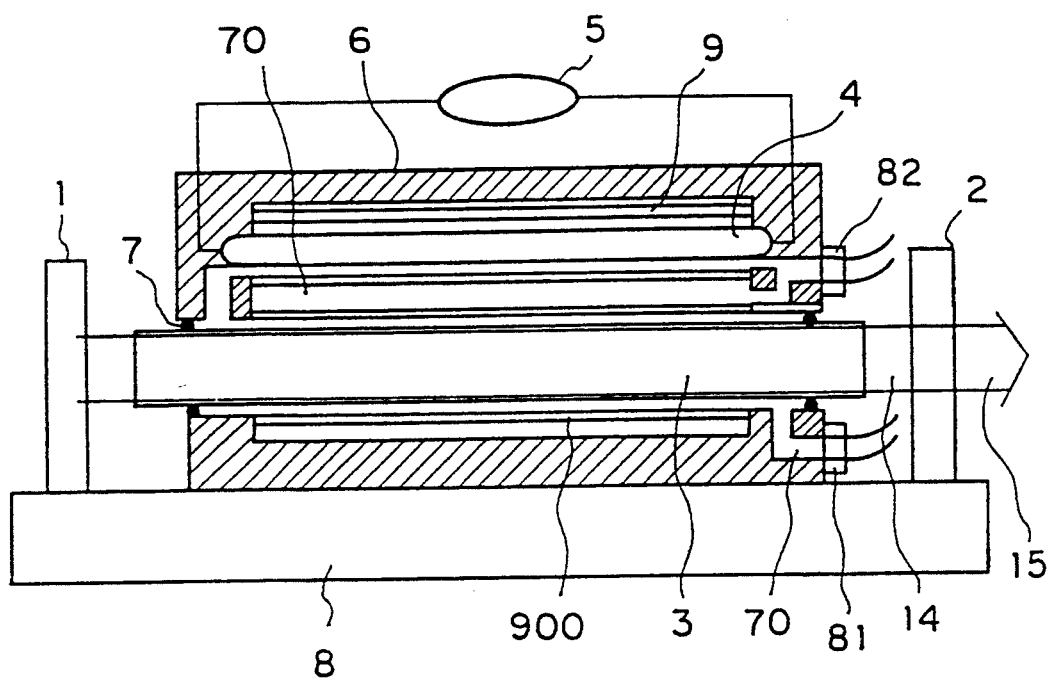
FIG. 1(a) is a cross-sectional view of a conventional laser apparatus.
FIG. 1(b) is a midship sectional view of the conventional laser apparatus.
Figure 1:
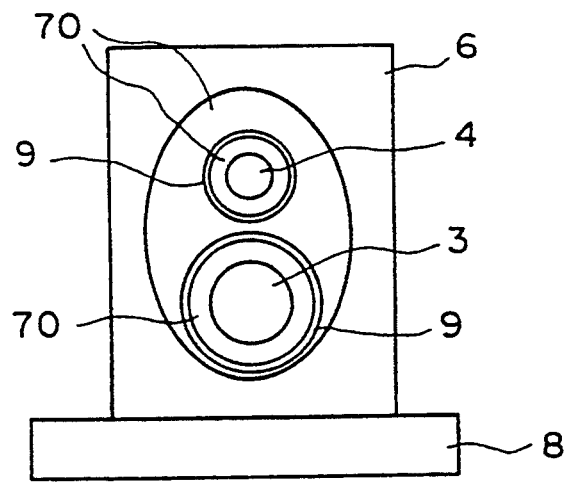

Preferred embodiments of the invention will now be described in detail referring to the accompanying drawings.

Embodiment 1

FIG. 3(a) and (b) are sectional views showing the embodiment 1 of the present invention. In FIGS. 3(a) and (b), component parts identified by reference numerals 2, 4, 5, 7, 8, 9, 14, 15, 70, 81 and 82 are the same as those in a conventional apparatus shown in FIG. 1(a) and (b), and descriptions thereof are omitted.

In FIG. 3(a) and (b), reference numeral 11 means a reflection mirror, 12 means a lens, 13a and 13b are respectively moving stages to move the reflection mirror 11 and the lens 12 back and forth with respect to a solid state component, 300 is the solid state component having a rough surface, 6 is a condenser having a diffuse reflecting surface as an inner surface thereof, and 9 is a transparent glass cylindrical pipe.

In a solid state laser apparatus provided as set forth above, the light source 4 and the solid state component 300 having the rough surface are disposed on a focal point of a condenser having an elliptical section. The light source 4 is turned ON by the power source 5 to emit light, and the solid state component 300 is irradiated with the emitted light. Thus, the solid state component is excited by the emitted light to become a laser medium. Spontaneous emission light is generated from the laser medium, and is amplified during reciprocation in a resonator including the mirrors 2, 11 and the lens 12. When the spontaneous emission light has a predetermined magnitude or more, the light is externally emitted as the laser beam 15 having good directivity.

A stable type resonator including the mirrors 2, 11 and the lens 12 generates a laser beam having a substantially uniform intensity distribution in a section of the solid state component.

The light source 4 and the solid state component 300 are introduced from the inflow opening 81. The solid state component 300 is peripherally cooled by the cooling medium 70 which is circulated through the cylindrical pipe 9 around the light source 4 and the solid state component 300. Temperature of the cooling medium 70 increases by cooling the solid state component 300 and the light source 4, and the cooling medium 70 is externally discharged from the outflow opening 82.

Further, ends of the solid state component are sealed by the seal material 7 from the cooling medium.

Figure 2:
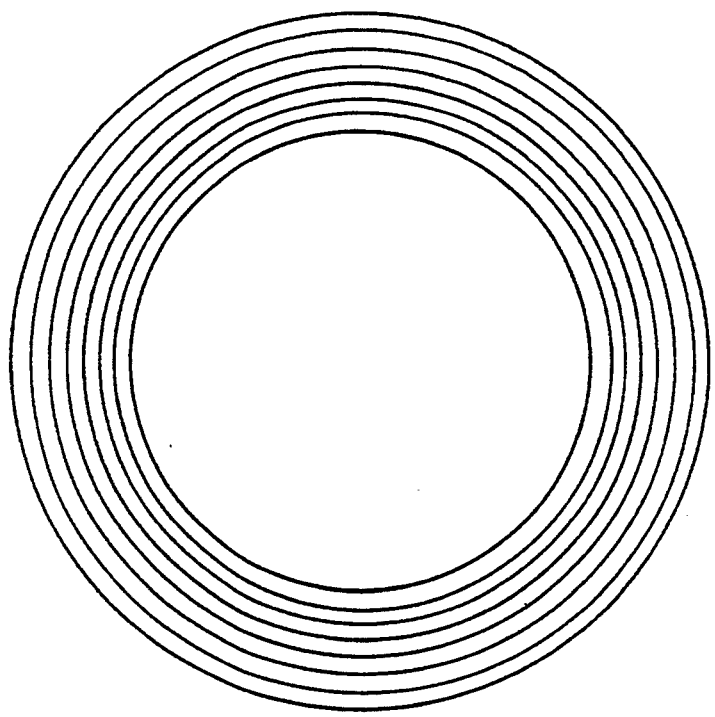
FIG. 2 is an explanatory view of an operation of the conventional laser apparatus.

An additional description will now be given of an effect of the solid state component 300 having the rough surface. The light from the light source is peripherally incident on the solid state component 300 to generate an excitation distribution in the section, that is, a heat lens distribution in the section of the solid state component 300 as shown in FIG. 2 as the experimental results. As a result, the laser beam passes with wave front aberration. "Heat lens" as used herein means that an inhomogeneous distribution is generated in refractive index due to a temperature distribution in the solid state component, and the solid state component serves as a lens.

Figure 4:
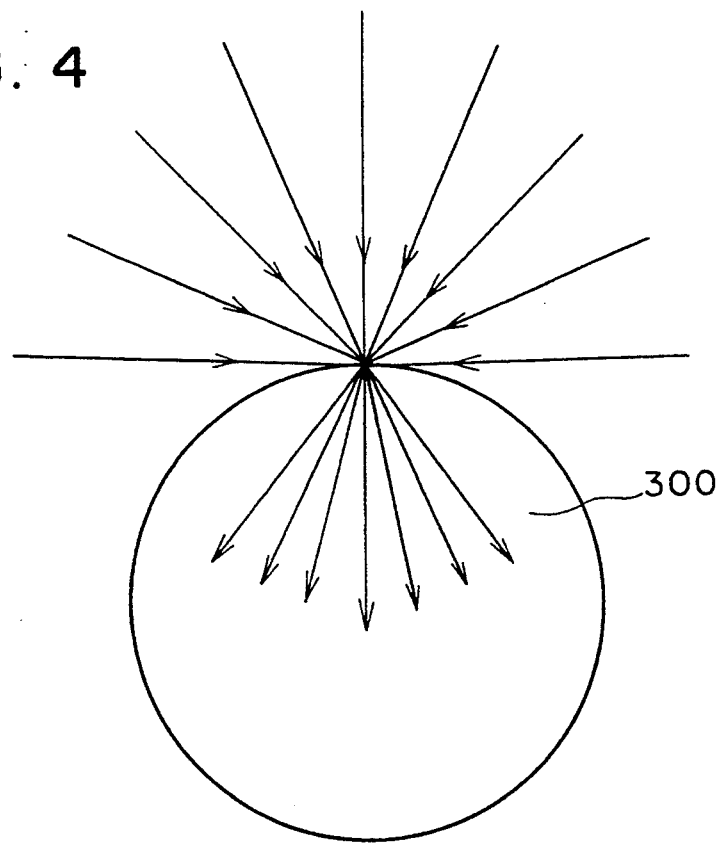
FIG. 4 is an explanatory view of an operation of a laser apparatus according to the embodiment 1 of the present invention.

The inventor assumed that this is because the solid state component 300 does not have sufficient surface roughness, and the light is deflected on the surface as shown in FIG. 4.

In order to overcome the drawback, the solid state component may have a more rough surface, and a component scattered on the surface of the solid state component may be more increased than a component deflected thereon in the light so as to eliminate .the heat lens distribution in the section due to a reflecting action. As a result it is an object of the present invention to provide a solid state laser apparatus which can pass a laser beam without the wave front aberration of the laser beam.

Figure 5:
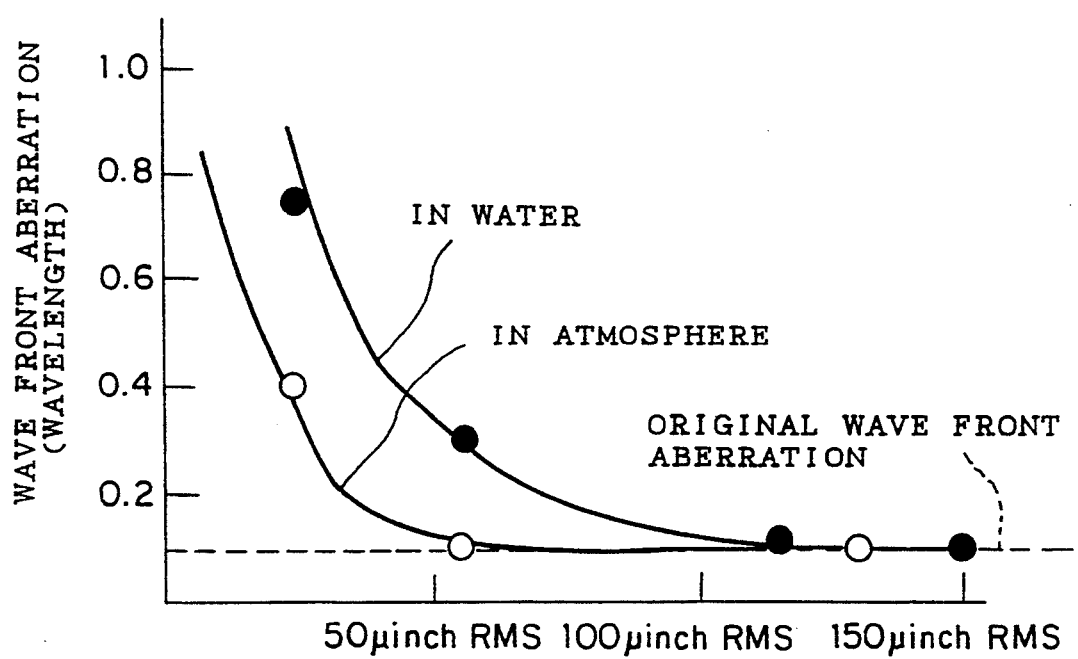
FIG. 5 is an explanatory view of the operation of the laser apparatus according to the embodiment 1 of the present invention.

FIG. 5 shows the results of an experiment in which the wave front aberration of the solid state component due to the heat lens distribution is measured by varying the surface roughness of the solid state component. The experimental results are shown to compare two cases, that is, one case where Nd:YAG ($T_3Al_5O_{12}$) rod having refractive index of 1.82 serving as the solid state component was peripherally cooled by water having refractive index of 1.3, and the other case where the Nd:YAG rod was disposed in atmosphere.

In the experiment, the Nd:YAG rod was excited by an arc lamp light source in water, and HeNe laser beam passed through the Nd:YAG rod in an axial direction. The maximum value of aberration in the section of the emitted laser beam was measured, and is shown in FIG. 5.

It can be seen that the wave front aberration due to the excitation distribution can be substantially reduced to a threshold value inherent in the solid state component if the surface roughness is set to 50 $\mu$inch RMS or more when the solid state component is disposed in the atmosphere.

In the conventional solid state component which is commercially available, the surface finish is set to a range from a polished and transparent condition to roughness of 50 $\mu$inch RMS in actuality. Because, it is necessary to avoid parasitic oscillation with a side surface of the solid state component as an optical path, or improve uniformity of optical intensity distribution in a circumferential direction, which is the same object as that of the prior art. It has been known that these objects can be achieved by the solid state component having the surface roughness of 20 to 50 $\mu$inch RMS in which the surface can be visually seen like a ground glass.

However, in case the solid state component was peripherally cooled so as to generate a high power laser beam, it was proved that the surface roughness should be set to a value several times a value in case the solid state component is disposed in the atmosphere, for example, a value of 130 $\mu$inch RMS or more before the wave front aberration of transmission in the section of the solid state component can be reduced to substantially aberration inherent in the solid state component.

This is possibly because water has higher refractive index than that of the atmosphere, and therefore a difference of refractive indexes of the solid state component and the peripheral medium thereof decreases, resulting in reduction of scattering effect on the surface.

A second experiment was performed in order to obtain the validity of the above assumption that the wave front aberration is decreased due to increase of the scattering effect on the surface.

Figure 6:
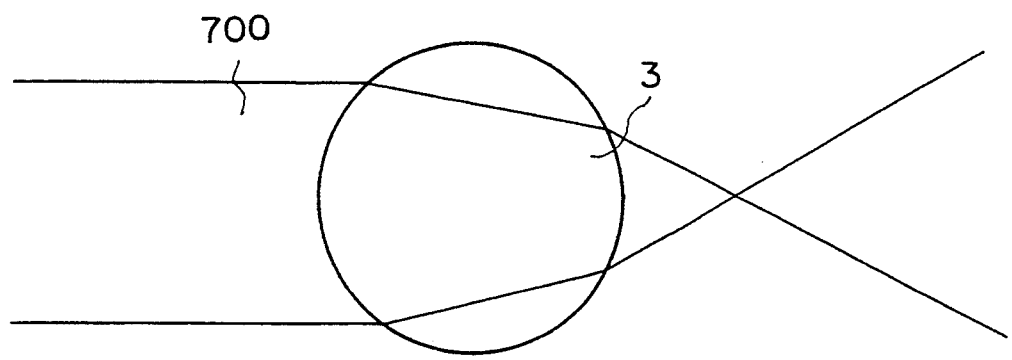
FIG. 6 is an explanatory view of the operation of the laser apparatus according to the embodiment 1 of the present invention.

In the experiment, the solid state component was irradiated with collimated HeNe laser beam 700 from the side surface of the solid state component without the excitation by the light source according to a construction as shown in FIG. 6. Thus, a propagation condition of the light in the section of the solid state component was observed.

Figure 7:
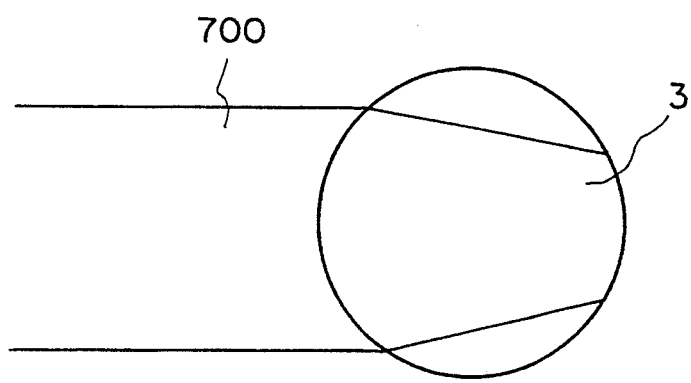
FIG. 7(a) and (b) are explanatory views of the operation of the laser apparatus according to the embodiment 1 of the present invention.
Figure 7:
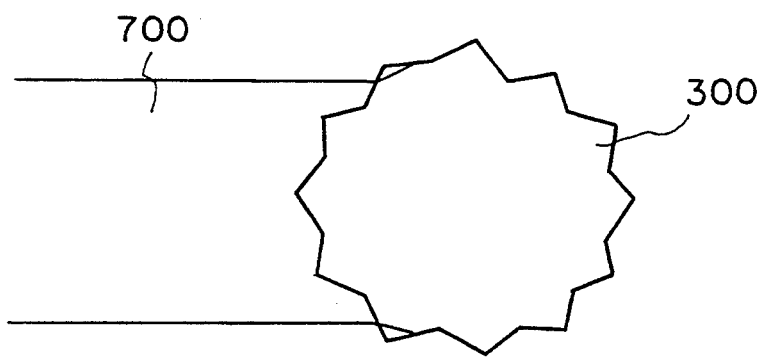

Since the Nd:YAG rod is provided in a cylindrical form, the HeNe laser beam 700 is condensed and concurrently travels in a section of the rod as shown in FIG. 7(a) in case the light is deflected on the surface thereof. However, when the solid state component has a more rough surface so as to increase the scattering, the HeNe laser beam travelling in a diffused fashion in the section as shown in FIG. 7(b) should be observed instead of the laser beam travelling in a condensed fashion.

In the experiment, a diffused condition as shown in FIG. 7(b) was observed in a condition of the surface roughness of 50 $\mu$inch RMS in the atmosphere. However, in case the solid. state component is disposed in water, the condition as shown in FIG. 7(a) was observed in the condition of the surface roughness of 50 $\mu$inch RMS. Further, the degree of the surface roughness should be increased so as to provide the surface roughness of 100 $\mu$inch RMS or more before the laser beam travelling in the diffused fashion as shown in FIG. 7(b) could be substantially completely observed.

The experimental results can provide the validity of the following assumption which is proposed as a cause of the results of the excitation experiment by the light source: "this is possibly because water has higher refractive index than that of the atmosphere, and therefore a difference of refractive indexes of the solid state component and the peripheral medium thereof decreases, resulting in reduction of scattering effect on the surface." Therefore, it was proven that the solid state component must have the surface roughness of 100 to 130 $\mu$inch RMS or more which is twice or more ordinary surface roughness before the wave front aberration of transmission in the section of the solid state component can be reduced to substantially the aberration inherent in the solid state component.

The scattering action on the surface of the solid state component can be possibly defined by a ratio of the refractive index of the solid state component to the refractive index of the peripheral cooling medium. Therefore, the experimental results may be applied to the cooling medium containing water as a major component, and the solid state component having refractive index of about 1.8 or less such as a solid state component containing $LiYF_4$, $Al_2O_3$, $BeAl_2O_4$, glass, $LiSrAlF_6$, $LiCaAlF_6$ as major components.

Further, the surface roughness may be applied to only a location where the light of the light source reaches. For example, a contacting portion of the seal material 7 at the end may have no surface roughness in an alternative embodiment.

In this case, a contact area of the seal material to the solid state component increases so that the cooling medium 70 can be stably sealed.

In addition, there is another method to equalize integral values in the intensity distribution of the section by axially varying the degree of the surface roughness corresponding to the intensity distribution of the laser beam.

Figure 3:
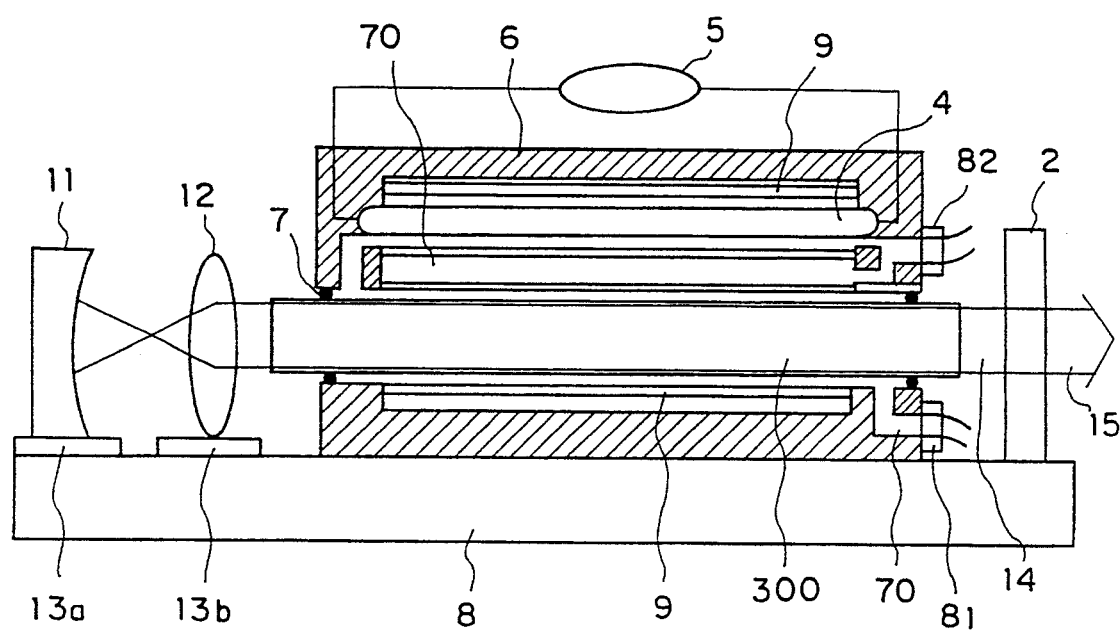
FIG. 3(a) is a cross-sectional view showing the embodiment 1 of the present invention.
FIG. 3(b) is a midship sectional view showing the embodiment 1 of the present invention.
Figure 3:
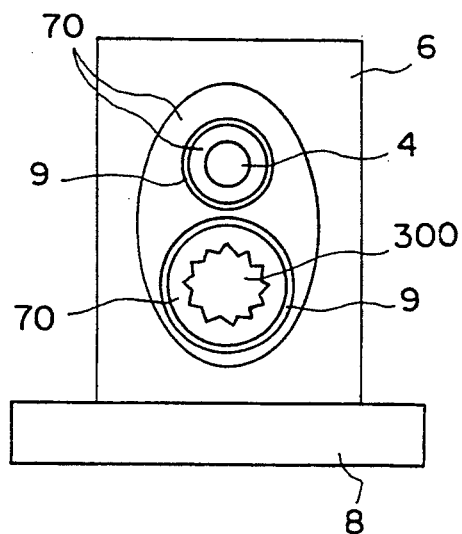

An additional description will now be given of the optical system to introduce the light of the light source into the solid state component as shown in FIG. 3.

Increasing the surface roughness of the solid state component typically decreases efficiency of laser oscillation. This is because partial light introduced into a peripheral portion of the solid state component is backward scattered on the rough surface, resulting in loss of the partial light.

In order to avoid the decreased efficiency, the condenser 6 is employed to confine the light from the light source in the embodiment shown in FIG. 3. In the configuration, the light is backward scattered on the surface of the solid state component, and is again reflected by the condenser and is reintroduced into the solid state component so as to excite the solid state component. Therefore, it is possible to prevent the laser oscillation efficiency from decreasing due to the surface roughness of the solid state component unlike the prior art.

Further, in the embodiment shown in FIG. 3, the condenser 6 is provided with the diffuse reflecting surface as the inner surface thereof. In the prior art reflecting type of condenser, the light source 4 and the solid state component 300 are disposed on a focal point of the condenser having the elliptical section.

In this case, the light from the light source passing through the solid state component without absorption passes through the focal point of the ellipse. Accordingly, the light can be incident on the solid state component again so as to excite the solid state component after the reflection is repeated 3 or 4 times in the condenser.

However, the light from the light source scattered on the surface of the solid state component may have a different travelling direction depending upon the scattering so that the light can not pass through the focal point of the ellipse. Hence, it is necessary to repeat reciprocation of the reflection a large number of times for the light incident on the solid state component again. Since reflectance of a reflecting surface is finite, the quantity of light decreases every reflection. As a result, almost the scattered light is finally absorbed by the reflecting inner surface before it is introduced into the solid state component.

In the embodiment as shown in FIG. 3, since the diffuse reflecting surface is provided as the inner surface, the light scattered on the surface of the solid state component is diffused and reflected on the inner surface of the condenser, and at least a part of the light is introduced into the solid state component every time so as to excite the solid state component.

Subsequently, light intensity is equalized in the condenser.

Thus, it is possible to relax the reduction of the laser oscillation efficiency which has been conventionally observed due to the surface roughness of the solid state component.

According to the results of the experiment employing the Nd:YAG rod and the arc lamp, no variation was observed in an oscillation characteristic in an experimental accuracy in actuality even when the surface roughness of the solid state component was varied in a range from 50 to 200 $\mu$inch RMS.

Further, in the embodiment shown in FIG. 3, there is employed a heat lens correcting optical system including the total reflection mirror 11 and the condensing lens 12 instead of the conventional total reflection mirror 1. A description will now be given of the optical system.

Even if the total reflection mirror 1 is employed as in the conventional embodiment, it is possible to provide the laser beam 15 having more excellent beam quality because of the solid state component having decreased wave front aberration. However, variation in output of the light source changes power of a heat lens of the solid state component, and thereby the quality of the laser beam 15 slightly changes. The optical system including the total reflection mirror 11 and the condensing lens 12 is inserted so as to cancel the change.

The total reflection mirror 11 and the condensing lens 12 are disposed at positions to satisfy an image transferring condition. For example, it is assumed that R is curvature of the total reflection mirror, f is a focal length of the condensing lens, and L (=R+f) is a distance between the total reflection mirror and the condensing lens. At this time, an image at a position which is apart from a front surface of the condensing lens by L can be transferred by the reflection.

In this case, the optical system can equivalently serve as the reflection mirror having lower curvature if the distance between the total reflection mirror and the condensing lens is varied by a fine amount by, for example, the stage 13a or the stage 13b.

Figure 8:
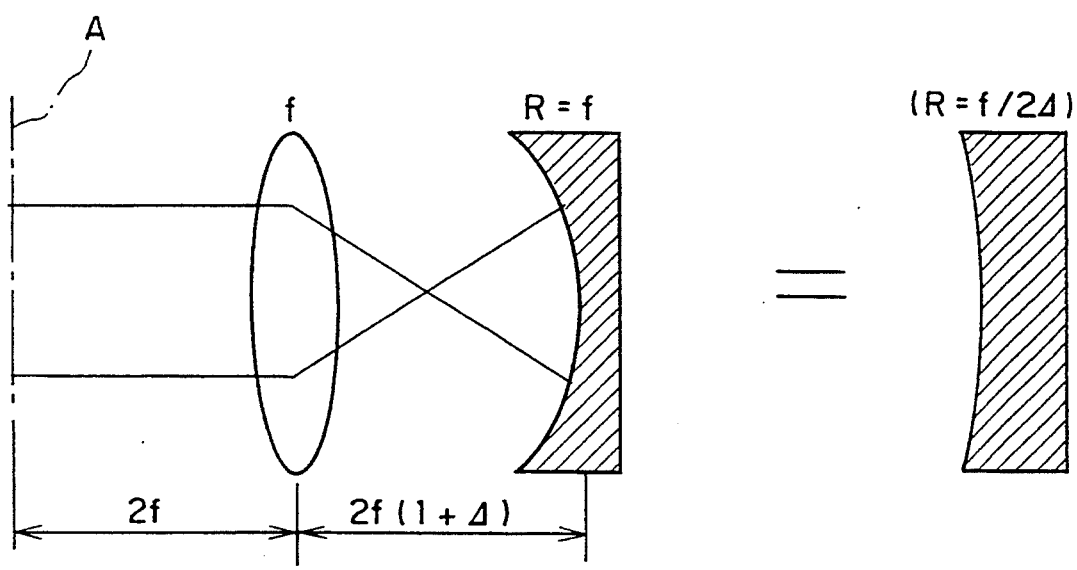
FIG. 8 is an explanatory view of the operation of the laser apparatus according to the embodiment 1 of the present invention.

That is, the image transferring optical system shown in the left-hand diagram of FIG. 8 is equivalent to a state where a mirror having curvature shown in the right-hand diagram of FIG. 8 is disposed at a position A in the left-hand diagram of FIG. 8. For this, the optical system will be hereinafter referred to as image transferring variable curvature mirror.

A radius of curvature of the variable curvature mirror is proportional to an inverse number of a deviation amount from a basic distance to satisfy the image transferring condition between the lens and the reflection mirror as shown in the right-hand diagram of FIG. 8. Consequently, the radius of curvature is largely changed from that of a plane due to the fine variation in the distance.

Figure 9:
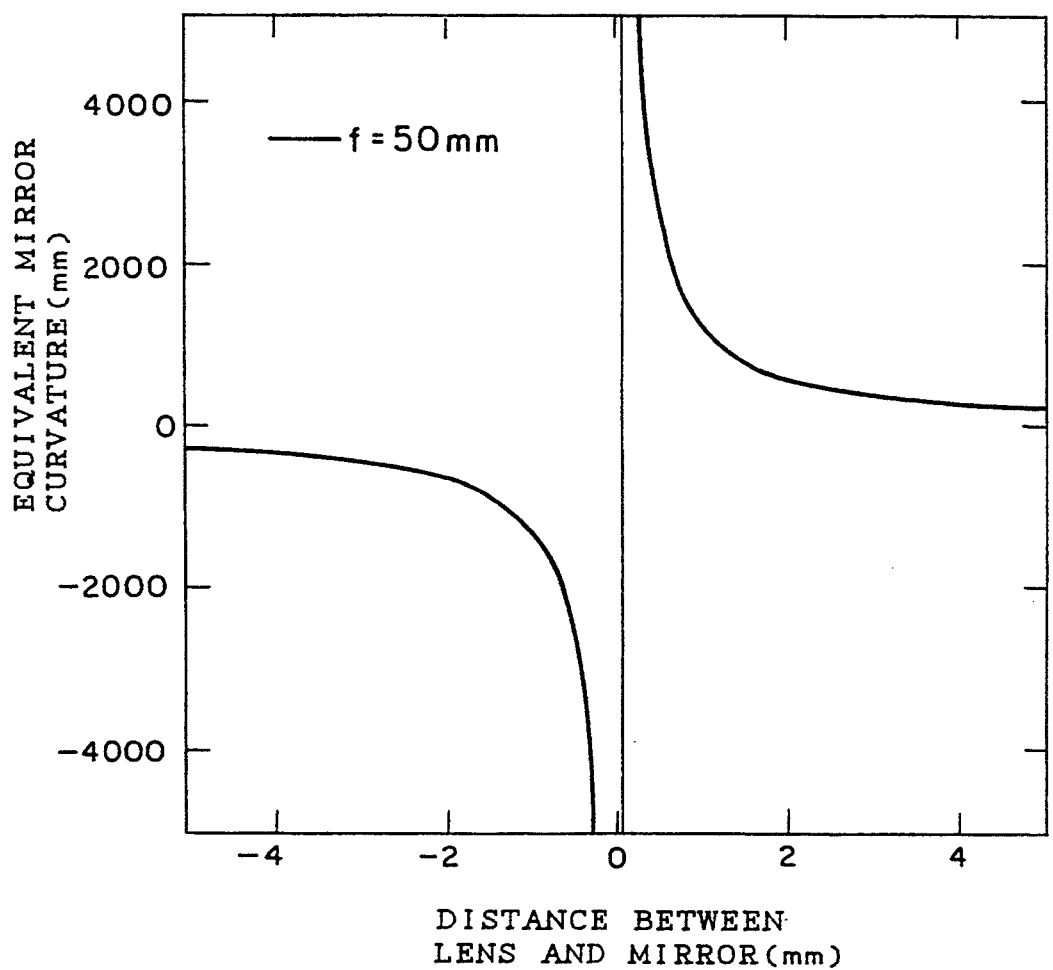
FIG. 9 is an explanatory view of the operation of the laser apparatus according to the embodiment 1 of the present invention.

FIG. 9 shows a relationship between a distance between the lens and the mirror, and a radius of curvature of an equivalent mirror. It can be seen that the equivalent curvature can change in good response to the fine variation in the distance, and the radius of curvature can be largely varied in a range from infinity to about 2 m by variation of a fine distance of 0.5 mm since the image transferring optical system is employed.

In FIG. 3, the image transferring optical system including the total reflection mirror 11 and the condensing lens 12 can perform the same operation as that of the variable curvature mirror disposed in the solid state component. That is, it is possible to cancel the heat lens of the solid state component in a vicinity of a position where the heat lens occurs.

The heat lens of the solid state component varies according to variation in making power of the power source to the light source. The distance between the total reflection mirror 11 and the condensing lens 12 is varied by the fine amount by the stages 13a or 13b so as to vary the equivalent curvature of the image transferring optical system, resulting in canceling the variation in the heat lens. In this way, it is possible to generate a laser beam having uniform beam quality irrespective of the variation in the heat lens of the solid state component.

In particular, in the embodiment shown in FIG. 3, the power of the heat lens of the solid state component is substantially constant in the section because of an action of the rough surface. Accordingly, there is little aberration so that the heat lens can be corrected over the entire section by the image transferring optical system. As a result, it is possible to efficiently generate a high power and high quality laser beam from the entire section of the solid state component.

Figure 10:
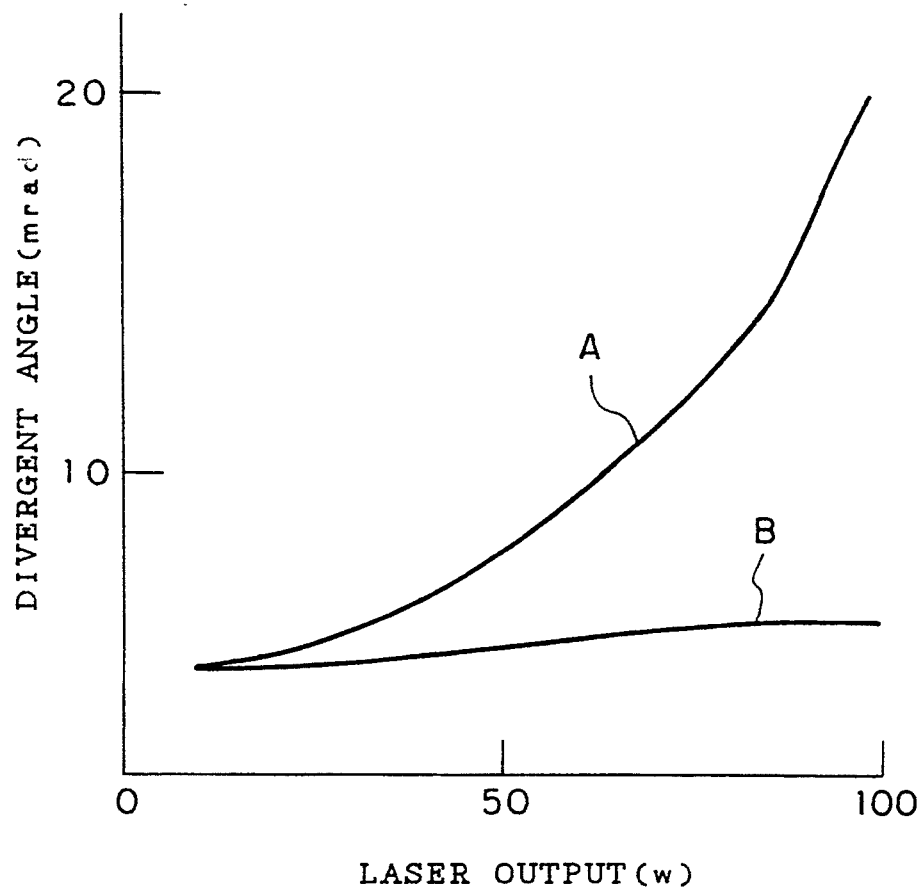
FIG. 10 is an explanatory view of the operation of the laser apparatus according to the embodiment 1 of the present invention.

FIG. 10 shows experimental results of measurement of a divergent angle serving as an index of the beam quality as a function of laser output in case the Nd:YAG is employed as the solid state component. In FIG. 10, the line A indicates the conventional embodiment in which the heat lens is not compensated, and the line B indicates a case where the heat lens is compensated by the image transferring optical system. The divergent angle hardly depends upon the laser output because of the compensation for the heat lens.

It must be noted that the image transferring optical system should not be limited to the combination of the reflection mirror and the lens. It is possible to employ any optical system having optical curvature, and serving such that the optical system can be equivalently regarded as an optical system disposed in the vicinity of the solid state component. Thus, there are available modifications as shown in FIGS. 11 and 12.

FIG. 11 shows modifications such as the image transferring optical system employing the reflection mirrors 11 instead of the lens 12. As seen from these modifications, the image transferring optical system should not be limited to the combination of the reflection mirrors and lens as shown in FIG. 3, and in brief, a plurality of optical systems only have to be combined and used so as to satisfy the image transferring condition.

Figure 12:
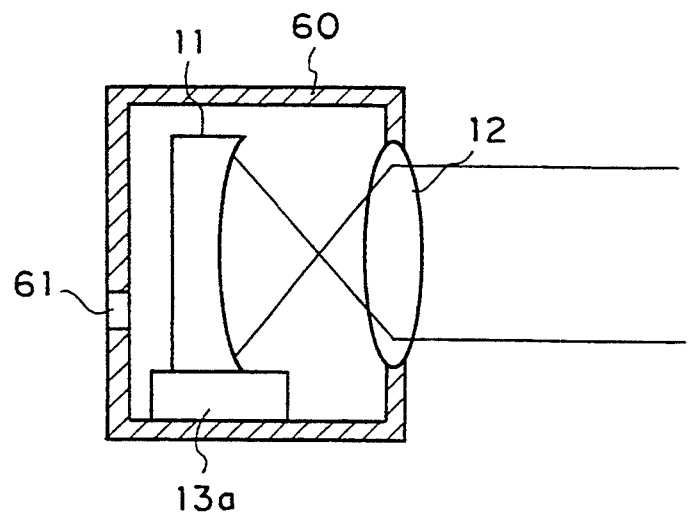
FIG. 12 is a diagram showing another modification of the embodiment 1.

In FIG. 12, an optical system including a combination of the total reflection mirror 11 and the condensing lens 12 is accommodated in a housing 60. Hence, it is possible to avoid dust contamination in the atmosphere, and degradation of quality of the laser beam due to ambient atmosphere locally heated by dust heated on the focal point in the optical system.

According to the embodiment as shown in FIG. 12, an exhaust hole 61 is further provided so as to decrease pressure in the housing 60.

In this way, the high quality laser beam 14 generated because of the solid state component 300 having the rough surface is condensed into a small spot between the total reflection mirror 11 and the condensing lens 12. As a result, it is possible to avoid occurrence of air break.

Embodiment 2

In an embodiment shown in FIGS. 13(a) and (b), there is provided an unstable type resonator employing an enlarged reflection mirror 16, the total reflection mirror 11 and the condensing lens 12 instead of a partial reflection mirror.

The unstable type resonator causes a laser beam having more uniform intensity distribution because of a diffraction effect thereof than that in case of the stable type resonator.

Figure 14:
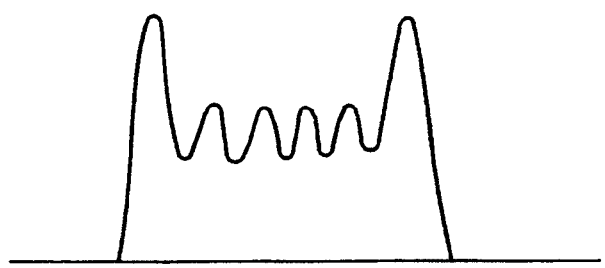
FIG. 14(a) and (b) are respectively explanatory views of the operation of the laser apparatus according to the embodiment 2 of the present invention.
Figure 14:

For the purpose of comparison, FIGS. 14(a) and (b) show intensity distributions of the laser beam in the solid state component which are obtained in two cases, that is, one case where the stable type resonator is used (FIG. 14(a)), and the other case where the unstable type resonator is used (FIG. 14(b)).

Since the laser beam has a uniform sectional configuration, the uniform laser beam can uniformly heat the solid state component even in a high power area in which the laser beam is partially absorbed in the solid state component so as to internally heat the solid state component. Accordingly, a laser medium is generated by uniformly exciting the inside of the section, and uniformity of the laser medium is not disturbed because of the surface roughness of the solid state component. As a result, it is possible to maintain quality of the laser beam even in the high power area.

In the embodiment shown in FIGS. 13(a) and (b), there is also shown an image transferring optical system including a combination of the total reflection mirror 11 and the condensing lens 12.

In the laser employing the unstable type resonator, a laser beam derived from the resonator has wave front curvature which varies depending upon the heat lens action of the solid state component disposed in the resonator. Therefore, if the variation in the wave front curvature is stabilized by using the image transferring optical system, it is possible to provide a laser beam with a stable external propagation condition.

Embodiment 3

In an embodiment shown in FIGS. 15(a) and (b), there is provided a resonator including an enlarged exit mirror 25 instead of the enlarged reflection mirror 16 in the embodiment 2, the total reflection mirror 11, and the condensing lens 12. The enlarged exit mirror 25 includes a partial reflection mirror 26 at an intermediate portion and a non-reflecting portion 27 at a peripheral portion of the intermediate portion.

Figure 16:
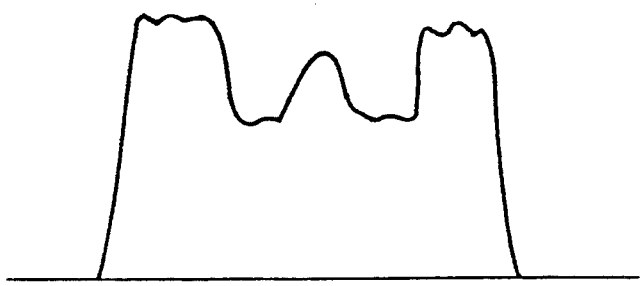
FIG. 16 is an explanatory view of the operation of the laser apparatus according to the embodiment 3 of the present invention.

In the configuration, it is possible to internally provide a laser beam having the intensity distribution having substantially the same shape as that shown in FIG. 12. Besides, it is possible to externally provide a solid type laser beam (including a completely solid center beam) as shown in FIG. 16, that is, a laser beam having a good condensing performance.

As compared with the embodiment 2, it is therefore possible to reduce intensity of a laser beam 28 required to provide the same condensing performance, and reduce the quantity of heat generated due to absorption of the laser beam by the solid state component. As a result, heat developed of the solid state component can be reduced so as to stably generate a high quality laser beam even in the high power area.

Embodiment 4

Figures 17A, 17B:
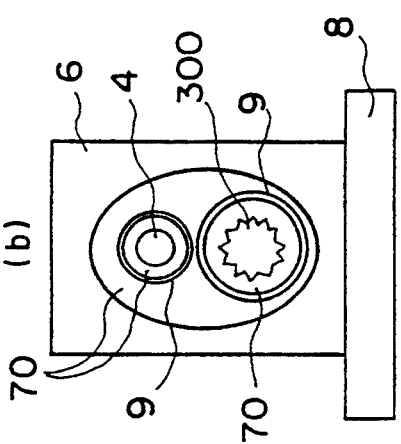
FIG. 17(a) and (b) are a cross-sectional view and a midship sectional view showing the embodiment 4 of the present invention, respectively.

In an embodiment shown in FIGS. 17(a) and (b), in addition to structures in the embodiment 3, a phase difference between a laser beam passing through the intermediate partial reflection mirror 26 and a laser beam passing through the peripheral non-reflecting portion 27 is canceled by providing the partial reflection mirror 26 having a thickness several times a normal thickness, or by a step 35 provided in an outer surface of the mirror as shown in FIGS. 18(a), (b). It is thereby possible to provide a solid type laser beam having uniform phase.

In this way, a condensing performance of the laser beam can be further improved. Consequently, it is possible to reduce intensity of a laser beam 7 required to provide the same condensing performance lower than that in case of the embodiment 3, and reduce the quantity of heat generated due to absorption of the laser beam by the solid state component. As a result, it is possible to reduce heat developed of the solid state component so as to stably generate a high quality laser beam even in high power area.

Embodiment 5

Figure 19:
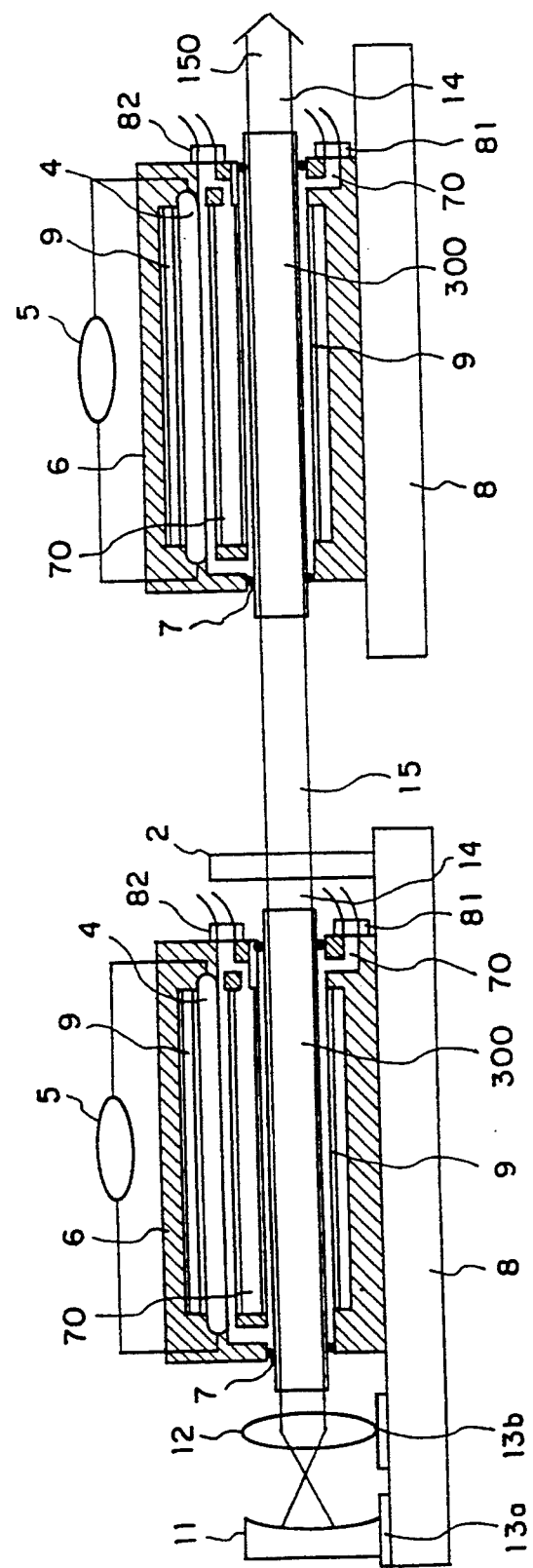
FIG. 19 is a cross-sectional view showing the embodiment 5 of the present invention.

In an embodiment shown in FIG. 19, a solid state component having a rough surface is excited so as to be a laser medium, and the solid state component is employed as an amplifier for a laser beam.

In FIG. 19, while a laser apparatus serving as an oscillator on the left side is the same as that shown in FIGS. 3(a) and (b), a laser apparatus serving as the amplifier on the right side is not provided with the resonator, and amplifies the laser beam 15 generated from the laser apparatus on the left side so as to externally generate it as a laser beam 150.

Such a combination of the oscillator and the amplifier causes a high power laser beam, and is effective in particular when the light source 4 excites the solid state component 300 in a pulse fashion.

The laser beam 15 can be amplified without aberration in the section because of the solid state component having the rough surface. That is, the laser beam 15 is high powered with constant beam quality, and can be derived as the laser beam 150.

Though the embodiment has been described with reference to the solid state laser apparatus employing the laser resonator shown in FIG. 1, it is possible to provide the same effect in case any one of the solid state laser apparatus as disclosed in the embodiments 2, 3 and 4 is employed.

Embodiment 6

Figure 20:
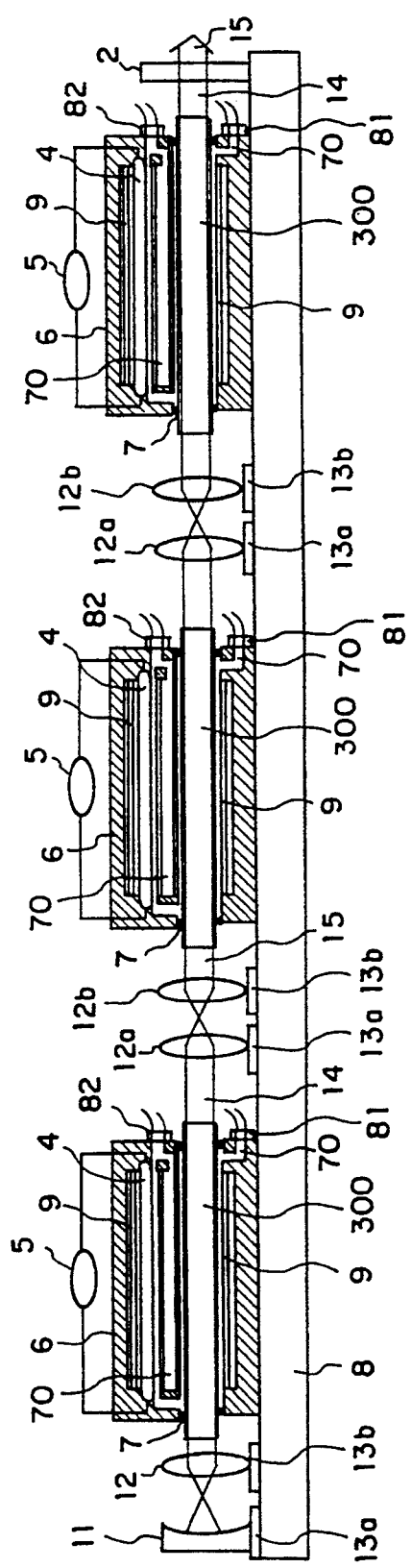
FIG. 20 is a cross-sectional view showing the embodiment 6 of the present invention.

In an embodiment shown in FIG. 20, a plurality of solid state components 300 are disposed in a direction of an optical axis. In this way, a laser medium can be elongatedly extended so as to realize a high power laser output.

It is difficult to combine the plurality of solid state components when the respective solid state components have aberration. Therefore, it has been generally necessary to select the solid state component such that the aberration of the plurality of solid state components can partially cancel one other.

In the embodiment, there is only small aberration in the section of the solid state component because of the surface roughness of the solid state component so That the elongated laser medium can be provided by combining the plurality of solid state components without the selection from the solid state components. Use of the laser medium allows to generate the high power laser beam at low cost.

In the embodiment 6 shown in FIG. 20, lenses 12a and 12b are employed as a heat lens correcting optical system including a transmission type of image transferring optical system which can be operated as in the variable curvature mirror shown in FIG. 8. The lenses 12a and 12b are inserted between the plurality of solid state components so as to correct the heat lens of the solid state component. Thus, it is possible to provide slight focusing action or slight divergence action by adjusting a space between two lenses 12a and 12b.

Since the respective solid state components have little aberration, it is possible to easily correct the heat lens of the solid state component by inserting the lens between the respective solid state components.

As shown in FIG. 20, the condensing lens 12 is disposed on the stage 13b, and distances between the respective lenses are varied corresponding to output from the exciting light sources 4, that is, corresponding to magnitude of the heat lenses of the solid state components 300. As a result, it is possible to control such that the plurality of solid state components 300 can have constant effects on the laser beam passing through the plurality of solid state components 300 irrespective of the output of the light source, that is, the generated laser output.

Though the embodiment has been described with reference to the solid state laser apparatus employing the laser resonator shown in the embodiment 1, it is possible to provide the same effect in case any one of the solid state laser apparatus as disclosed in the embodiments 2, 3 and 4 is employed.

Embodiment 7

Figure 21:
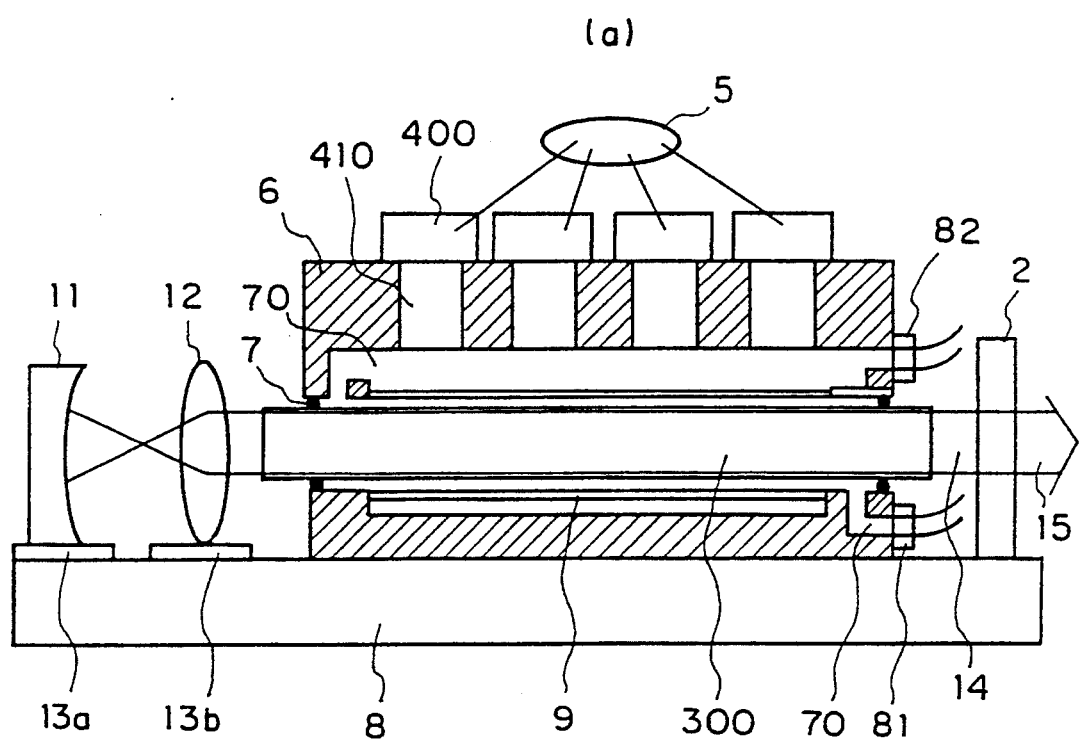
FIG. 21(a) and (b) are a cross-sectional view and a midship sectional view showing the embodiment 7 of the present invention, respectively.
Figure 21:
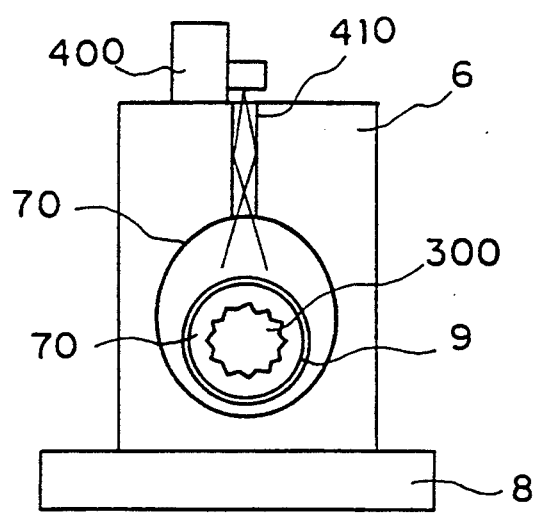

In an embodiment shown in FIGS. 21(a) and (b), a semiconductor laser 400 is employed as the light source 4. If there is used a semiconductor laser having a shorter wavelength similar to that of a laser beam when the semiconductor laser is employed as the light source, it is possible to reduce a rate of heat absorption by the solid state component lower than that in case where a lamp is employed as the light source. In FIGS. 21(a) and (b), reference numeral 410 means an optical component which is made of glass or the like to confine the light of the semiconductor so as to introduce it into the condenser 6.

Hence, it is possible to reduce the heat lens distribution in the section of the solid state component. Because of the solid state components having a rough surface in addition to the configuration, it is possible to reduce the heat lens distribution in the section of the solid state component lower than that in case where the lamp is employed as the light source in a test using the same laser output. As a result, it is possible to provide a high power and high quality laser beam.

Further, in case the semiconductor laser is employed, it is possible to adjust an excitation distribution in the section of the solid state component by varying the wavelength, and varying an absorption coefficient of semiconductor laser light into the solid state component.

For example, if the semiconductor laser is excited with a wavelength which is close to that of an absorption wavelength of the solid state component, the absorption coefficient of the solid state component. Consequently, the output from the light source can be considerably absorbed in a vicinity of the surface of the solid state component, resulting in formation of a strong excitation distribution in the vicinity of the surface.

In contrast with this, if the semiconductor laser is excited with a wavelength which is apart from that of the absorption wavelength of the solid state component, the output deeply passes through the solid state component, and is thereafter absorbed by the solid state component. As a result, there is a relatively intensive excitation distribution in a vicinity of an intermediate portion of the solid state component.

Thus, it is possible to adjust the excitation distribution by using the wavelength of the semiconductor laser while using the roughness of the surface of the solid state component.

Therefore, if the wavelength of the semiconductor laser serving as the light source is adjusted corresponding to a condition of the surface roughness of the solid state component, it is possible to provide the excitation distribution having intensity distribution with higher uniformity in the section of the solid state component, that is, a uniform laser medium and a laser medium without any aberration.

Though the embodiment has been described with reference to the solid state laser apparatus employing the laser resonator shown in the embodiment 1, it is possible to provide the same effect in case any one of the solid state laser apparatus as disclosed in the embodiments 2, 3 and 4 is employed.

Embodiment 8

Figure 22:
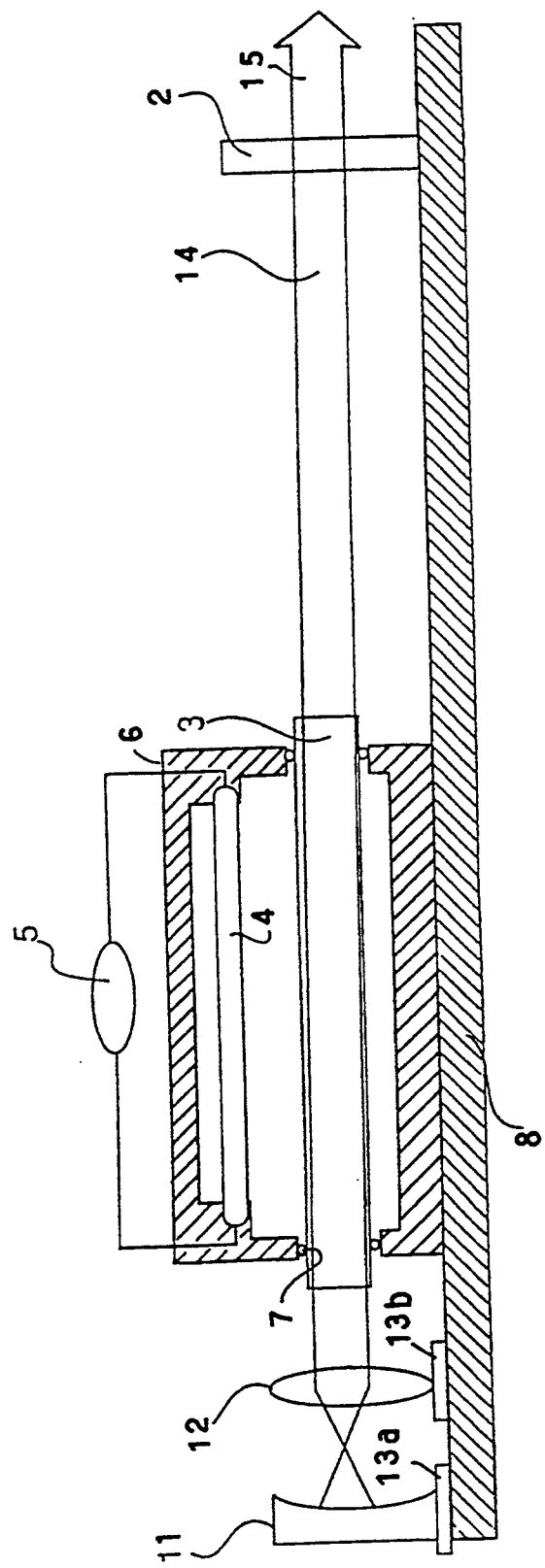
FIG. 22 is a sectional view of a solid state Laser apparatus according to the embodiment 8 of the present invention.

FIG. 22 is a sectional view showing a solid state laser apparatus according to the embodiment 8.

In FIG. 22, reference numeral 11 means a total reflection mirror having radius of curvature R, 12 means a condensing lens, 13a and 13b are respectively moving stages to move the reflection mirror 11 and the lens 12 back and forth with respect to the partial reflection mirror 2, 14 is a laser light generated in a laser resonator (including the total reflection mirror 11, the partial reflection mirror 2 and the condensing lens 12), and 15 is a laser beam emitted from the laser apparatus.

A description will now be given of the operation. Like the prior art solid state laser apparatus, the exciting light source 4 emit light by turning ON the power source 5, and the emitted light is condensed into the solid state component 3 by an action of the condenser 6 in a solid state laser apparatus in the embodiment. Subsequently, the solid state component 3 is excited by receiving the light of the light source 4 so as to generate the laser light 14. In the embodiment, the laser light 14 is amplified in the laser resonator including the total reflection mirror 11, the partial reflection mirror 2 and the condensing lens 12. Further, the laser light 14 is externally discharged by passing as the laser beam 15 through the partial reflection mirror 2 after the laser light 14 reaches a predetermined intensity.

A description will now be given of an image transferring optical system including the total reflection mirror 11 and the condensing lens 12, which is a subject matter of the invention. The image transferring optical system means an optical system in which light emitted from one point of the optical system is self-transferred by passing through the optical system, and a substantial optical propagated distance is equal to zero, in other words, an image transferring condition is satisfied. In the solid state laser apparatus of the invention, the total reflection mirror 11 and the condensing lens 12 are disposed at positions to firstly satisfy the image transferring condition. It is assumed that f is a focal length of the condensing lens 12, R (=f) is a radius of curvature of the total reflection mirror 11, and L (=R+f=2f) is a distance between the total reflection mirror and the condensing lens. In this case, an image at a position which is apart from a front surface of the condensing lens 12 by L passes through the condensing lens 12, and thereafter is transferred to an original position by the total reflection mirror 11. If the distance between the total reflection mirror and the condensing lens is varied by the stages 13a, 13b by the fine amount (=2Δf), the entire optical system can equivalently serve as a total reflection mirror having a radius of variable curvature R (=f/2Δ).

Figure 23:
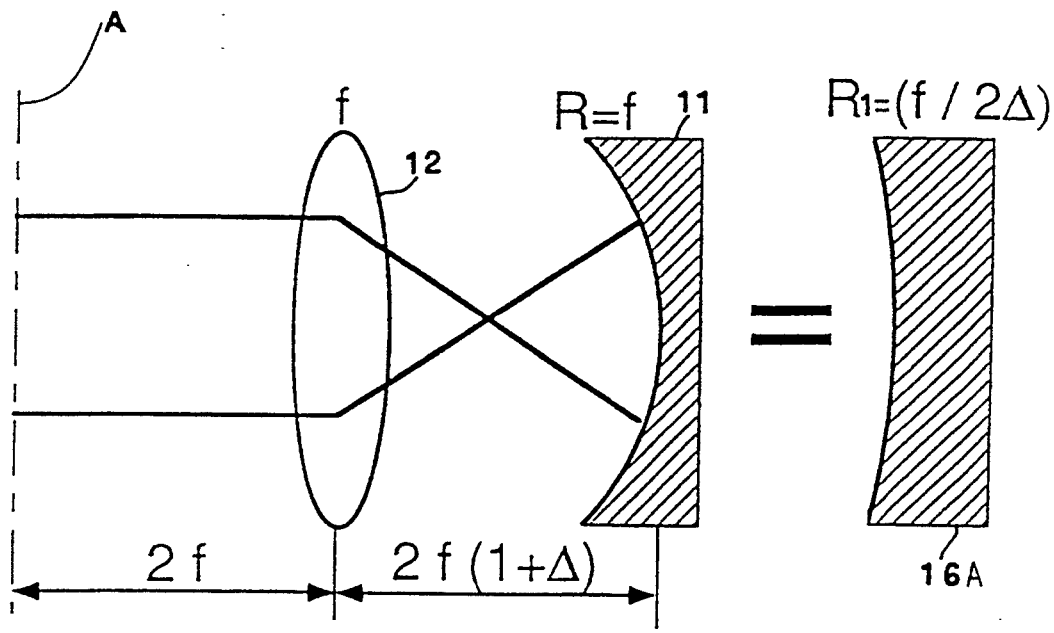
FIG. 23 is an explanatory view of an image transferring optical system in the solid state laser apparatus shown in FIG. 22.
Figure 25:
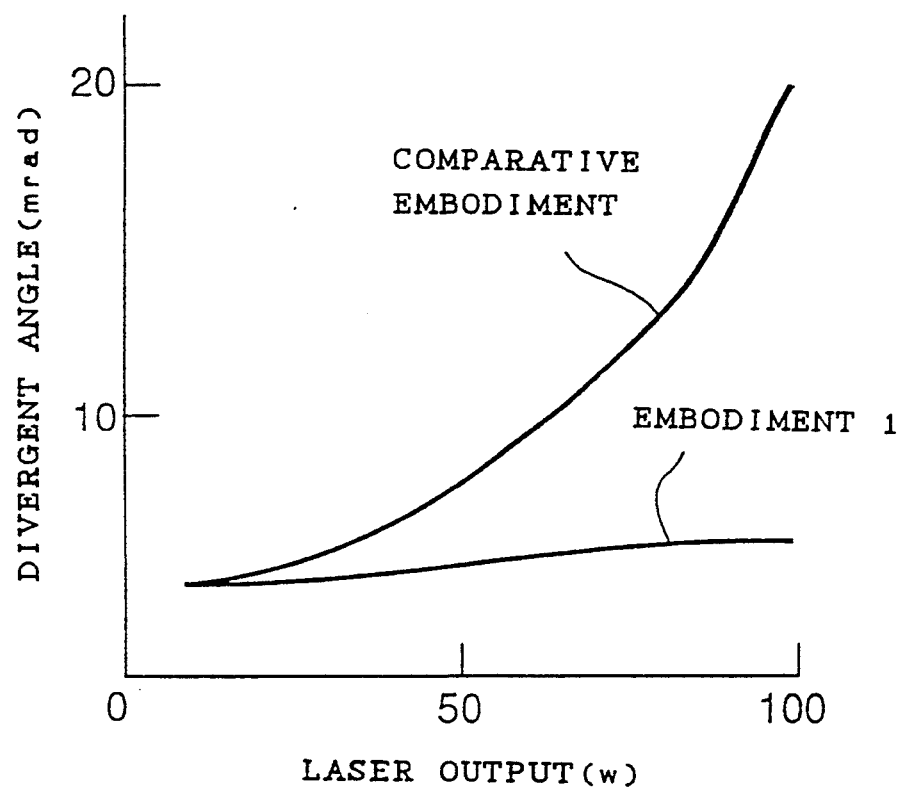
FIG. 25 is a graph diagram showing a difference between divergent angles of laser beams in the solid state laser apparatus of FIG. 22 and in a laser apparatus in which a heat lens action is not compensated.

Referring now to FIG. 23, in the image transferring optical system shown on the left-hand in FIG. 25, the condensing lens 12 (having the focal length f) and the total reflection mirror 11 (having the radius of curvature R [=f]) are disposed at an interval of 2f (1+Δ) which is obtained by extending the original distance of L (=2f) by 2Δf. The image transferring optical system is equivalent to a case where a total reflection mirror 16A with a radius of curvature $R_1$ (=f/2Δ) shown on the right-hand in FIG. 23 is disposed at a position marked A (which is apart from the front surface of the condensing lens 12 by L). Therefore, the image transferring optical system will be hereinafter referred to as image transferring variable curvature mirror, or reflecting variable curvature mirror. As set forth above, the radius of curvature $R_1$ of the image transferring variable curvature mirror 16A is proportional to an inverse number of 2Δ which is a deviation from a basic distance L between the condensing lens 12 and the total reflection mirror 11 to satisfy the image transferring condition. Accordingly, the image transferring variable curvature 16A is greatly different from the total reflection mirror 1 (which is a plane having infinite radius of curvature) in the prior art laser apparatus because of the fine amount of deviation.

Figure 24:
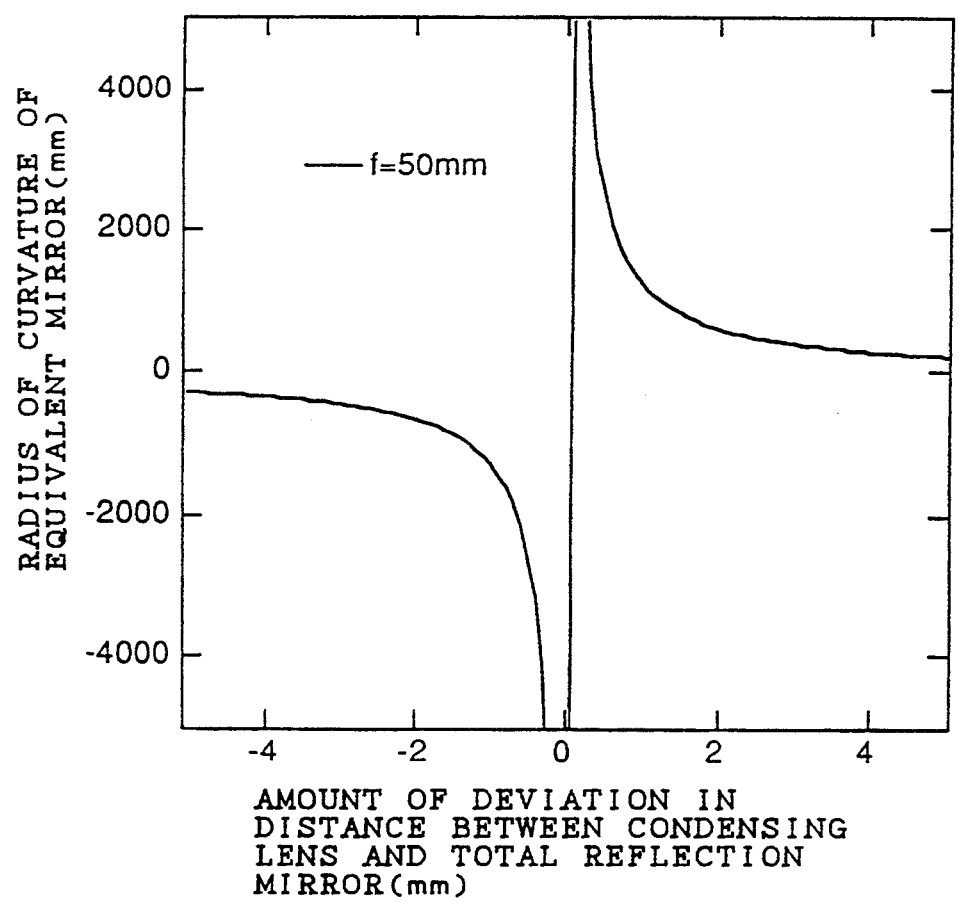
FIG. 24 is a graph diagram showing a relation between a distance between optical components in the image transferring optical system in FIG. 23 and a radius of curvature of the image transferring optical system.

FIG. 24 shows a relation between a distance between the condensing lens 12 (defined to have the focal length of f=50 mm) and the total reflection mirror 11, and the radius of curvature of the image transferring variable curvature mirror which is equivalent to the image transferring optical system. The radius of curvature of the equivalent mirror can be varied in good response to slight variation in the distance since the image transferring optical system can serve as a parent body of the equivalent mirror. For example, it can be seen that the radius of curvature can be largely varied in a range from infinity to about 2 m (2,000 mm) even if the amount of deviation 2Δf is slightly varied by 0.0005 mm.

Thus, the image transferring optical system including the total reflection mirror 11 and the condensing lens 12, and having the moving stages 13a, 13b in FIG. 22 can perform the same operation as that in the image transferring optical system having the reflecting variable curvature mirror disposed in the solid state component 3. That is, variation in the making power of the power source 5 changes intensity of exciting light from the exciting light source 4. Accordingly, an amount of the heat lens action of the solid state component 3 changes, however, it is possible to slightly change an equivalent radius of curvature of the image transferring optical system including the total reflection mirror 11 and the condensing lens 12 by moving the moving stages 13a, 13b.

Therefore, in the embodiment 8, it is possible to cancel the heat lens action of the solid state component in the resonator by compensating for the heat lens action of the solid state component 3 according to the laser output so as to correct a course of the laser light 14, and maintain a wide sectional area of the laser light 14 by varying the radius of curvature irrespective of the variation in the making power of the power source 5. That is, according to the embodiment 8, it is possible to high-accurately correct variation in the heat lens of the laser light 14 in a vicinity of generated position thereof without any effect on other portions of the resonator because of the image transferring system having the substantial optical propagated distance of zero, resulting in holding constant operation of the resonator (without divergence of the laser beam).

FIG. 25 is a graph diagram showing variation in divergent angle of a laser beam as a function of the laser output (which depends upon the making power of the power source for the light source) when the Nd:YAG crystal is employed as the solid state component. In FIG. 25, a comparison is made between two embodiments, that is, the embodiment 8 in which the heat lens action is compensated by the image transferring optical system of the embodiment 8, and a comparative embodiment in which the heat lens action is not compensated. Referring to FIG. 25, in the comparative embodiment, the divergent angle is remarkably extended since a rise of the laser output increases the heat lens action. In contrast with this, it can be seen that the divergent angle of the laser beam is independent of the laser output and becomes substantially constant because of the compensation for the heat lens action in the embodiment 8.

Embodiment 9

Figure 26:
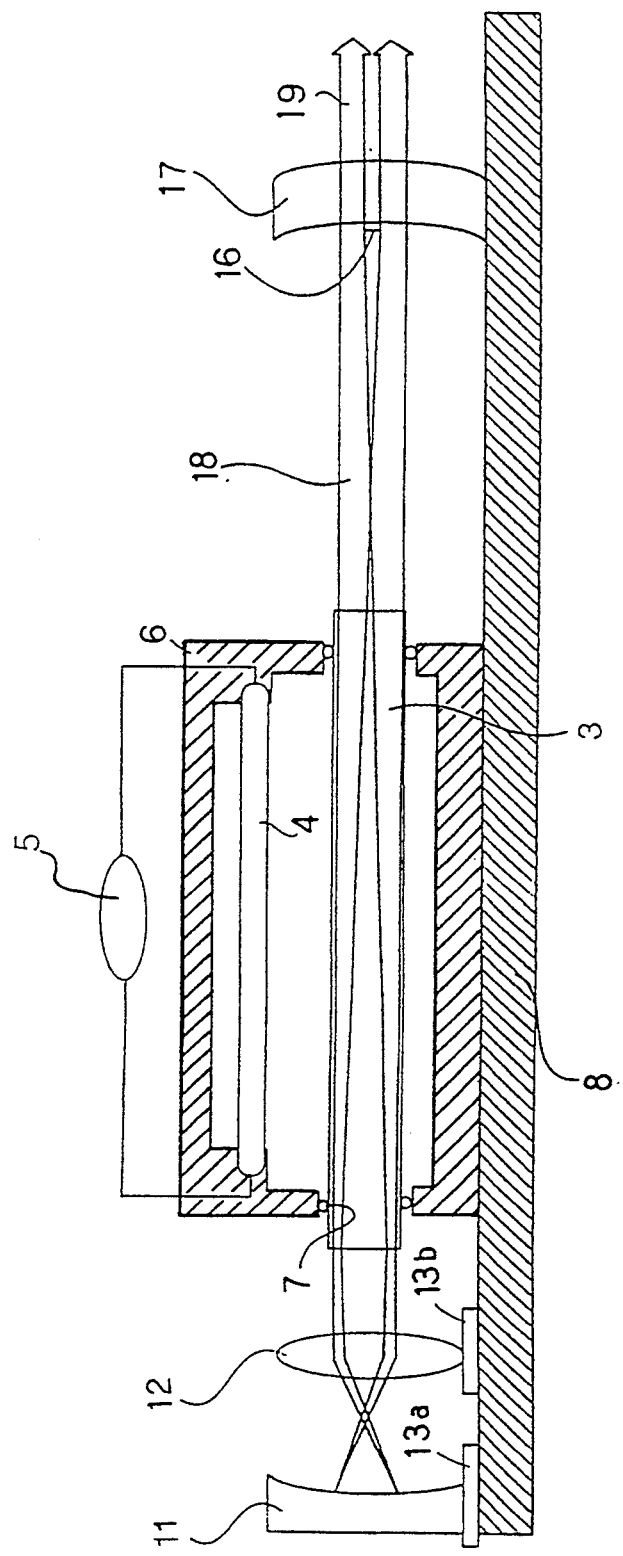
FIG. 26 is a sectional view of a solid state laser apparatus according to the embodiment 9 of the present invention.

A description will now be given of the embodiment 9 with reference to FIG. 26 and FIGS. 27(a) and (b). FIG. 26 is a sectional view showing a solid state laser apparatus according to the embodiment 9. In FIG. 26, component parts identified by reference numerals 3 to 8, 11 to 13b are identical with those of the apparatus in the embodiment 8. Reference numeral 16 means an enlarged total reflection mirror, 17 means a partial reflection mirror, 18 is a laser light which is generated in a laser resonator (including the total reflection mirror 11, the condensing lens 12, the enlarged total reflection mirror 16 and the partial reflection mirror 17), and 19 is a laser beam emitted from the laser apparatus.

The solid state laser apparatus in the embodiment 9 is basically operated as in the solid state laser apparatus in the above embodiment 8 except the following respect. That is, in the embodiment 9, the enlarged total reflection mirror 16 and the meniscus-shaped partial reflection mirror 17 are employed instead of the partial reflection mirror 2 of FIG. 22. Further, an unstable type resonator includes an image transferring variable curvature mirror having the enlarged total reflection mirror 16, the meniscus-shaped partial reflection mirror 17, the condensing lens 12 and the total reflection mirror 11. In case the unstable type resonator is used, divergence (by the enlarged total reflection mirror 16) and condensing (by the total reflection mirror 11) of the laser light 18 are repeated in the resonator. As a result, it is possible to provide the solid state component 3 having substantially uniform intensity distribution in the section thereof.

Figure 27:
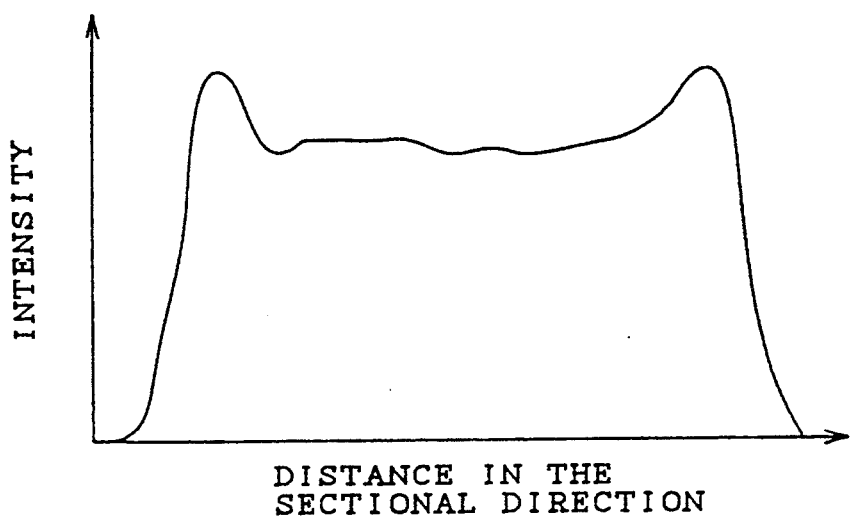
FIG. 27(a) and (b) are graph diagrams showing patterns of laser beams in the solid state laser apparatus of FIG. 26 and in the laser apparatus in which the heat lens action is not compensated, respectively.
Figure 27:
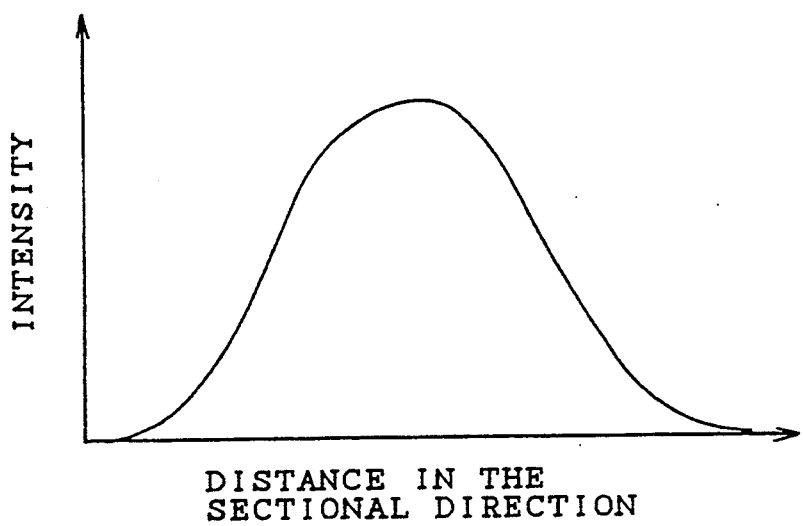
Figure 27:
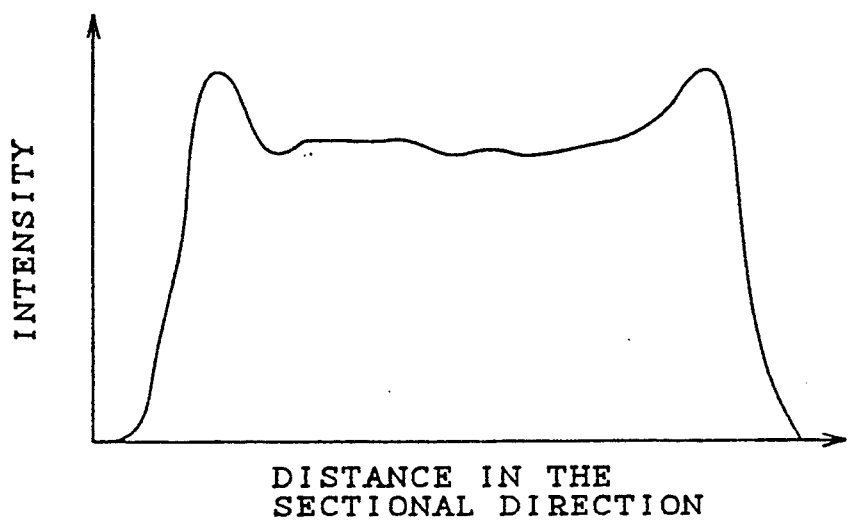
Figure 27:
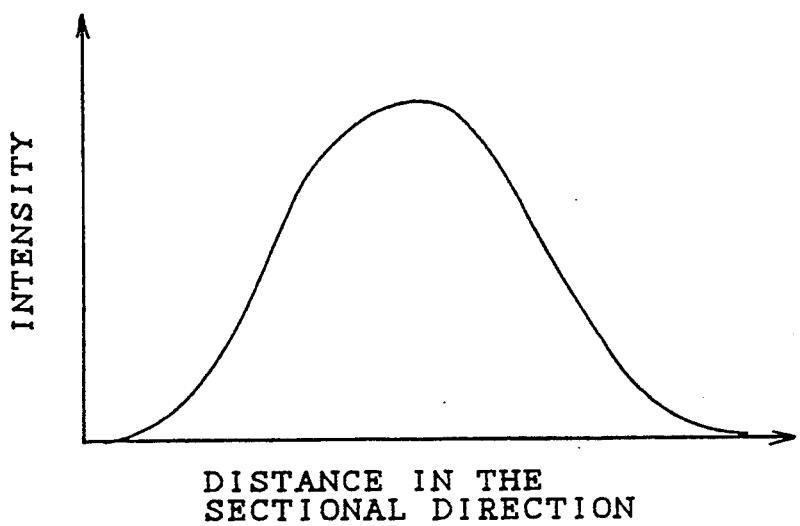

FIGS. 27(a) and (b) respectively show beam patterns (i.e., intensity distribution in a sectional direction of the laser light) in two cases, that is, one case where the unstable type resonator (of the embodiment 9) is used, and the other case where the stable type resonator is used. Referring to FIGS. 27(a) and (b), in the solid state laser apparatus of the embodiment 9, the intensity of the laser light is uniform in the sectional direction thereof as compared with the campanulate intensity distribution by the stable type resonator.

Therefore, according to the embodiment 9, the solid state component 3 can be uniformly heated along the section thereof even in a high power area in which the laser light is partially absorbed in the solid state component 3 to heat the solid state component 3. Consequently, it is possible to provide a constant heat lens action of the solid state component in the section in a laser medium (solid state component) 3 in the embodiment 9. As a result, it is possible to facilitate compensation for the heat lens action by an image transferring variable curvature mirror (including a combination of the total reflection mirror 11, the condensing lens 12 and the moving stages 13a, 13b). Further, it is possible to accurately cancel the heat lens action so as to provide a stable and high quality laser beam (i.e., a non-divergent laser beam) 19.

Embodiment 10

A description will now be given of the embodiment 10 with reference to FIG. 28. FIG. 28 is a sectional view showing a solid state laser apparatus according to the embodiment 10. In FIG. 28, component parts identified by reference numerals 3 to 8, 11 to 13b, and 17 are identical with those of the apparatus in the embodiment 9. Reference numeral 25 means an enlarged exit mirror including an intermediate partial reflection mirror (enlarged partial reflecting portion) 26 and a peripheral non-reflecting portion 27. Reference numeral 28 is a laser light which is generated in a laser resonator (including the total reflection mirror 11, the condensing lens 12, the enlarged exit mirror 25 and the partial reflection mirror 17), and 29 is a laser beam emitted from the laser apparatus.

The solid state laser apparatus in the embodiment 10 is basically operated as in the solid state laser apparatus in the above embodiment 9 except the following respect. That is, in the embodiment 10, the enlarged exit mirror 25 is employed instead of the enlarged total reflection mirror 16 of FIG. 26, and an unstable type resonator includes an image transferring variable curvature mirror having the enlarged exit mirror 25, the condensing lens 12 and the total reflection mirror 11. In this way, it is possible to provide a laser beam 29 having a solid (i.e., non-doughnut type) section, and reduce intensity of the laser light 28 required to provide the same condensing performance as in the embodiment 9.

According to the embodiment 10, it is therefor possible to reduce quantity of heat generated due to absorption of the laser light 28 by the solid state component 3, and facilitate compensation for heat lens by the image transferring variable curvature mirror even in a high power area. As a result, it is possible to accurately cancel a heat lens action so as to provide a stable and high quality laser beam 29.

Embodiment 11

Figure 29:
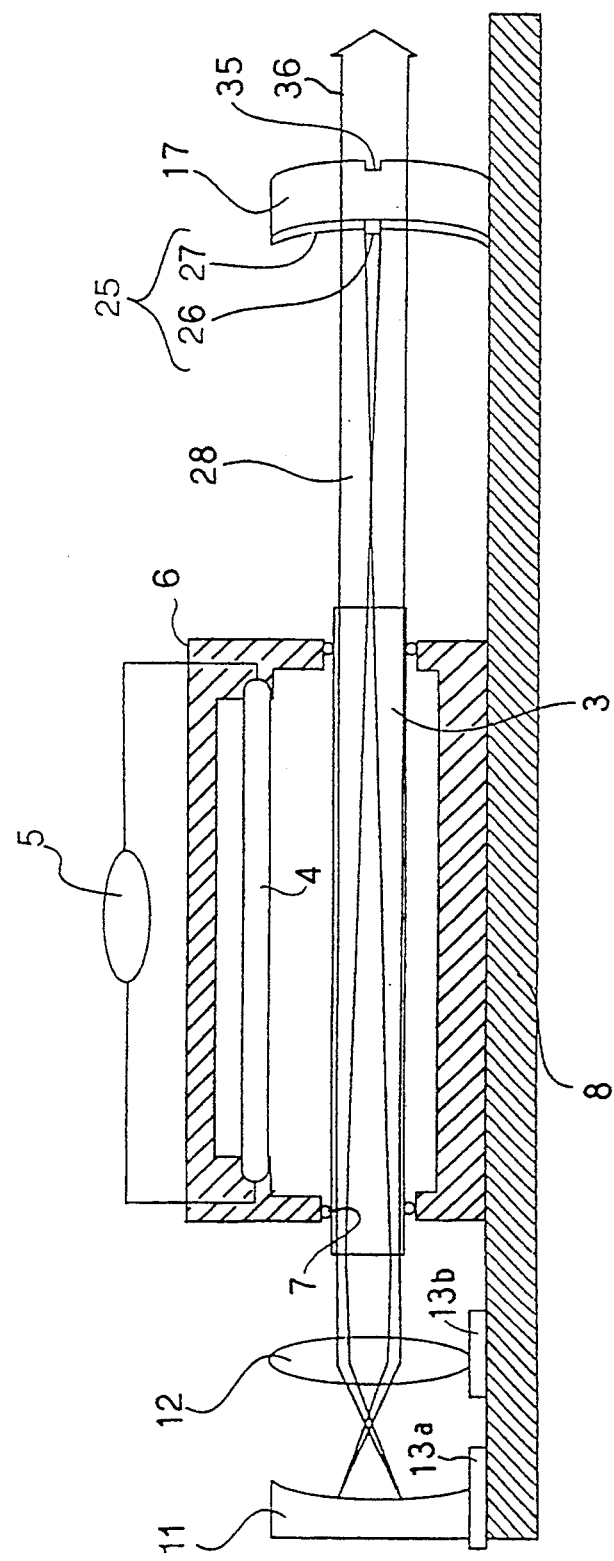
FIG. 29 is a sectional view of the solid state laser apparatus according to the embodiment 11 of the present invention.

A description will now be given of the embodiment 11 with reference to FIG. 29. FIG. 29 is a sectional view showing a solid state laser apparatus according to the embodiment 11. In FIG. 29, component parts identified by reference numerals 3 to 8, 11 to 13b, 17, and 25 to 28 are identical with those of the apparatus in the embodiment 10. Reference numeral 35 means a step which is provided in a position of an outer surface of the partial reflection mirror 17 corresponding to the partial reflection mirror 26. Further, reference numeral 36 is a laser beam which is emitted from the laser apparatus.

The solid state laser apparatus of the embodiment 11 is basically operated as in the solid state laser apparatus of the above embodiment 10 except the following respect. That is, in the embodiment 11, the step 35 is provided in the outer surface of the partial reflection mirror 17 so as to cancel a phase difference between a laser beam passing through the partial reflection mirror portion 26 and a laser beam passing through the non-reflecting portion 27. Therefore, according to the embodiment 11, it is possible to provide the solid type laser beam 36 having uniform phase, and improve a condensing performance (i.e., facilitate condensing by the lens or the like because of the non-divergent laser beam 36).

Embodiment 12

Figure 30:
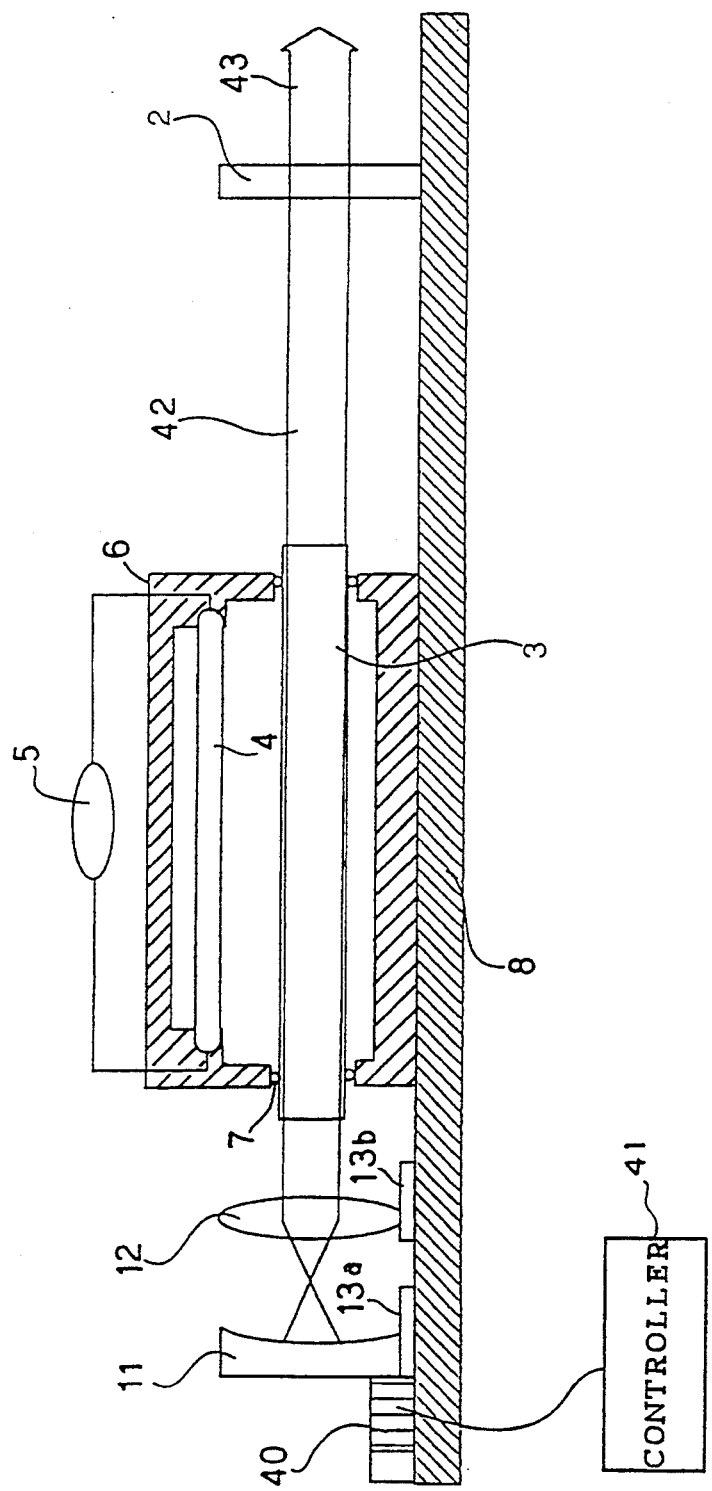
FIG. 30 is a sectional view of the solid state laser apparatus according to the embodiment 12 of the present invention.

A description will now be given of the embodiment 12 with reference to FIGS. 30 to 32. FIG. 30 is a sectional view showing a solid state laser apparatus according to the embodiment 12. In FIG. 30, component parts identified by reference numerals 2 to 8, and 11 to 13b are identical with those of the apparatus in the embodiment 8. Reference numeral 40 means a piezo-electric device, 41 means a controller to control expansion and contraction of the piezo-electric device 40, 42 is a laser light generated in the resonator, and 43 is a laser beam emitted from the laser apparatus.

The solid state laser apparatus of the embodiment 12 is basically operated as in the solid state laser apparatus of the above embodiment 8 except the following respect. That is, in the embodiment 12, a distance between the total reflection mirror 11 and the condensing lens 12 is varied by the expansion and the contraction of the piezo-electric device 40 mounted at the back of the total reflection mirror 11 in a short time through the moving stage 13a while making power is left constant (i.e., a pumping condition is left constant). The variation in the distance between the total reflection mirror 11 and the condensing lens 12 changes the image transferring condition of the laser resonator as disclosed in the embodiment 8. As a result, the image transferring condition can be geometrically and optically switched over between a stable condition (i.e., a condition of the stable type resonator) and an unstable condition (i.e., a condition of the unstable type resonator).

Figure 31:
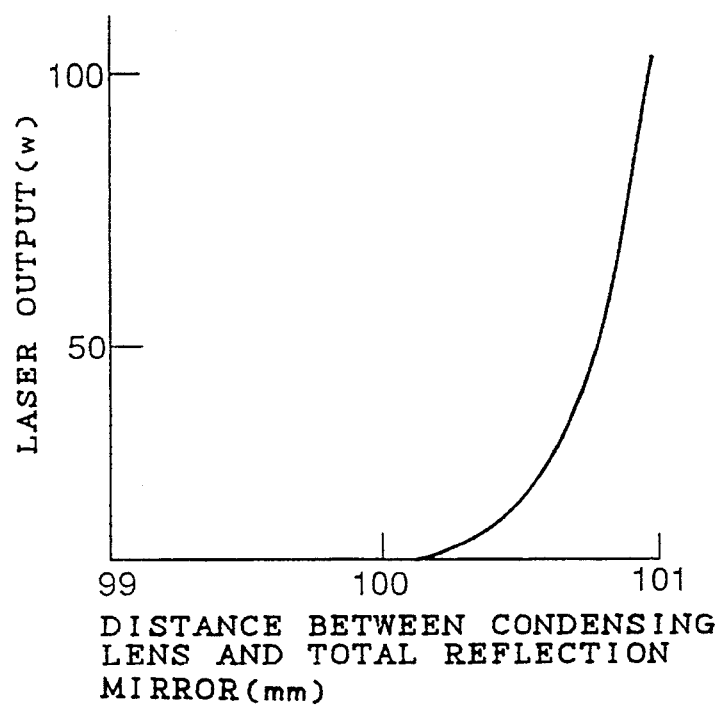
FIG. 31 is a graph diagram showing a relation between a distance between optical components and laser output in the image transferring optical system of the solid state laser apparatus in FIG. 26.
Figure 32:
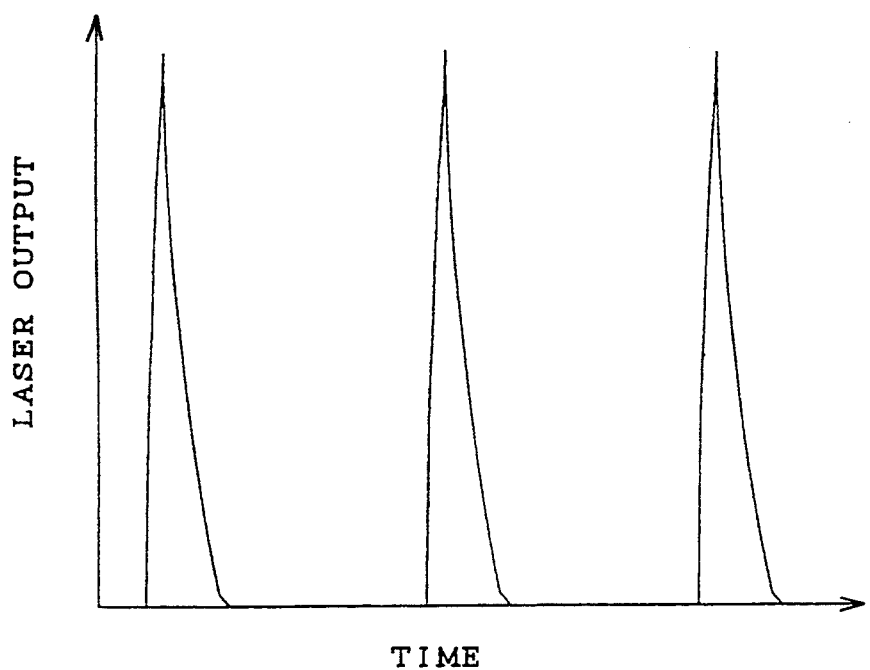
FIG. 32 is a graph diagram showing a pulse shape when pulse oscillation is performed in the solid state laser apparatus of FIG. 26.

FIG. 31 shows an illustrative relation between the distance between the total reflection mirror 11 and the condensing lens 12, and a laser output. For example, it can be seen that the laser output rapidly increases if the image transferring condition is varied from R=2f=100 mm to R>2f(R>100 mm) when a focal length f of the condensing lens 12 is defined as 50 mm.

Further, if a resonator condition is repeatedly varied by the piezo-electric device 40 in a short time (at a high speed), the resonator may be geometrically and optically fluctuated in a short time between the stable condition resulting in reduced loss, and the unstable condition resulting in increased losses (i.e., the loss in the resonator may vary with time [cyclically]). Consequently, Q-value of the resonator rapidly varies so as to provide sharp pulse oscillation. FIG. 32 shows an illustrative sharp pulse shape obtained as set forth above.

Embodiment 13

Figure 33:
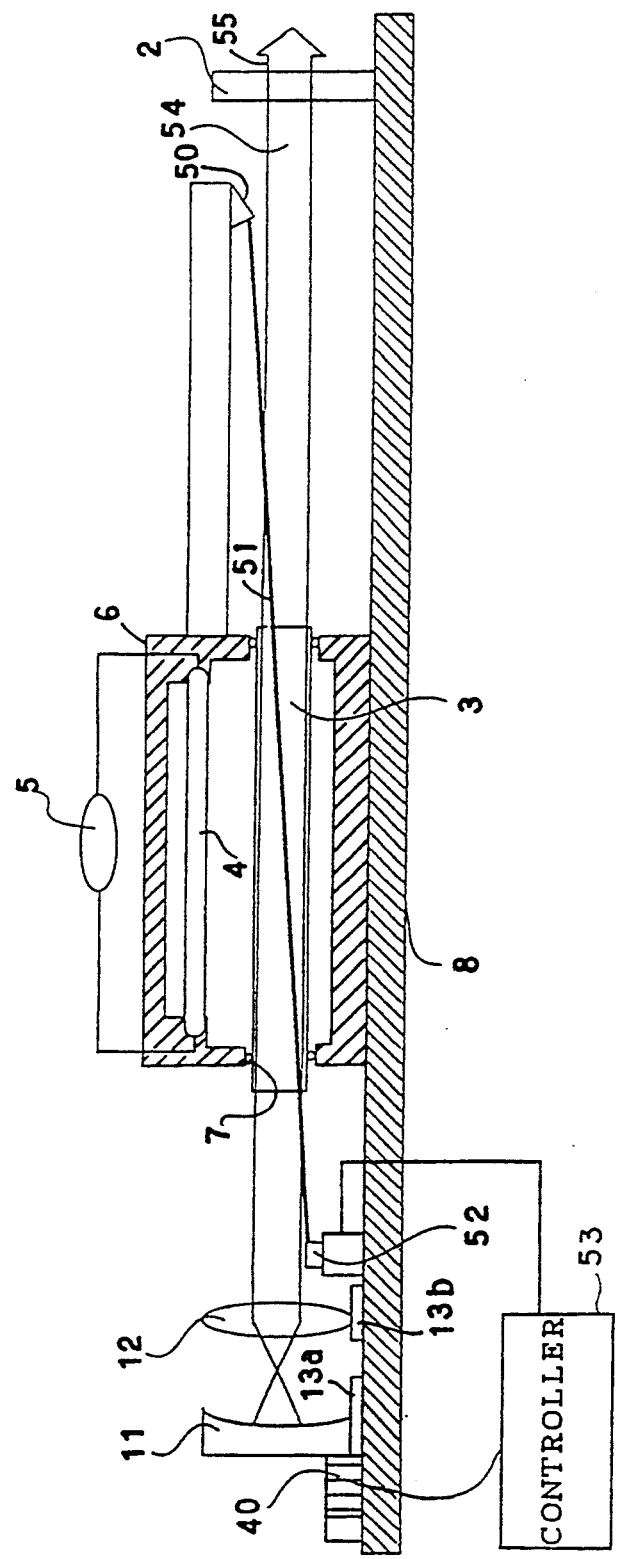
FIG. 33 is a sectional view of the solid state laser apparatus according to the embodiment 13 of the present invention.

A description will now be given of the embodiment 13 with reference to FIGS. 33 to 35. FIG. 33 is a sectional view showing a solid state laser apparatus according to the embodiment 13. In FIG. 33, component parts identified by reference numerals 2 to 8, and 11 to 13b and 40 are identical with those of the apparatus in the embodiment 12. In FIG. 33, reference numeral 50 means a second light source, 51 means a light beam emitted from the light source 50, 52 is a photo detector such as CCD, 53 is a controller to control expansion and contraction of the piezo-electric device 40 depending upon results of measurement of the photo detector, 54 is a laser light generated in the resonator, and 55 is a laser beam emitted from the laser apparatus.

Figure 34:
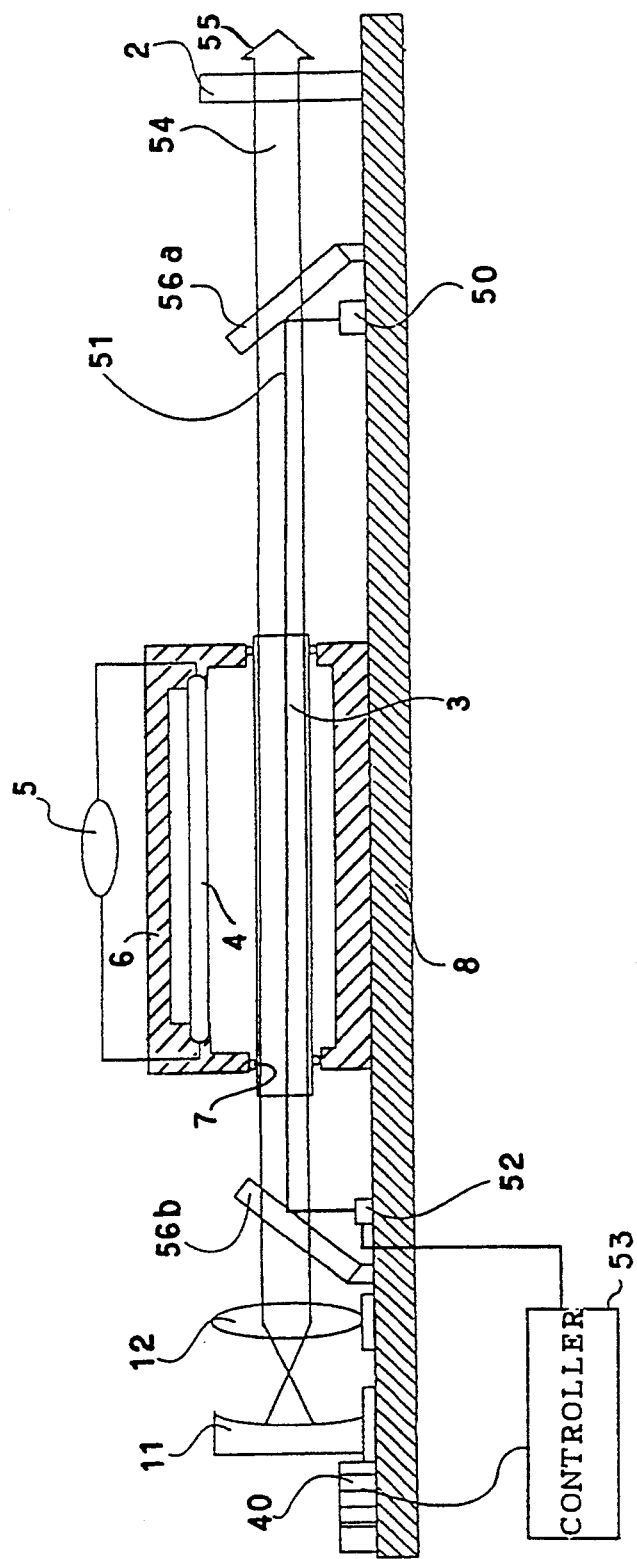
FIG. 34 is a sectional view of a modified solid state laser apparatus according to the embodiment 13 of the present invention.

FIG. 34 is a sectional view showing a modified solid state laser apparatus according to the embodiment 13. In FIG. 34, component parts identified by reference numerals 2 to 8, and 11 to 13b, 40, and 50 to 55 are identical with those of the apparatus in the embodiment 33. The solid state laser apparatus further includes mirrors 56a, 56b which totally reflects the light beam 51 from the second light source, but totally transmits the laser light 54.

In the laser apparatus shown in FIGS. 33 and 34, the light beam 51 generated from the second light source 50 can pass through the solid state component 3 in which the heat lens action occurs. The photo detector 53 detects variation in an outer diameter of the light beam 51 due to passing through the solid state component 3. In this case, in the apparatus of FIG. 33, the light 51 travels diagonally with respect to the laser light 54 so as to be directly incident on the photo detector 52. On the other hand, in the apparatus of FIG. 34, the light 51 travels in the laser light 54 parallel thereto by the mirror 56a, and subsequently deviates from the laser light 54 by the mirror 56b so as to be incident on the photo detector 52. In the controller 53, the degree of the heat lens action of the solid state component 3 can be calculated depending upon the detected value (which is the degree of variation in the outer diameter of the light beam 51), and the piezo-electric device 40 is driven depending upon the calculated value so as to adjust the distance between the total reflection mirror 11 and the condensing lens 12. Therefore, according to the embodiment, it is possible to cancel the heat lens action of the solid state component 3 while following fluctuations of the heat lens action in a short time, and maintain a constant divergent angle.

Figure 35:
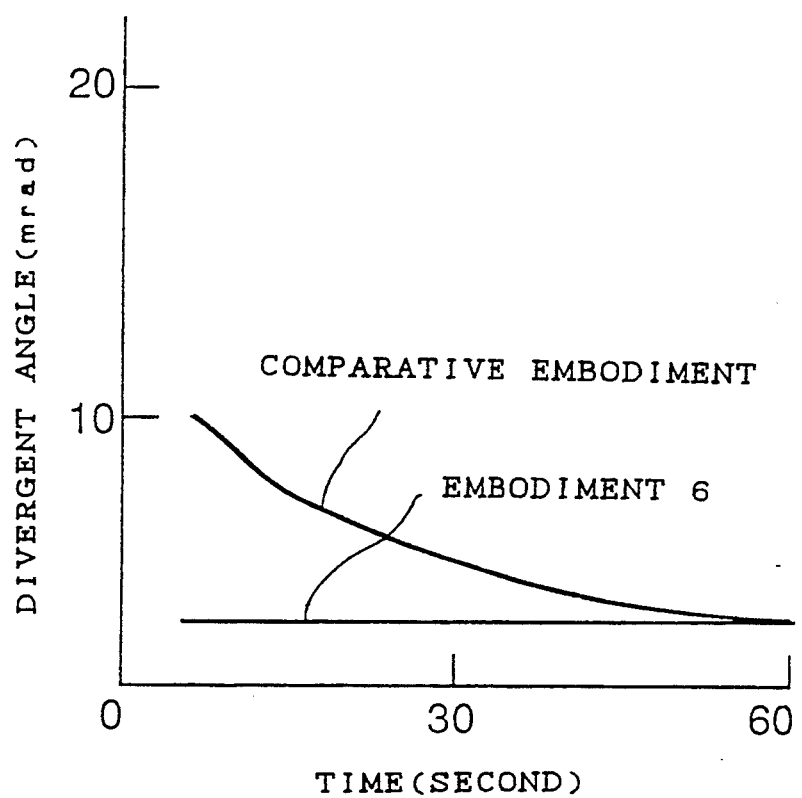
FIG. 35 is a graph diagram showing relations between elapsed time from a start of the laser oscillation and the divergent angles of the laser beam in the solid state laser apparatus in the embodiment 13 and in the laser apparatus in which the heat lens action is not compensated.

FIG. 35 shows variation in the divergent angle of the laser beam 55 in the laser apparatus shown in FIGS. 33 and 34 as a function of a time elapsing after completion of making the power source 5 as compared with the variation in the divergent angle in a comparative embodiment in which the heat lens action is not compensated. Though the divergent angle of the laser beam varies until the heat lens action of the solid state component is stabilized in the comparative embodiment, the divergent angle is stabilized concurrently with making of the power source in the embodiment 13.

Though the laser beam is derived by providing the optical mirrors 2 and 17 apart from the image transferring optical system in either of the embodiments, a reflecting portion may be provided for a part of a mirror forming the image transferring optical system so as to externally derive the laser beam from the reflecting portion.

Further, though a specific description has not been given, a non-reflecting film may be applied to a position of the respective optical components through which the laser beam passes, as in the typical optical components in spite of no specific description to the position. The non-reflecting film reduces loss in the resonator, and enables efficient laser oscillation.

Embodiment 14

Figure 36:
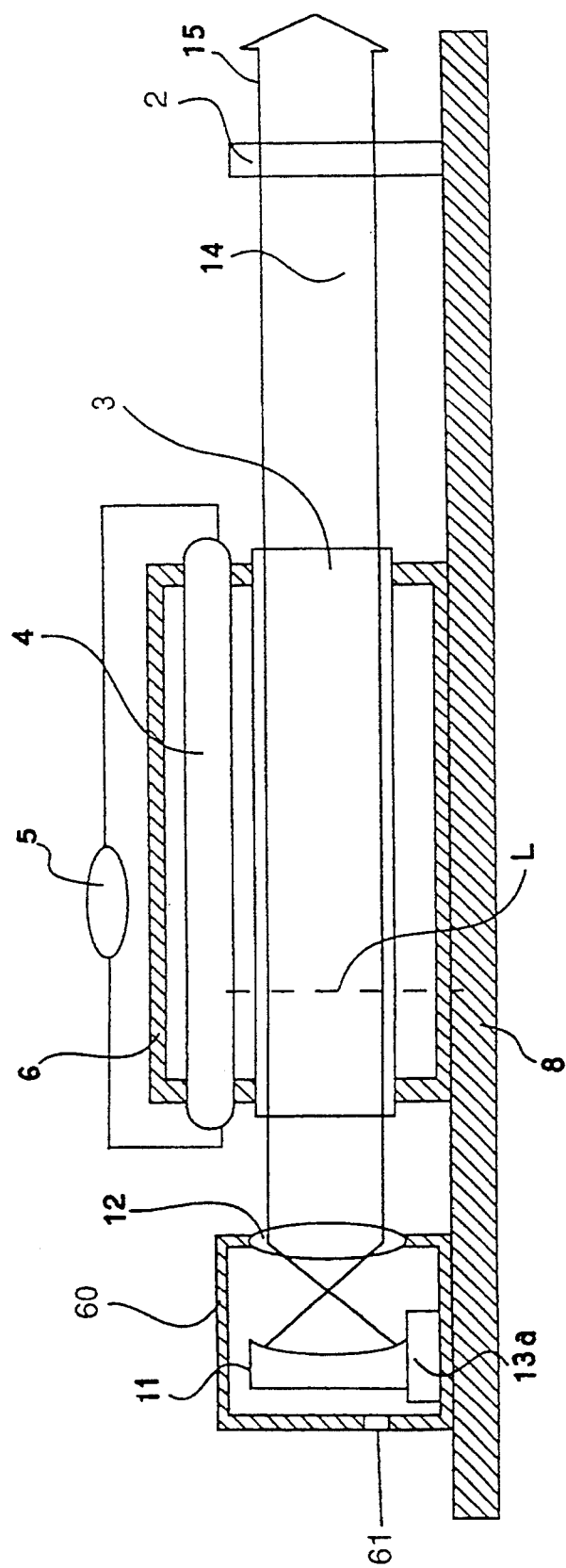
FIG. 36 is a sectional view of the solid state laser apparatus according to the embodiment 14 of the present invention.

FIG. 36 is a sectional view showing a solid state laser apparatus according to the embodiment 14 of the invention. In FIG. 36, component parts identified by reference numerals 2 to 8, and 11 to 15 are identical with those of the apparatus in FIG. 22. Reference numeral 60 means a housing to accommodate the total reflection mirror 11, and 61 means an air hole provided in the housing 60. In FIG. 36, the broken line L indicates a virtual arrangement of a variable curvature mirror which is equivalent to an image transferring system including the total reflection mirror 11 and the condensing lens 12.

In the solid state laser apparatus, a condensed point of a laser light is positioned at an intermediate position between the total reflection mirror 11 and the condensing lens 12. The housing 60 prevents dust or the like in the atmosphere from slips into the condensed point. Therefore, it is possible to avoid degradation of quality of the laser light 14 passing in a vicinity of the dust due to the dust heated by the laser light 14.

Further, if the housing 60 is exhausted by connecting a vacuum pump to the air hole 61, it is possible to easier eliminate a problem of the dust, and avoid degraded quality of a laser beam such as air break (generation of plasma) due to increased intensity of the condensed point, or absorption of the laser light due to moisture in the air. It is also possible to avoid the air break in a vicinity of the condensed point by blowing inactive gas in the housing 60 from the air hole 61.

In addition, the total reflection mirror 11 may be removed from the moving stage 13a, and may be mounted on a wall of the housing 60. On the other hand, the degree of vacuum may be varied through the air hole 61, and the housing 60 may be deformed by varying pressure of the gas which is blew in the housing 60. It is thereby possible to vary equivalent curvature of the variable curvature mirror by varying a distance between the total reflection mirror 11 and the condensing lens 12 without the moving stage 13a. It is also possible to achieve the variation in the equivalent curvature of the variable curvature mirror by disposing a heater in contact with the housing 60, and varying a temperature in the housing 60 by heating of the heater.

Embodiment 15

Figure 37:
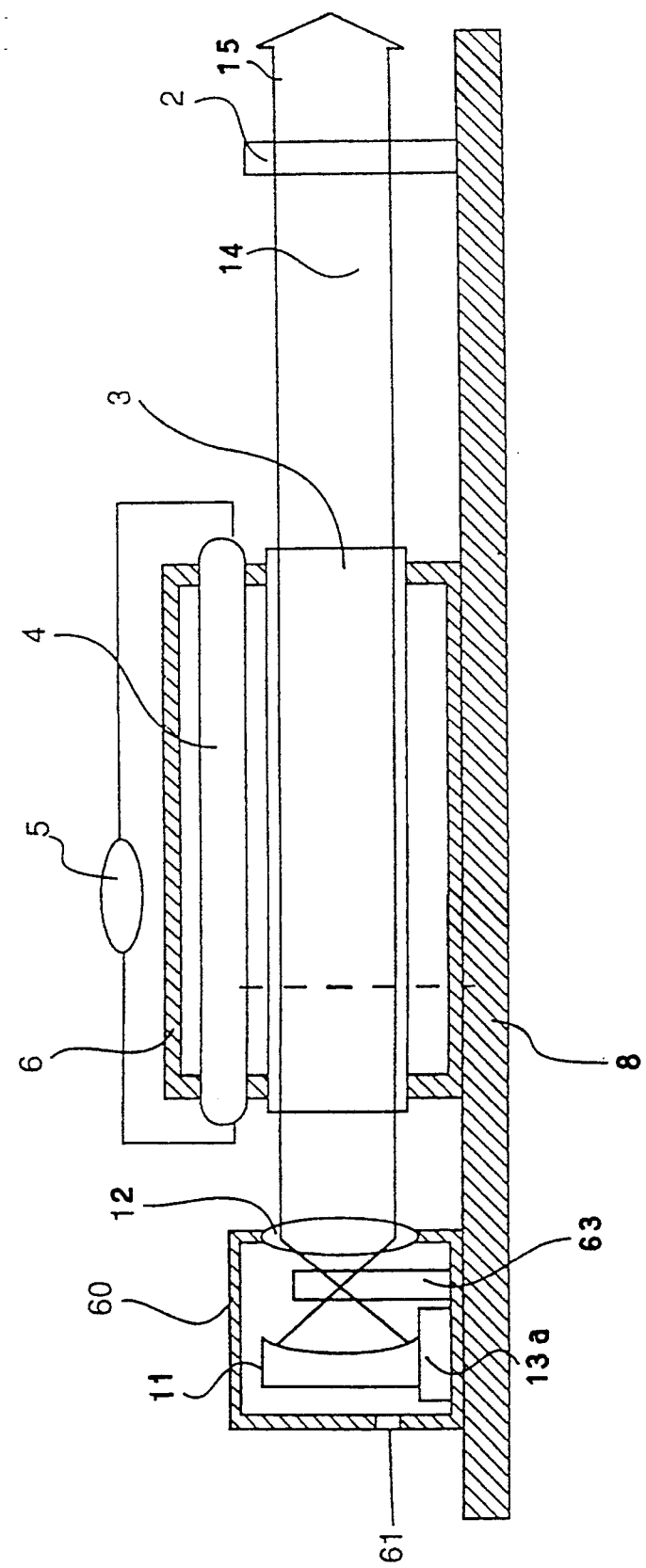
FIG. 37 is a sectional view of the solid state laser apparatus according to the embodiment 15 of the present invention.

FIG. 37 is a sectional view showing a solid state laser apparatus according to the embodiment 15 of the present invention. In FIG. 37, component parts identified by reference numerals 2 to 8, 11 to 15, 60, 61 are identical with those of the apparatus in FIG. 36. Reference numeral 63 means a wavelength transducer which is made of KTP (Potassium Titanyl Phosphate) crystal or the like.

In the solid state laser apparatus, the wavelength transducer 63 is disposed so as to transduce a wavelength of the laser light 14, and generate the laser beam 15 of shorter wavelength having a good condensing performance. In particular, the wavelength transducer 63 is disposed to a condensed point which is disposed at an intermediate portion between the total reflection mirror 11 and the condensing lens 12. Therefore, it is possible to efficiently transduce the wavelength by making use of the laser light 14 having more enhanced intensity at the condensed point.

Further, in the embodiment, the wavelength transducer 63 is contained in the housing 60 so that no dust or the like adheres to a surface of the wavelength transducer 63. As a result, it is possible to stably transduce the wavelength for a long period of time.

Embodiment 16

Figure 38:
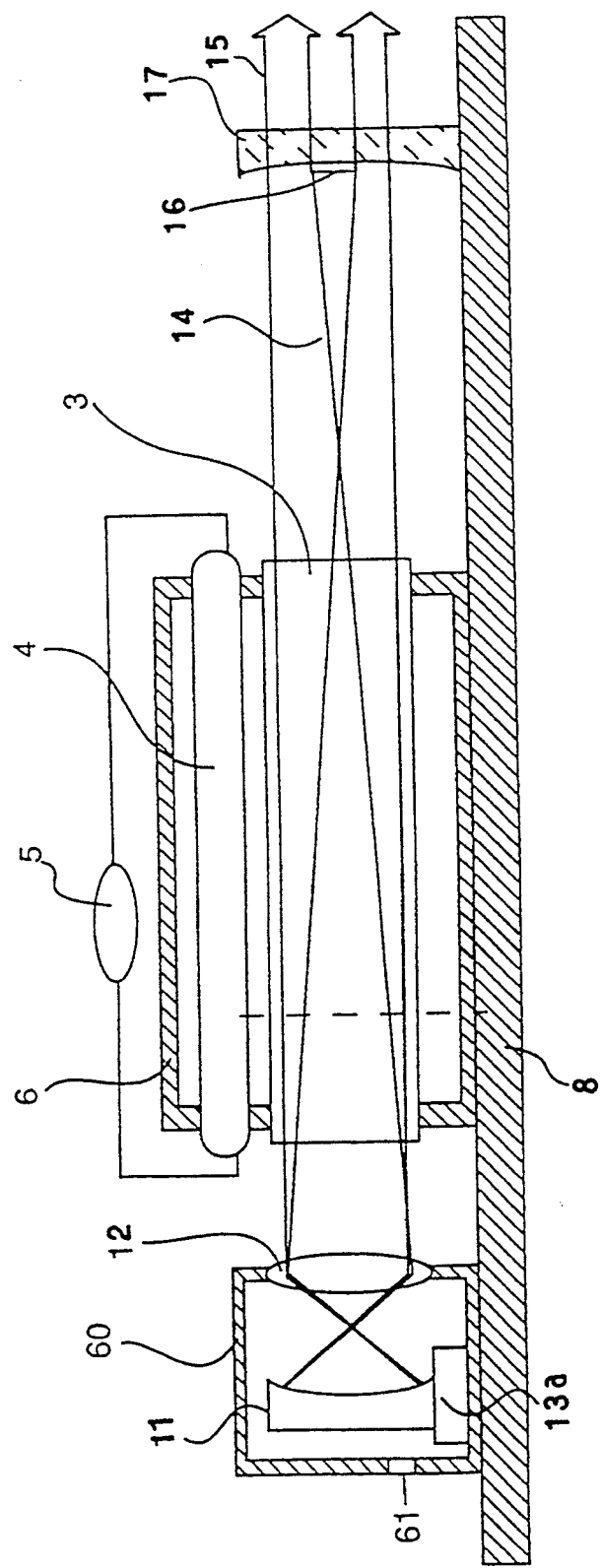
FIG. 38 is a sectional view of the solid state laser apparatus according to the embodiment 16 of the present invention.

FIG. 38 is a sectional view showing a solid state laser apparatus according to the embodiment 16 of the present invention. In FIG. 38, component parts identified by reference numerals 2 to 8, 11 to 15, 60, 61 are identical with those of the apparatus in FIG. 36, and other parts identified by reference numerals 16, 17 are identical with those of the apparatus in FIG. 26.

In the solid state laser apparatus, there is provided the same unstable laser resonator as that in FIG. 26 so as to provide a doughnut type laser beam 15. Further, it is possible to avoid the dust adhering to an image transferring system because of the housing 60, and to be operable for a long period of time without cleaning the total reflection mirror 11 and the condensing lens 12.

Embodiment 17

Figure 39:
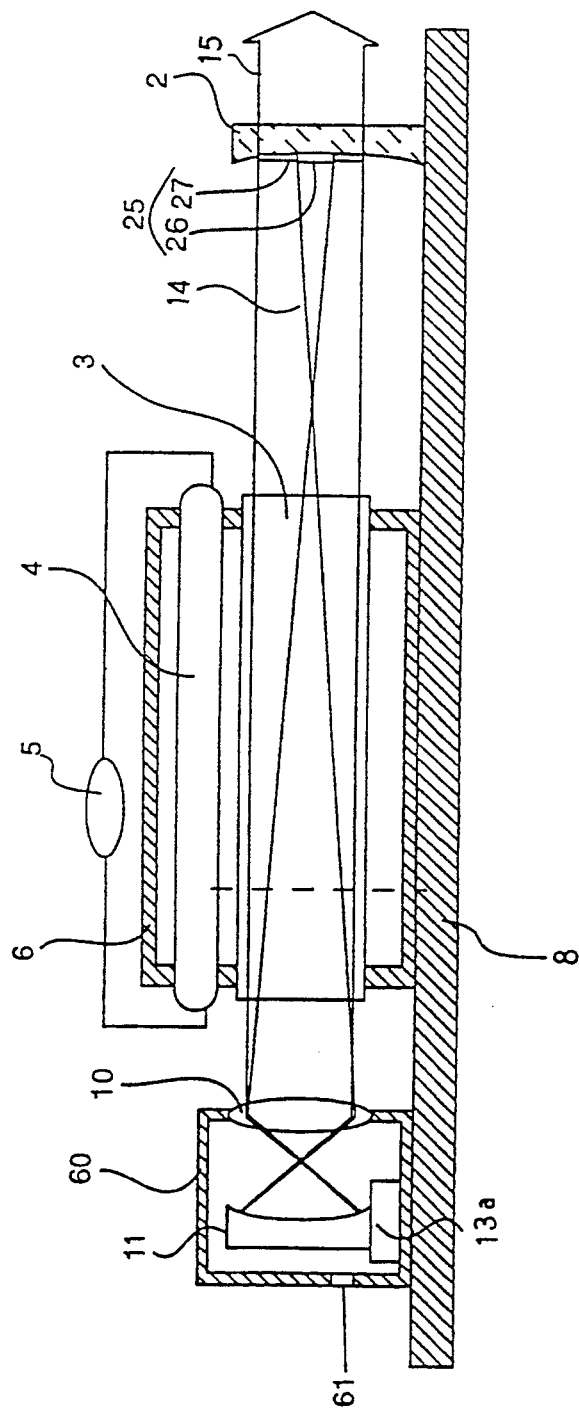
FIG. 39 is a sectional view of the solid state laser apparatus according to the embodiment 17 of the present invention.

FIG. 39 is a sectional view showing a solid state laser apparatus according to the embodiment 17 of the present invention. In FIG. 39, component parts identified by reference numerals 2 to 8, 11 to 15, 60, 61 are identical with those of the apparatus in FIG. 36, and other parts identified by reference numerals 17, and 25 to 27 are identical with those of the apparatus in FIG. 28.

In the solid state laser apparatus, there is provided the same unstable laser resonator as that in FIG. 28 so as to provide a solid type laser beam 15. Further, it is possible to avoid the dust adhering to an image transferring system because of the housing 60, and to be operable for a long period of time without cleaning the total reflection mirror 11 and the condensing lens 12.

Embodiment 18

Figure 40:
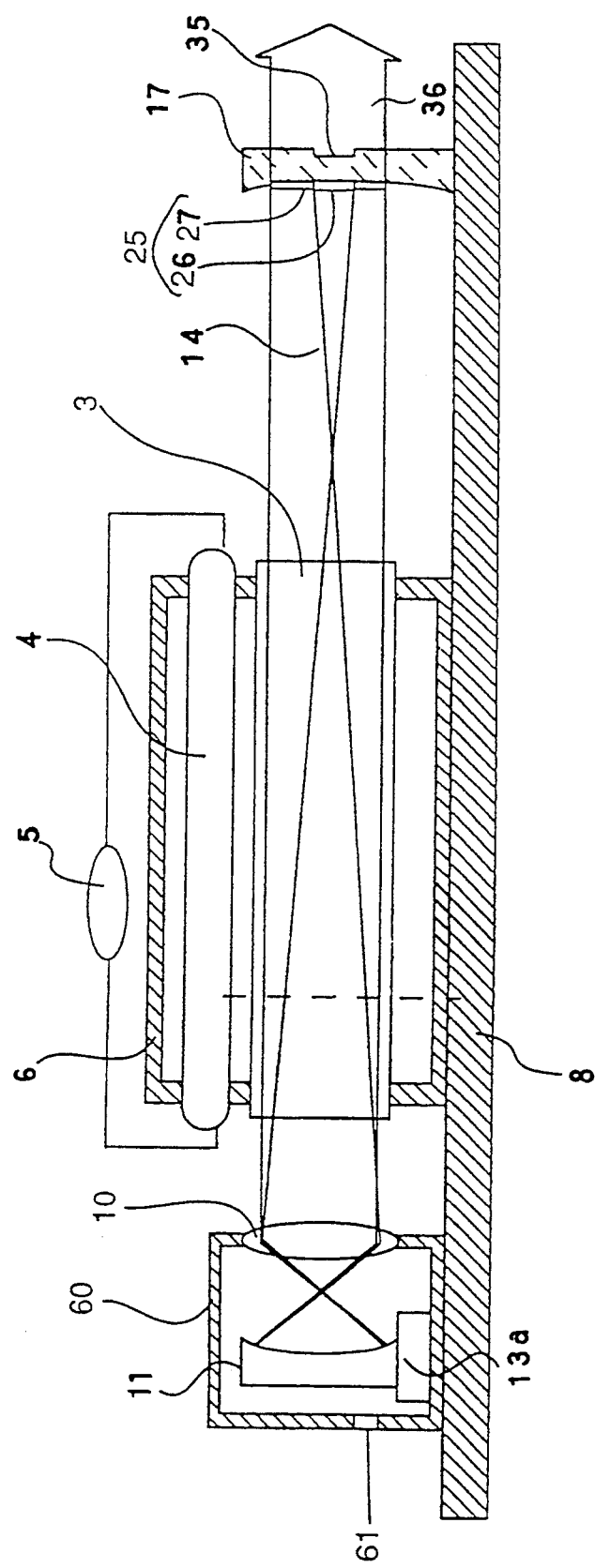
FIG. 40 is a sectional view of the solid state laser apparatus according to the embodiment 18 of the present invention.

FIG. 40 is a sectional view showing a solid state laser apparatus according to the embodiment 18 of the present invention. In FIG. 40, component parts identified by reference numerals 2 to 8, 11 to 15, 60, 61 are identical with those of the apparatus in FIG. 36, and other parts identified by reference numerals 17, 25 to 27, 35, and 36 are identical with those of the apparatus in FIG. 29.

In the solid state laser apparatus, there is provided the same unstable laser resonator as that in FIG. 29 so as to provide a solid type laser beam 36 with no phase difference. Further, it is possible to avoid the dust adhering to an image transferring system because of the housing 60, and to be operable for a long period of time without cleaning the total reflection mirror 11 and the condensing lens 12.

Embodiment 19

In the embodiment 19 shown in FIGS. 41(a) and (b), a laser beam generated from a solid state laser apparatus is incident on end of an optical fiber 300, and is transferred to a remote location. Further, the laser beam is emitted from the opposite end of the optical fiber 300, and is condensed by the condensing lens 12. Thus, the condensed laser beam is used to perform laser machining of a workpiece 800. In FIGS. 41(a) and (b), reference numeral 820 means an inlet for processing gas, and 810 means a processing nozzle.

In the embodiment 19, since surface roughness of the solid state component reduces aberration in a section of the solid state component, the laser beam generated from the solid state laser apparatus of the embodiment 19 can be condensed into a small spot.

The laser beam condensed into the small spot can be efficiently incident on the end of the optical fiber 300 and can be emitted from the opposite end of the optical fiber 300 without loss of laser output, resulting in efficient and high quality laser machining of the workpiece 800.

Though the embodiment 19 has been described with reference to the solid state laser apparatus employing the laser resonator disclosed in the embodiment 1, it possible to provide the same effect in case any one of the solid state laser apparatus as disclosed in the embodiments 2, 3 and 4 is employed.

Embodiment 20

Figure 42:
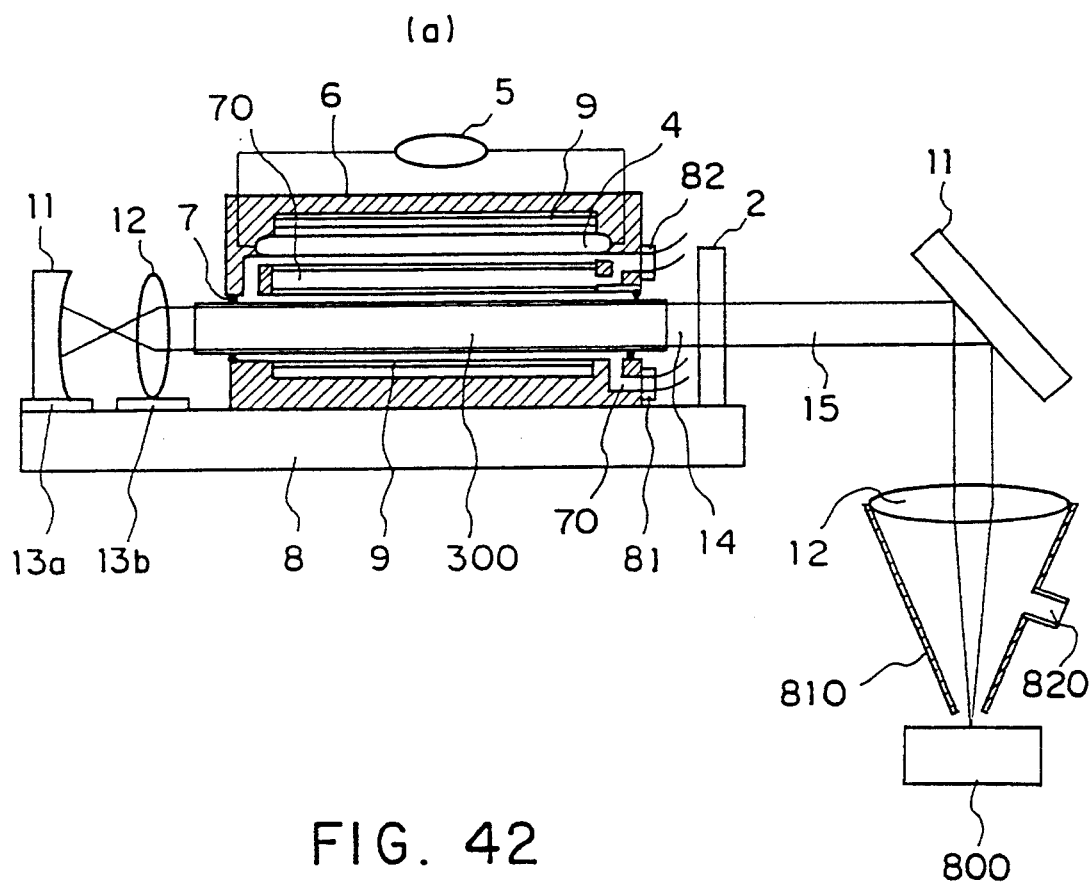
FIG. 42(a) and (b) are a cross-sectional view and a midship sectional view showing the embodiment 20 of the present invention, respectively.
Figure 42:
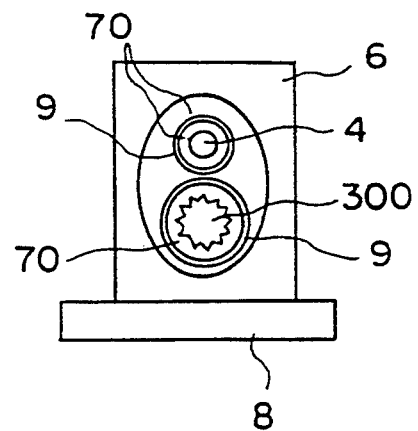

In the embodiment shown in FIGS. 42(a) and (b), a laser beam generated from a solid state laser apparatus is transferred to a remote location through the atmosphere, and is condensed by the condensing lens 12 after a direction of the laser beam is changed by the total reflection mirror 11. Further, the condensed laser beam is used to perform laser machining of a workpiece 800.

In the embodiment 20, since surface roughness of the solid state component reduces aberration in a section of the solid state component, the laser beam generated from the solid state laser apparatus of the embodiment can be condensed into a small spot. The condensed laser beam enables efficient and high quality laser machining of the workpiece 800.

Though the embodiment has been described with reference to the solid state laser apparatus employing the laser resonator disclosed in the embodiment 1, it is possible to provide the same effect in case any one of the solid state laser apparatus as disclosed in the embodiments 2, 3 and 4 is employed.

Embodiment 21

In the embodiment 21 shown in FIGS. 43(a) and (b), the laser beam generated from, for example, the solid state laser apparatus disclosed in the embodiment 20 is transferred to a remote location through the atmosphere, and is condensed by the condensing lens 12 after a direction of the laser beam is changed by the total reflection mirror 11. Subsequently, the condensed laser beam is further condensed by a second condensing lens 12 so that the condensed laser beam is used to perform good laser machining of a Workpiece 800.

In the embodiment, since surface roughness of the solid state component reduces aberration in a section of the solid state component, the laser beam generated from the solid state laser apparatus of the embodiment can be condensed into a small spot. The laser beam condensed into the small spot enables the laser machining of the workpiece 800.

An additional description will now be given of a configuration employing a plurality of lenses which are characteristic in the embodiment.

For example, the laser beam generated from the solid state laser apparatus shown in the embodiments 1 to 18 collides with an end of the solid state component, a laser mirror or the like disposed in a laser resonators. resulting in generation of diffracted wave.

Figure 44:
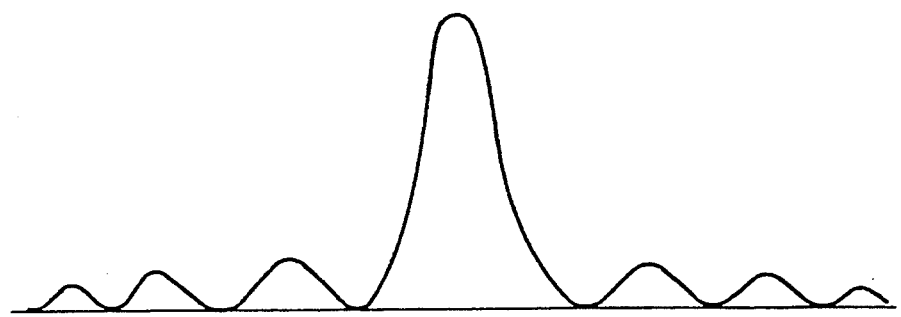
FIG. 44(a) and (b) are explanatory views of an operation of the laser apparatus according to the embodiment 21 of the present invention, respectively.
Figure 44:
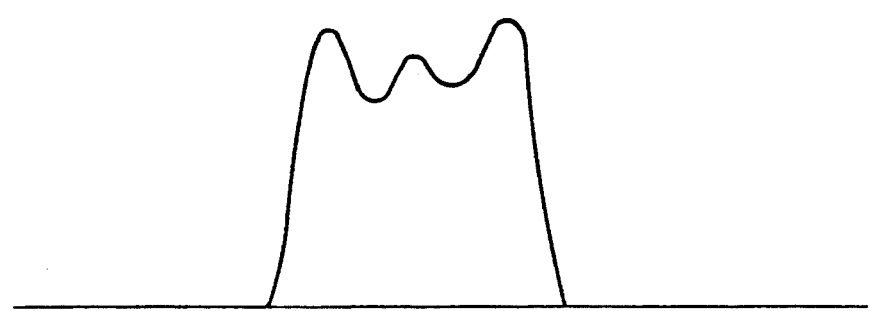

When the diffracted wave is condensed, the diffracted wave has an intensity distribution on a peripheral portion of the laser beam, and serves as a peripheral beam as shown in FIG. 44(a) in case the laser beam is condensed.

When the laser beam is used for the laser machining, there is a problem in that efficient and high quality laser machining can not be performed due to the following causes. That is, in cutting machining, it is impossible to provide a sharp cutting plane due to the peripheral beam. Further, in penetration machining, unnecessary heat input is circumferentially generated at a machining target portion.

In the embodiment 21, in order to overcome the problem, the plurality of lenses are used to perform image transfer of a laser beam onto a workpiece. The laser beam is positioned in a vicinity of a location from which the diffracted wave is generated and in a vicinity of a laser apparatus.

As set forth above, the diffracted wave is mainly generated at the end of the solid state component, or the end of the mirror in the laser apparatus. Accordingly, it is possible to provide a condensed laser beam having no effect of the diffracted wave if the optical system is set so as to perform the image transfer of the laser beam in the vicinities of the locations on the workpiece 800.

Figure 43:
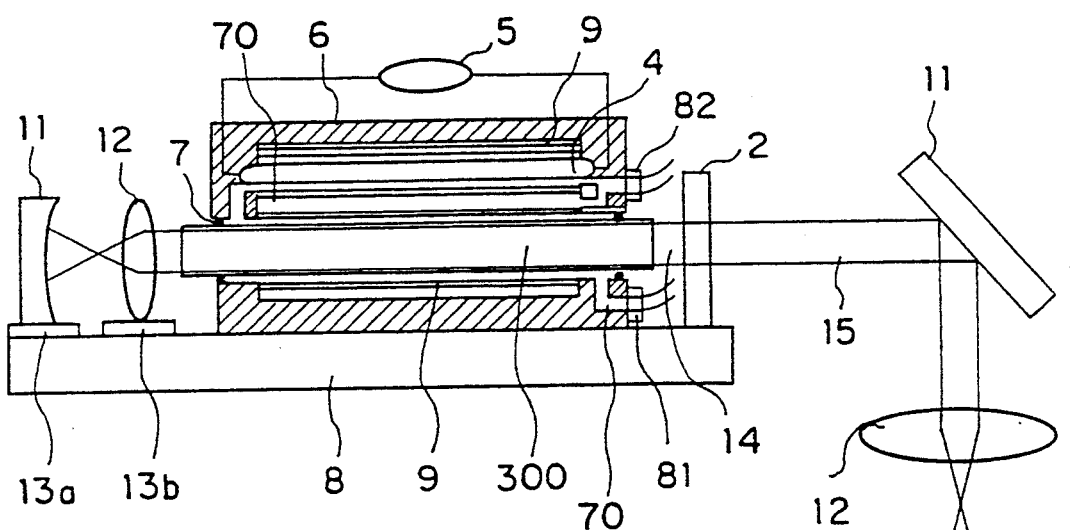
FIG. 43(a) and (b) are a cross-sectional view and a midship sectional view showing the embodiment 21 of the present invention, respectively.
Figure 43:
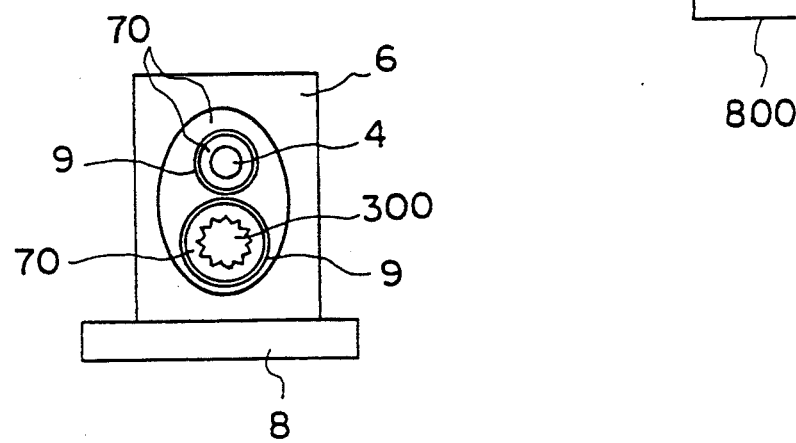

Referring now to FIG. 43, a configuration employing two lenses 12 is illustrated, and it is possible to transfer the laser beam at any location in the laser apparatus by adjusting focal lengths of the lenses. Therefore, it is thereby possible to the condensed laser beam with no peripheral beam as shown in, for example, FIG. 44(b).

Though the configuration employing the two lenses has been illustrated in the embodiment 21, reflection mirrors may be combined. In brief, the optical system may be combined to enable the image transfer of the laser beam generated in the vicinity of an inside of the laser apparatus so as not to generate the peripheral beam.

Figure 45:
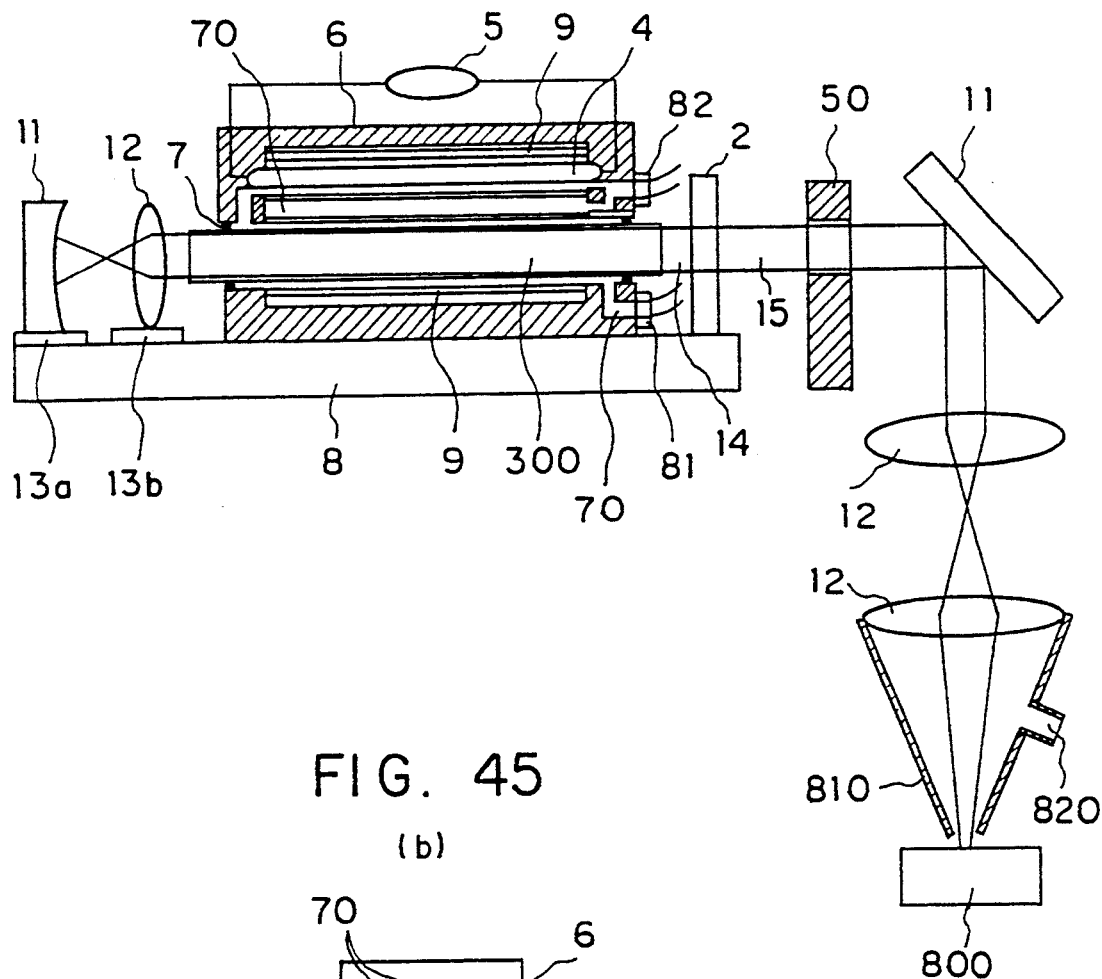
FIG. 45(a) and (b) are a cross-sectional view and a midship sectional view showing a modification of the embodiment 21 of the present invention, respectively.
Figure 45:
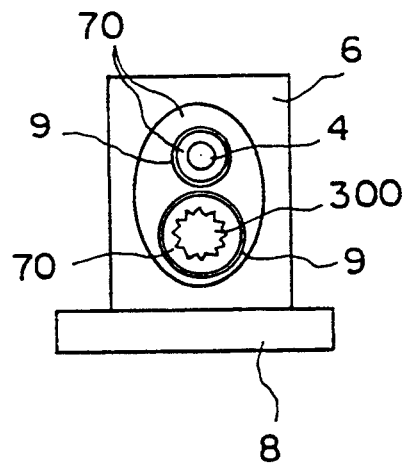

Further, as shown in FIG. 45(a), there is another configuration in which an aperture 50 is made of, for example, a metallic, ceramic or glass cylinder, or optical fiber, and the aperture 50 is disposed on an optical path so as to perform the image transfer of the laser beam whose peripheral beam is cut off by the aperture.

The embodiment is particularly effective in case any one of the solid state laser apparatus as illustrated in the embodiments 2, 3 and 4 is employed because of the end of the mirror disposed in the laser resonator.

Embodiment 22

Figure 46:
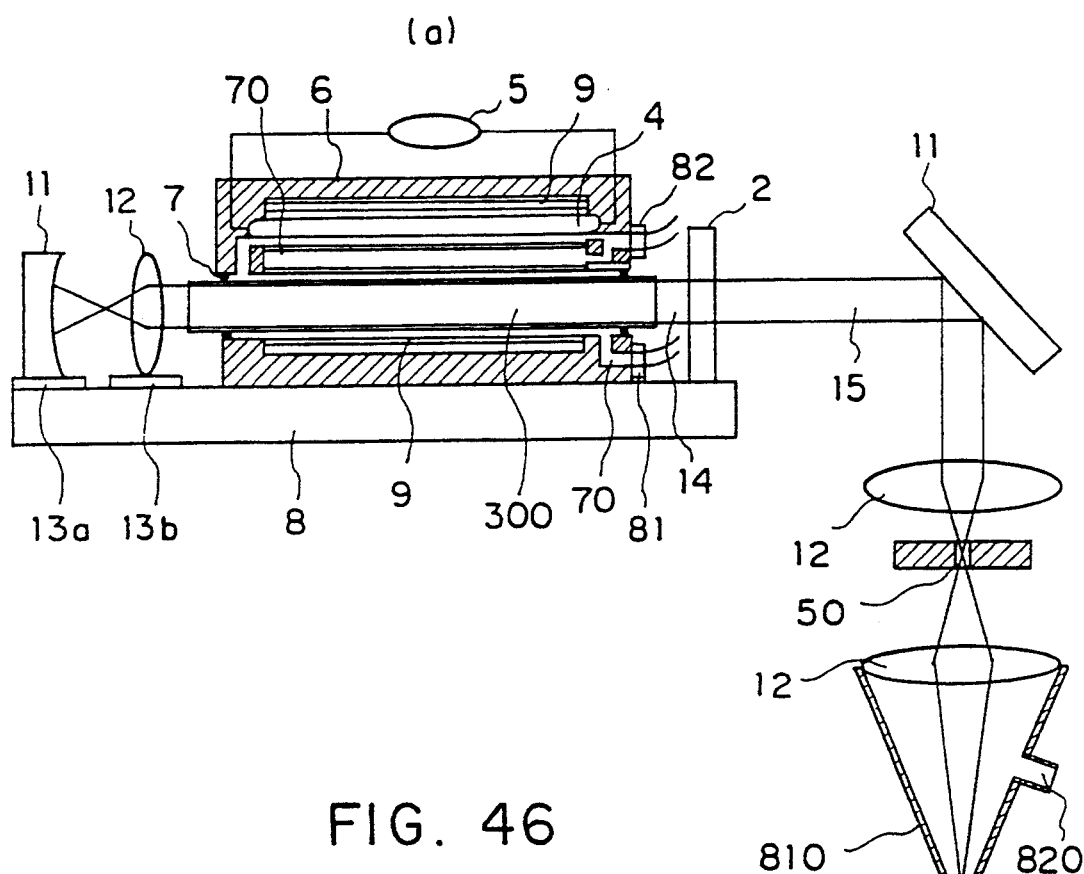
FIG. 46(a) and (b) are a cross-sectional view and a midship sectional view showing the embodiment 22 of the present invention, respectively.
Figure 46:
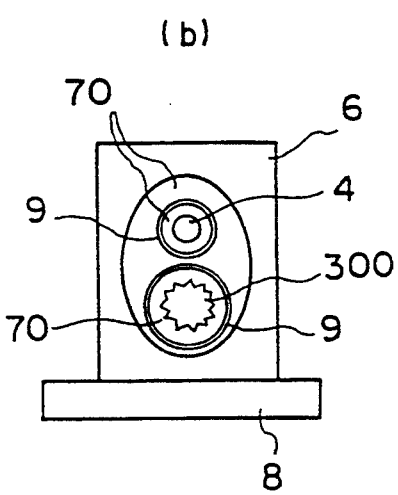

In the embodiment 22 shown in FIGS. 46(a) and (b), the laser beam generated from, for example, the solid state laser apparatus disclosed in the embodiment 20 is transferred to a remote location through the atmosphere, and is condensed by the condensing lens 12 after a direction of the laser beam is changed by the total reflection mirror 11. Subsequently, the condensed laser beam is further condensed by a second condensing lens 12 after passing through an aperture 50 so that the condensed laser beam is used to perform laser machining of a workpiece 800.

In the embodiment 22, since surface roughness of the solid state component-reduces aberration in a section of the solid state component, the laser beam generated from the solid state laser apparatus of the embodiment can be condensed into a small spot. The laser beam condensed into the small spot enables the good laser machining of the workpiece 800.

An additional description will now be given of the aperture 50 which is characteristic in the embodiment.

For example, the laser beam generated from the solid state laser apparatus shown in the embodiments 1 to 18 collides with an end of the solid state component, a laser mirror or the like disposed in a laser resonator, resulting in generation of diffracted wave.

When the diffracted wave is condensed, the diffracted wave has an intensity distribution on a peripheral portion of the laser beam, and serves as a peripheral beam as shown in FIG. 44(a) in case the laser beam is condensed.

When the laser beam is used for the laser machining, there is a problem in that efficient and high quality laser machining can not be performed due to the following causes. That is, in cutting machining, it is impossible to provide a sharp cutting plane due to the peripheral beam. Further, in penetration machining, unnecessary heat input is circumferentially generated at a machining target portion.

In the embodiment 22, the laser beam passes through the aperture in instant of condensing the laser beam on an optical path. Thus, the diffracted wave can be cut off by the aperture so as to perform the laser machining by the laser beam without the diffracted wave.

The embodiment 22 is particularly effective in case any one of the solid state laser apparatus as illustrated in the embodiments 2, 3 and 4 is employed because of the end of the mirror disposed in a laser resonator.

Embodiment 23

Figure 47:
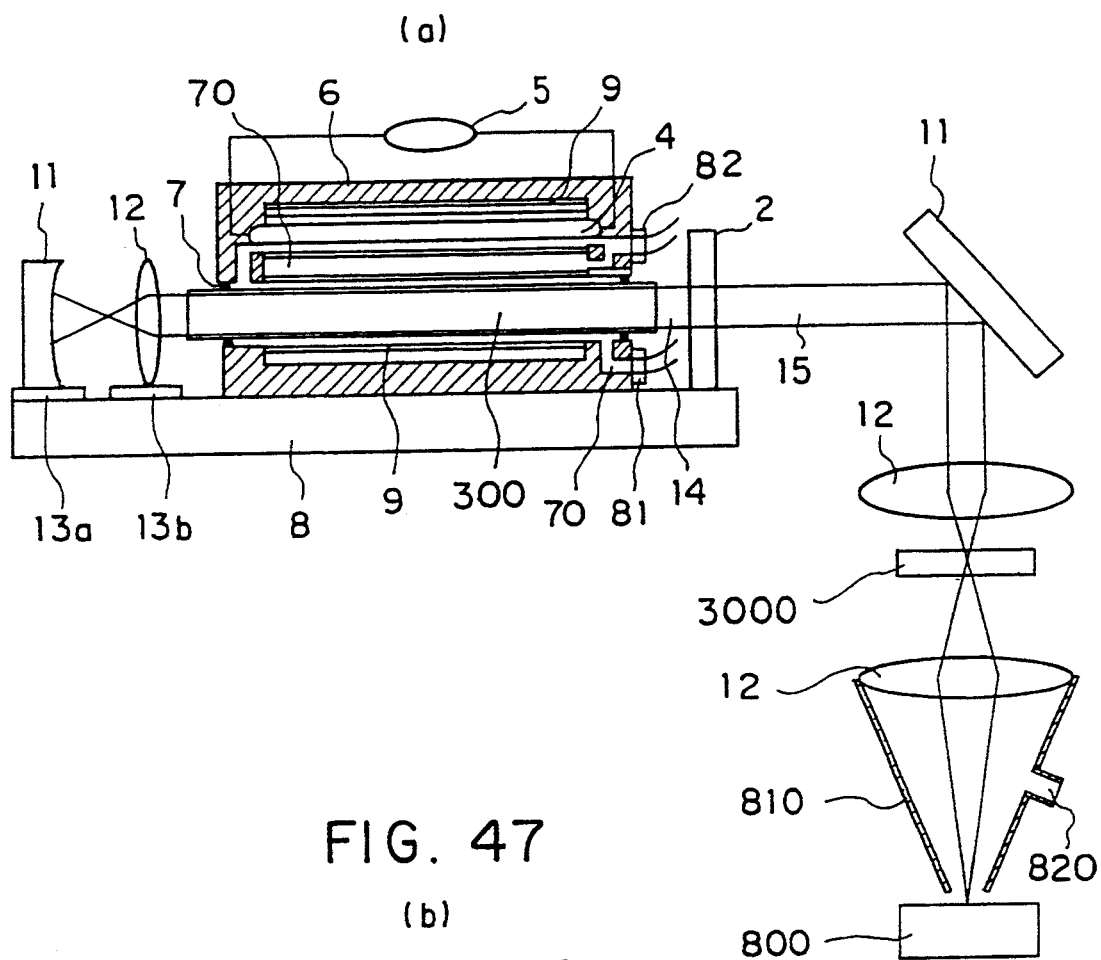
FIG. 47(a) and (b) are a cross-sectional view and a midship sectional view showing the embodiment 23 of the present invention, respectively.
Figure 47:
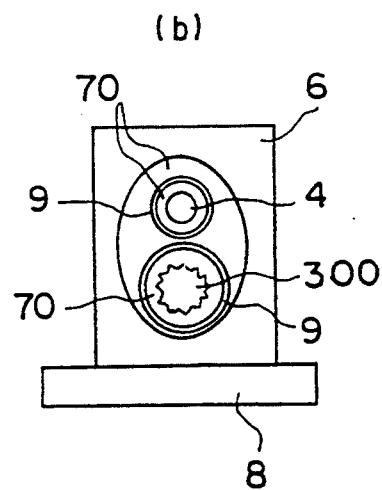

In the embodiment 23 shown in FIGS. 47(a) and (b), the laser beam generated from, for example, the solid state laser apparatus disclosed in the embodiment 20 is transferred to a remote location through the atmosphere, and is condensed by the condensing lens 12 after a direction of the laser beam is changed by the total reflection mirror 11. Subsequently, the condensed laser beam is further condensed by a second condensing lens 12 after passing through a laser beam supersaturated absorber 3000. The condensed laser beam is used to perform laser machining of a workpiece 800.

In the embodiment 23, since surface roughness of the solid state component reduces aberration in a section of the solid state component, the laser beam generated from the solid state laser apparatus of the embodiment 23 can be condensed into a small spot. The laser beam condensed into the small spot enables the good laser machining of the workpiece 800.

An additional description will now be given of the supersaturated absorber 3000 which is characteristic in the embodiment 23.

For example, the laser beam generated from the solid state laser apparatus shown in the embodiments 1 to 18 collides with an end of the solid state component, a laser mirror or the like disposed in a laser resonator, resulting in generation of diffracted wave.

When the diffracted wave is condensed, the diffracted wave has an intensity distribution on a peripheral portion of the laser beam, and serves as a peripheral beam as shown in FIG. 44(a) in case the laser beam is condensed.

When the laser beam is used for the laser machining, there is a problem in that efficient and high quality laser machining can not be performed due to the following causes. That is, in cutting machining, it is impossible to provide a sharp cutting plane due to the peripheral beam. Further, in penetration machining, unnecessary heat input is circumferentially generated at a machining target portion.

The embodiment 23 will be described by way of YAG laser beam as an example. The laser beam passes through the supersaturated absorber 3000 made of $Cr^{4+}$:YAG, $LiF:F_2^-$ or the like in instant of condensing the laser beam on an optical path. The supersaturated absorber typically serves as a reflector, but can provide permeability by absorbing a strong laser beam when the strong laser beam is incident on the supersaturated absorber.

Consequently, in the laser beam as shown in FIG. 44(a), only a central portion having large intensity can pass through so as to eliminate a peripheral portion serving as a component of the diffracted wave.

The embodiment is particularly effective in case any one of the solid state laser apparatus as illustrated in the embodiments 2, 3 and 4 is employed because of the end of the mirror disposed in a laser resonator.

The laser beam may be stopped down by any one of the laser machining apparatus disclosed in the embodiments 19 to 23, and may be introduced into the end of the optical fiber disclosed in the embodiment 19. Accordingly, it is possible to efficiently introduce the laser beam into a fiber so as to safely transfer the remote location.

In either embodiment, the solid state component has been described with reference to a solid state component having a circular section. However, it must be noted that the section of the solid state component should not limited to the circular section, and may include a rectangular section, or an elliptical section.

Though a specific description has not been given in either embodiment, a non-reflecting film may be applied to a position of the respective optical components through which the laser beam passes, as in the typical optical components in spite of no specific description to the position. The non-reflecting film reduces loss in the resonator, and enables efficient laser oscillation.

Since the solid state laser apparatus and the laser machining apparatus of the present invention are provided as set forth above, there are advantages as will be described hereinafter.

In the solid state laser apparatus, the solid state component is peripherally cooled by liquid, and the surface roughness of the solid state component having larger refractive index than that of the liquid is adjusted so as to adjust the excitation distribution in the section of the solid state component. As a result, it is possible to provide a laser medium which can emit substantially uniformly in the section without the wave front aberration. Further, it is thereby possible to stably provide a high power and high quality laser beam by using the laser resonator.

In the solid state laser apparatus, the solid state component is peripherally cooled by liquid, and the surface roughness of the solid state component having larger refractive index than that of the liquid is set to 130 $\mu$inch RMS or more. As a result, it is possible to provide a laser medium which can emit substantially uniformly in the section without the aberration. Further, it is thereby possible to stably provide a high power and high quality laser beam by using the laser resonator.

The solid state laser apparatus employs a light exciting system including a condenser to confine light of the light source so as to introduce the light of the light source into the solid state component. Consequently, the light scattered on the surface of the solid state component is reflected by the condenser again, and is introduced into the solid state component after the reciprocation is repeated a plurality of in the condenser. Accordingly, there is no reduction of transfer efficiency of the light of the light source to the solid state component due to the surface roughness of the solid state component. As a result, it is possible to prevent a laser efficiency from decreasing.

The solid state laser apparatus employs the light exciting system including the condenser which confines the light of the light source, and includes a diffuse reflecting surface at an inner portion thereof so as introduce the light of the light source into the state component. Consequently, the light scattered the surface of the solid state component is diffusively reflected by the condenser again. Therefore, the laser beam is partially introduced into the solid state component reliably for each reflection, and there is reduction of the transfer efficiency of the light of light source to the solid state component due to surface roughness of the solid state component. As a result, it is possible to prevent the laser efficiency from decreasing.

Further, the diffuse reflecting surface can equalize the light of the light source in the condenser so as to peripherally irradiate the solid state component with the uniform light. As a result, it is possible to generate a laser medium which is circumferentially uniform in the section, and stably provide a high power and high quality laser beam by using the laser resonator.

The plurality of solid state components having the rough surface are disposed in a direction of an optical axis so as to provide an elongated exciting portion. As a result, it is possible to extend a length of the laser medium without selection in the solid state components, and provide a high power laser beam at low cost.

In the solid state laser apparatus, the heat lens correcting optical system can be inserted between the respective solid state components. As a result, it is possible to stably generate a high power laser beam without any effect by the heat lens of the solid state component.

In the solid state laser apparatus, a laser output is derived from the solid state component having the rough surface by using the stable type resonator. Therefore, it is possible to generate a laser beam having a substantially uniform intensity distribution in the solid state component. Thus, the laser output can uniformly heat the solid state component without disturbance of uniformity in the section even if the laser output increases and is partially absorbed into the solid state component so as to heat the solid state component. As a result, it is possible to stably generate a high power laser beam.

In the solid state laser apparatus, the laser beam is derived from the solid state component having the rough surface by using the unstable type resonator. Therefore, it is possible to generate a laser beam having more uniform intensity distribution than that in case of the stable type resonator in the solid state component. Thus, the laser output can uniformly heat the solid state component without disturbance of uniformity in the section even if the laser output increases and is partially absorbed into the solid state component so as to heat the solid state component. As a result, it is possible to stably generate a high power laser beam.

In the solid state laser apparatus, the laser beam is derived from the solid state component having the rough surface by using the laser resonator including the exit mirror having the partial reflecting portion at the intermediate portion and the non-reflecting portion at the peripheral portion thereof, and the single total reflection mirror or the heat lens correcting optical system. Therefore, in the solid state component, it is possible to generate a laser beam having more uniform intensity distribution than that in case of the stable type resonator, and generate a laser beam having the condensing performance greater than that in case of the unstable type resonator.

Thus, the laser output can uniformly heat the solid state component without disturbance of uniformity in the section even if the laser output increases, and is partially absorbed into the solid state component so as to heat the solid state component. As a result, it is possible to stably generate a high power laser beam.

In the solid state laser apparatus, the laser beam is derived from the solid state component having the rough surface by using the laser resonator including the exit mirror having the partial reflecting portion at the intermediate portion, the non-reflecting portion at the peripheral portion thereof and means for compensating for the phase difference of the laser beam passing through the partial reflecting portion and the non-reflecting portion, and the single total reflection mirror or the heat lens correcting optical system. Therefore, in the solid state component, it is possible to generate a laser beam having more uniform intensity distribution than that in case of the stable type resonator, and generate a laser beam having the condensing performance greater than that in case of the unstable type resonator.

Thus, the laser output can uniformly heat the solid state component without disturbance of uniformity in the section even if the laser output increases and is partially absorbed into the solid state component so as to heat the solid state component. As a result, it is possible to stably generate a high power laser beam.

In the solid state laser apparatus, the laser beam generated from a discrete solid state laser apparatus is introduced into the solid state component having the rough surface so as to externally derive an amplified laser beam. As a result, it is possible to amplify the laser beam without the aberration, and easily provide a high quality and high power laser beam.

Further, the laser resonator may be used to drive the laser output from the solid state component having the rough surface. In this case, the heat lens correcting optical system including the plurality of optical components is employed as one of the laser optical system forming the resonator to control at least one of the distances between the optical components so as to vary corresponding to the output from the light source. Therefore, even if variation in the output of the light source changes the heat lens of the solid state component, it is possible to cancel the variation by varying at least one of the distances between the optical components. As a result, it is possible to generate a laser beam having stable beam quality irrespective of the output of the light source, or the generated laser output.

Further, the laser resonator may be used to drive the laser output from the solid state component having the rough surface, and the reflection type or transmission type of image transferring optical system may be employed as one of the heat lens correcting optical system forming the resonator. Therefore, even if variation in the output of the light source changes the heat lens of the solid state component, it is possible to cancel the variation by varying at least one of the distances between the optical components by only a fine distance. As a result, it is possible to control at a high speed, and generate a laser beam having stable beam quality irrespective of the output of the light source, or the generated laser output.

The semiconductor laser is employed as the light source. Consequently, it is possible to reduce the amount of the heat lens generated in the solid state component so as to reduce the heat lens distribution. and adjust the wavelength of the semiconductor laser so as to provide a uniform intensity distribution in the section of the solid state component, that is, a uniform heat lens distribution. It is thereby possible to provide a uniform laser medium so as to generate a high quality laser beam.

In the solid state laser apparatus, the total reflection mirror and the condensing lens form the image transferring system in the laser resonator, and are moved in the direction of the optical axis of the laser resonator. Therefore, it is possible to adjust the course of the laser light in the laser resonator, and maintain a wide sectional area of the laser light so as to cancel the focusing action of the laser beam due to the heat lens action of the solid state component. As a result, it is possible to provide a solid state laser apparatus to enable stable oscillation of a beam having a good condensing performance.

In the stable laser resonator having a combination of the image transferring optical system including a combination of the total reflection mirror and the condensing lens with a partial reflection mirror, the total reflection mirror and the condensing lens forming the image transferring system are moved in the direction of the optical axis of the laser resonator by the moving means. Therefore, it is possible to adjust the course of the laser light in the laser resonator, and maintain the wide sectional area of the laser light while the campanulate intensity distribution is maintained in the section of the solid state component so as to cancel the focusing action of the laser beam due to the heat lens action of the solid state component.

In the unstable laser resonator having a combination of the image transferring optical system including a combination of the total reflection mirror and the condensing lens with the enlarged total reflection mirror, the total reflection mirror and the condensing lens forming the image transferring system are moved in the direction of the optical axis of the laser resonator by the moving means. Therefore, it is possible to adjust the course of the laser light in the laser resonator, and maintain uniform intensity distribution in the section of the solid state component. As a result, compensation for the heat lens action can be facilitated.

Further, the enlarged exit mirror having the enlarged partial reflecting portion at the intermediate portion and the non-reflecting portion at the peripheral portion thereof may be employed instead of the enlarged total reflection mirror so as to provide the laser beam having the solid (i.e., non-doughnut type) section. As a result, it is possible to reduce intensity of the laser light required to obtain substantially the same condensing performance, and reduce load of the solid state laser apparatus.

Further, the solid state laser apparatus may include the phase difference canceling means so as to provide the solid type laser beam having uniform phase, resulting in more improved condensing performance.

Further, in the solid state laser apparatus, the piezoelectric device contacts at least one of the condensing lens and the total reflection mirror forming the image transferring optical system, and the piezo-electric device is expanded and contracted so that the image transferring condition can be switched over between the stable condition and the unstable condition. Therefore, it is possible to provide a sharp pulse oscillation by rapidly varying the Q-value of the resonator.

Further, the solid state laser apparatus may include the second light source to emit a light beam passing through the solid state component, and the photo detector to receive the light beam so as to measure variation in an outer diameter of the light beam. Therefore, if the piezo-electric device is driven depending upon the results of the detection, it is possible to cancel the heat lens action of the solid state component while appropriately following fluctuations of the heat lens action in a short time. As a result, compensation for the heat lens action is facilitated.

Further, the solid state laser apparatus may include the housing which accommodates the total reflection mirror and the condensing lens forming the image transferring system. Therefore, it is possible to avoid degradation of quality of the laser beam due to the air beak (generation of plasma) which is caused by the dust heated at the condensed point of the laser light positioned between the total reflection mirror and the condensing lens.

Further, the solid state laser apparatus may include the air hole provided in the housing. Therefore, it is possible to prevent moisture in air from absorbing the laser beam if the vacuum pump is connected to the air hole. Alternatively, it is possible to avoid the air break (the generation of plasma) in a vicinity of the condensed point by inversely introducing inactive gas into the housing.

In the laser machining apparatus, the laser beam is generated from the solid state component having the rough surface, and is introduced into the optical rider so as to be transferred to the remote location. Further, the laser machining is performed by using the laser beam emitted from the fiber at the remote location. As a result, it is possible to efficiently and safely introduce the light into the fiber so as to enable efficient and safe laser machining.

Further, in the laser machining apparatus, the laser beam generated from the solid state component having the rough surface is condensed by the condensing optical system so as to perform the laser machining. Therefore, it is possible to provide the laser beam which is condensed into a small spot, and enable efficient laser machining by using the laser beam.

Further, in the laser machining apparatus, the solid state component is cooled by contacting the liquid, and has larger refractive index than that of the liquid. The surface roughness of the solid state component is varied longitudinally so as to adjust the excitation distribution in the section of the solid state component. Therefore, it is possible to improve stability of the laser machining apparatus by, for example, reducing the roughness in the surface contacting the seal material to seal the cooling medium so as to provide reliable sealing.

In the solid state laser apparatus, the laser beam generated from the laser apparatus is transmitted by the optical system to the vicinity of the workpiece, and is condensed. Further, the laser beam extends after the condense, and is thereafter recondensed to be introduced into the workpiece so as to perform the laser machining. Therefore, it is possible to eliminate the peripheral beam due to the diffracted wave generated at the condensed point of the laser beam, resulting in efficient and high quality laser machining.

In the solid state laser apparatus, the laser beam generated from the laser apparatus is transmitted by the optical system to the vicinity of the workpiece, and is condensed. Further, the diffracted wave is removed from the laser beam by the aperture which is disposed in the vicinity of the focal point, and the laser beam is thereafter recondensed to be introduced into the workpiece so as to perform the laser machining. Therefore, it is possible to eliminate the peripheral beam due to the diffracted wave generated at the condensed point of the laser beam, resulting in efficient and high quality laser machining.

In the solid state laser apparatus, the laser beam generated from the laser apparatus is transmitted by the optical system to the vicinity of the workpiece, and is condensed. Further, the diffracted wave is removed from the laser beam by the supersaturated absorber which is disposed in the vicinity of the focal point, and the laser beam is thereafter recondensed to be introduced into the workpiece so as to perform the laser machining. Therefore, it is possible to eliminate the peripheral beam due to the diffracted wave generated at the condensed point of the laser beam, resulting in efficient and high quality laser machining.

While preferred embodiments of the invention have been described using specific terms, such description is for illustrative purposes only, and it is to be understood that changes and variations may be made without departing from the spirit or scope of the following claims.

What is claimed is:

1. A solid state laser apparatus comprising:
 a solid state component which is cooled by contacting liquid, has higher refractive index than that of said liquid, and includes a laser active medium;
 a light source for exciting said solid state component;
 a light exciting apparatus for transmitting light from said light source to said solid state component; and
 a laser resonator for deriving a laser beam from said solid state component,
 wherein an excitation distribution in a section of said solid state component is adjusted by adjusting a surface roughness of said solid state component.

2. A solid state laser apparatus according to claim 1, wherein said solid state component is set to have a surface roughness of 130 μinch RMS or more.

3. A solid state laser apparatus according to claim 1, wherein said light exciting apparatus includes a light source, and a condenser for confining light of said light source.

4. A solid state laser apparatus according to claim 1, wherein said light exciting apparatus includes a light source, and a diffuse reflectance type of condenser for confining light of said light source.

5. A solid state laser apparatus according to claim 1, wherein said plurality of solid state components are disposed in a direction of an optical axis.

6. A solid state laser apparatus according to claim 1, wherein said plurality of solid state components are disposed in a direction of an optical axis, and a heat lens correcting optical system including at least one optical lens being inserted between said plurality of solid state components.

7. A solid state laser apparatus according to claim 1, wherein said laser resonator is a stable type resonator.

8. A solid state laser apparatus according to claim 1, wherein said laser resonator is an unstable type resonator.

9. A solid state laser apparatus according to claim 1, wherein said laser resonator includes an exit mirror having a partial reflecting portion at an intermediate portion and a non-reflecting portion at a peripheral portion thereof, and a single reflection mirror.

10. A solid state laser apparatus according to claim 1, wherein said laser resonator includes an exit mirror having a partial reflecting portion at an intermediate portion and a non-reflecting portion at a peripheral portion thereof, and having means for compensating for a phase difference of a laser beam passing through both portions, and a single reflection mirror.

11. A solid state laser apparatus according to claim 1, wherein said laser resonator includes an exit mirror having a partial reflecting portion at an intermediate portion and a non-reflecting portion at a peripheral portion thereof, and a heat lens correcting optical system.

12. A solid state laser apparatus according to claim 1, wherein said laser resonator includes an exit mirror having a partial reflecting portion at an intermediate portion and a non-reflecting portion at a peripheral portion thereof, and having means for compensating for a phase difference of a laser beam passing through both portions, and a heat lens correcting optical system.

13. A solid state laser apparatus according to claim 1, wherein said light source is a semiconductor laser.

14. A solid state laser apparatus according to claim 1, wherein said light source is a semiconductor laser, and a wavelength of said semiconductor laser and said surface roughness of said solid state component are adjusted so as to provide a uniform excitation distribution in said solid state component.

15. A solid state laser apparatus according to claim 1, wherein said laser resonator includes a plurality of optical components mounted to at least one position, and a heat lens correcting optical system being employed to control so as to vary at least one of distances between said optical components in response to an output from said light source.

16. A solid state laser apparatus according to claim 1, wherein a reflection type or transmission type of image transferring optical system is employed as said lens correcting optical system.

17. A solid state laser apparatus according to claim 1, wherein a laser beam generated from one solid state component which is discretely provided is introduced into said other solid state component so as to externally derive an amplified laser beam.

18. A solid state laser apparatus according to claim 1, wherein said surface roughness of the solid state component is varied in a longitudinal direction so as to adjust an excitation distribution in a section of said solid state component.

19. A laser machining apparatus for performing laser machining by introducing a laser beam generated from a solid state laser apparatus according to any one of claims 1 to 18 into an end surface of an optical fiber through an optical system, and using a laser beam emitted from the opposite end surface.

20. A laser machining apparatus for performing laser machining by condensing a laser beam generated from a solid state laser apparatus according to any one of claims 1 to 18 through a condensing optical system.

21. A laser machining apparatus comprising:
an optical system transmitting a laser beam generated from a solid state laser apparatus according to any one of claims 1 to 18 to a vicinity of a workpiece, and said laser machining apparatus performing laser machining by performing image transfer of a laser beam emitted from said optical system on a workpiece and introducing said laser beam to said workpiece.

22. A laser machining apparatus comprising:
an optical system transmitting a laser beam generated from a solid state laser apparatus according to any one of claims 1 to 18 to a vicinity of a workpiece;
a condensing optical system for condensing a laser beam emitted from said optical system; and
an aperture arranged in a vicinity of focus which is generated by said condensing optical system,
wherein said laser beam extends by retransmission after condensing by said condensing optical system, and is recondensed to be introduced to said workpiece so as to perform laser machining.

23. A laser machining apparatus comprising:
an optical system transmitting a laser beam generated from a solid state laser apparatus according to any one of claims 1 to 18 to a vicinity of a workpiece;
a condensing optical system for condensing a laser beam emitted from said optical system; and
a laser beam supersaturated absorber disposed in a vicinity of focus which is generated by said condensing optical system,
wherein said laser beam extends by retransmission after condensing by said condensing optical system, and is recondensed to be introduced to said workpiece so as to perform laser machining.

* * * * *